United States Patent
Viehbacher

(10) Patent No.: US 12,422,597 B2
(45) Date of Patent: Sep. 23, 2025

(54) CLOSURE MECHANISM

(71) Applicant: Bayerische Motoren Werke Aktiengesellschaft, Munich (DE)

(72) Inventor: Gerhard Viehbacher, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 17/927,457

(22) PCT Filed: May 17, 2021

(86) PCT No.: PCT/EP2021/063002
§ 371 (c)(1),
(2) Date: Apr. 25, 2023

(87) PCT Pub. No.: WO2021/239493
PCT Pub. Date: Dec. 2, 2021

(65) Prior Publication Data
US 2024/0295677 A1    Sep. 5, 2024

(30) Foreign Application Priority Data
May 25, 2020   (DE) .................. 10 2020 113 979.9

(51) Int. Cl.
G02B 5/00     (2006.01)
F16K 3/03     (2006.01)

(52) U.S. Cl.
CPC ............ G02B 5/005 (2013.01); F16K 3/03 (2013.01)

(58) Field of Classification Search
CPC ................... G02B 5/005; F16K 3/03
USPC ............................................. 359/234
See application file for complete search history.

(56) References Cited

FOREIGN PATENT DOCUMENTS

| | | |
|---|---|---|
| CN | 105605238 A | 5/2016 |
| CN | 105605238 B | 12/2017 |
| DE | 42 15 410 A1 | 9/1992 |
| EP | 2 988 044 A1 | 2/2016 |
| KR | 20200032306 A | 3/2020 |

OTHER PUBLICATIONS

International Search Report (PCT/ISA/210) issued in PCT Application No. PCT/EP2021/063002 dated Sep. 7, 2021 with English translation (four (4) pages).
German-language Written Opinion (PCT/ISA/237) issued in PCT Application No. PCT/EP2021/063002 dated Sep. 7, 2021 (six (6) pages).
German-language Office Action issued in German Application No. 10 2020 113 979.9 dated Mar. 31, 2021 (five (5) pages).

*Primary Examiner* — William Choi
(74) *Attorney, Agent, or Firm* — Crowell & Moring LLP

(57) ABSTRACT

A closure mechanism for an opening defined by a center and an outer edge, includes multiple segments which can all together close the opening. Each segment has a first pivot lever and a second pivot lever and is controlled by the pivoting movements thereof. The segment along with its pivot levers forms a four-bar linkage. All first pivot levers are attached to a first base and all second pivot levers are attached to a second base. The relative movement between the first base and the second base leads to a drive movement for the pivot levers, wherein the second pivot lever is mechanically coupled to the first base via a cam gearing mechanism.

20 Claims, 47 Drawing Sheets

CLOSURE MECHANISM

BACKGROUND AND SUMMARY

The invention relates to a closure mechanism for an opening that is defined by a center and an outer periphery.

The invention relates in particular to an aperture-type, in particular diaphragm-type, closure mechanism.

Aperture-type closure mechanisms are well known, for example in diaphragms as are implemented in photographic lenses. In the latter, thin plate-shaped segments are positioned so as to lie on top of one another, the segments, by way of a driven ring, being able to move relative to one another in an inward manner, i.e. toward the center, or in an outward manner, so as to close the opening to a greater or lesser degree. Owing to the fact that the segments lie on top of one another, the center cannot be completely closed, there always remaining a punctiform opening. Moreover, such diaphragms are not conceived for counteracting forces that arise in the axial direction (the axial direction hereunder being the direction perpendicular to the opening plane). This means that such diaphragms are not suitable for acting as a closure valve in a flow, for example.

Moreover, however, there are also other diaphragm-type closure mechanisms having segments that lie in one plane, i.e. are not positioned on top of one another as in the case of a photographic aperture. These concepts are usually composed of multiple segments which are embodied so as to be substantially triangular and on the external circumference thereof are mounted on a linear guide. Each segment has its dedicated linear guide, and the linear guides are at acute angles in relation to adjacent linear guides. In this instance, the individual segments are moved outward along their linear guides, ideally by means of a common drive. The aperture opening can be adjusted in cross section in a stepless manner in the process, similar to a photographic aperture. The segments, proceeding from the tip, adjoin the respective adjacent segment by way of their lateral faces. The issue here is that the slide lengths required for a robust, smooth motion sequence without jamming can often not be implemented for lack of space. Rolling guides instead of friction guides can indeed offer advantages here, but the issue of increasing sensitivity to contamination arises in rolling guides here, this impeding or rendering impossible any use of this closure mechanism in environments in which liquids, solids or doughy substances pass through the opened closure mechanism. Furthermore, these assemblies with the numerous linear guides are cost-intensive. Moreover, there is the issue here that the segments can very easily jam one another, because the segments are pressed against one another on the lateral faces in order to obtain tightness. This means that a transmission of force between adjacent segments often takes place.

Moreover, a closure mechanism in the form of a type of diaphragm, in which the segments proceeding from the center thereof (in terms of the closed state) have a first, crescent-shaped convex lateral face, and a concave crescent-shaped lateral face that points in the opposite direction, is disposed in EP 2 988 044 A1. All of the segments are of identical construction such that each segment, in the closed state of the closure mechanism, by way of the convex lateral face thereof invades the concave lateral face of the adjacent segment, which is of a complementary shape. By way of this shape of the segments it is possible for segments to be provided in each case with a pivot point that is assigned to one segment, and for the segments to pivot in an outward and inward manner about their assigned pivot point. This closure mechanism is very stable and is used as a valve which can shut off, for example, pipelines through which liquids, pasty substances or solids flow. During opening, there is initially no central, circular opening; rather, there are slots that emanate from the central opening and run to the outer circumferential periphery, because the convex lateral faces are spaced apart from the concave lateral faces thereof at the very beginning of the opening procedure. Consequently, owing to these additional slots that give the opening a star shape, the opening cross section is rendered unfavorable in terms of the flow profile.

It is an object of the invention to achieve a novel closure mechanism which is distinguished by being extremely insensitive to contamination, does not have segments that tend to jam, and additionally can be almost or completely closed. The closure mechanism according to the invention, in terms of the concept, is to be capable of universal use, i.e. to reliably function as a valve also in the case of viscous or doughy substances that pass through. Furthermore, the closure mechanism is to have ideally small activation strokes between the completely opened and the completely closed state, in order for the closure mechanism to be able to be rapidly activated.

Advantageous design embodiments in which the opening in the cross section can be adjusted in a stepless manner are to be implementable. Furthermore, according to one variant, the central opening is to be embodied so as to be almost circular and without slots between adjacent segments. Moreover, it is desirable for the opening in the closed state, by way of the closure mechanism, to be able to be closed in a fluid-tight and/or gas-tight manner, thus sealed.

The closure mechanism according to the invention comprises:
  a plurality of segments which, in a closed position when moved to the center, conjointly close the opening and, in an open position when moved to the outer periphery, conjointly release the opening, first and second pivoting levers, and a first and a second base; wherein
  each segment is a central part of a dedicated four bar linkage and has a first and a second articulation point;
  a first pivoting lever which is pivotably attached to the first base outside the outer periphery, is attached to the first articulation point so as to be pivotable on the assigned segment; and
  a second pivoting lever, which by way of a cam mechanism is mechanically coupled in a movable manner to the first base and is pivotably attached to the second base outside the outer periphery, is attached to the second articulation point on the assigned segment; and
  the first base and the second base are movable relative to one another, and the relative movement forms a driving movement for the pivoting levers.

The solution according to the invention provides that each segment is a central portion, i.e. the central link (herein also referred to as the "central part"), of a dedicated four bar linkage and in this way couples two dedicated pivoting levers assigned thereto, specifically the first and the second pivoting lever, to each other. The movement of the second pivoting lever takes place by way of a cam mechanism, wherein the contour of the corresponding control cam is the result of the desired movement of the segment. This means that the control cam is calculated from the predefined geometry of the segments and of the pivoting levers, the articulation points of the latter, as well as the desired motion path. Conversely, this means that each segment in each moment of the opening procedure and of the closing procedure as a result of the positive control in the four bar linkage has a predefined position such that jamming, blocking or tilting of the adjacent segments cannot arise. Moreover, the segments do not have to drive one another, as in the prior art, or exert force on one another in order for the closure mechanism to be opened or closed, because the segments move in a mutually independent and synchronous manner. The driving action takes place by a relative movement between the first and the second base, this meaning that either the first or the second base is normally moved, in particular rotated about the center, and the respective other base can be stationary in this instance. The displacement of all segments is thus performed by a single component, as a result of which the synchronous movement can be very easily implemented and no unnecessary errors due to tolerances can arise.

The control curve according to the invention is preferably not linear, but is partially arcuate or arcuate across the effective length of the control curve, preferably so as to be continually curved.

A further advantage of the invention lies in that the closure mechanism, including the entire mechanism, is of a very narrow construction about the opening. The segments do not simply move tangentially outward, as is the case in the aforementioned prior art, but move along a curved path which, if at all, may be linear in portions, wherein the motion path owing to the two pivoting levers and the cam mechanism is curved, in particular when being completely opened, this making it possible that the segments at the end of the opening procedure are "nested in one another" in a space-saving manner about the opening. Moreover, the closure mechanism can be opened and closed using very minor strokes. It is already possible for the closure mechanism to be transformed from the completely closed to the completely opened state by rotating movements of the first or of the second base of less than 90°, in particular even less than 35°, as has been demonstrated with prototypes.

The segments also do not have to mandatorily bear on one another on the lateral faces, but may do so optionally in order to achieve an optimum tightness in relation to liquids.

Since the movements of the segments per se always take place by way of pivot points, the risk of the individual parts seizing, as is the case in linear guides, is usually also impossible. Gear wheel drives, timing belt drives, spindle drives, electric drives, pneumatic and/or hydraulic drives, i.e. any type of drives, can be considered as drives, for the respective driven base.

The closure mechanism according to the invention can also be made completely from plastics material and in this way be embodied in a very lightweight manner, since the construction is overall robust.

The first and/or the second base can be configured as a ring that is movable about the center, i.e. as an annulus or as a ring of any arbitrary other shape, the latter being limited and predefined in terms of the shape thereof only by the opening which has to be opened and closed. Only the first or the second base is preferably movable, while the respective immovable base is usually fastened to a housing.

The potential uses for the closure mechanism according to the invention are unlimited. The closure mechanism according to the invention can be used as a valve for closing openings, also openings passed through by a flow, and/or for regulating flows, for example in the food processing sector or in breweries, power stations, industrial plants, refineries, wastewater plants, in which fluids in general of the most diverse viscosity as well as oil, gas, water, steam or else doughy, pasty, pulverulent or granular substances or else bulk material have/has to be transported, portioned or regulated in terms of the volumetric flow. The closure mechanism according to the invention can also be used as a closure for a waste collection container, for example on a dustbin, or may be integrated in a kitchen worktop, wherein a container can be arranged under the opening in this instance. The closure mechanism according to the invention can be used as a closure mechanism for a laundry chute, as a safety cover on a hot plate, as a closure in furniture, or else in optical apparatuses, in roof domes or windows and front doors.

In order to save parts and to render the movement of the driven one of the two bases unequivocal, the moving ring can be guided on the respective other base. For example, if the first base is the moving ring, this ring can be guided on the second base, or vice versa. This guide can be implemented, for example, by a rotary mounting configured between the first and the second base such that no further housing parts or the like are required.

One example for such a rotary mounting lies in that at least one slotted guide is configured between the first and the second base. However, this slotted guide is a slotted guide for the relative movement between the first and the second base, and does not represent the cam mechanism.

A particularly compact and stable guide of the movable ring is derived when the latter can run between two stationary disks and in both disks is guided by the rotary mounting, for example. This means, for example, that the first base forms the moving ring, the second base additionally has a second part, and the moving ring in this instance runs between these two parts (for example disks) of the second base. In this way, the retaining forces are distributed in a highly symmetrical manner, and the stability of the closure mechanism according to the invention is very high.

All first pivoting levers can be pivotably attached to the first base, and/or all second pivoting levers can be pivotably attached to the second base.

All first pivoting levers are preferably of identical construction, or at least of identical lever length, and/or all second pivoting levers are preferably of identical construction or at least of identical lever length. In the optimum case this means that only two types of pivoting levers have to be constructed, specifically first pivoting levers and second pivoting levers, but no dissimilar first and no dissimilar second pivoting levers.

According to one variant of the invention, the first and the second articulation points are in each case positioned in the region of the radially outer circumferential portion of the respective assigned segment, wherein the "outer circumferential portion" is always in terms of the closed state of the closure mechanism. It has been discovered that, using this positioning of the articulation points, it is possible for the segments in the opened state to be positioned next to one another in a particularly space-saving manner. Moreover, this ensures a short activation path between the opening procedure and the closing procedure and a stable mounting of the segments.

The first pivoting lever by way of a first pivot bearing can be attached to the first base. The second pivoting lever by way of a second pivot bearing can be attached to the second base.

The first pivot bearing here is optionally disposed so as to be radially further outside than the second pivot bearing. The second pivot bearing, disposed further radially inward, conjointly with the assigned pivoting lever, is responsible for the outward radial movement of a corner region on the circumferential periphery of the associated segment, whereas the first pivot bearing, conjointly with the associated pivoting lever, is mainly responsible for the opposite corner region of the segment moving outward as well as tilting about the second pivot bearing. A pivot bearing in this way ensures a type of orbital movement on a point of the circumferential periphery of the segment, whereas the other pivot bearing, here the first pivot bearing, ensures a superimposed pivoting or tilting movement of the entire segment. This relates to one of the potential embodiments.

It generally applies that when the first or the second pivoting lever is referred to in the singular, this always includes all first or all second pivoting levers.

In one variant, which is distinguished by a particularly easy movement of the segments, the first or the second pivoting lever in the closed position runs so as to be more steeply inclined in relation to a directly adjoining outer peripheral region of the opening than the second pivoting lever. This definition of the position of the pivoting levers is derived by a straight line from the assigned pivot bearing to the opposite end at which the articulation point to the segment is provided.

The pivoting lever with a flatter incline (for example the second pivoting lever), is in particular that pivoting lever that is responsible for the orbital path of a region of the segment, this pivoting lever being embodied as a slotted lever having a slotted track, for example.

The closure mechanism according to the invention also makes it possible for all of the segments to have a plate-shaped design, in particular a design essentially in the shape of a segment of a circle, and/or to lie in a common plane, i.e. not to lie on top of one another. In this way, the segments are of a very simple embodiment, this enabling costs to be reduced. When the segments run in one plane, it is impossible for the segments to superimpose one another or to slide over one another, and the segments cannot rapidly adhere to one another across large areas even in the case of adhesive substances that pass through the opening. Moreover, a flush contour results in all positions.

One variant of the invention provides that no slots that are visible to the naked eye arise between adjacent lateral faces of adjacent segments when opening, so that only a central opening, which runs in a polygonal manner or an approximately circular manner, for example, is created. This improves the flow and ensures a proportional variation of the flow cross section when opening and closing, without additional turbulences being generated.

The closure mechanism according to the invention can also be used when filling liquids or bulk materials, for example. For this purpose, or else for other variants, the invention in one design embodiment provides that all of the segments have a closure portion that lies in a common plane and, attached thereto and projecting therefrom a pipe segment portion. These pipe segment portions can integrally transition to the closure portion that lies in the opening plane, for example. The pipe segment portions in all of the positions of the segments, i.e. in all of the opening positions, complement one another so as to form a pipe. However, the pipe cross section is varied by the relative movement of the segments, i.e. the pipe thus created has a variable cross section. Moreover, the pipe segments when slightly oblique in relation to one another can also complement one another so as to form a funnel which is imparted a variable cross section by the movement of the segments.

The aforementioned cam mechanism, by way of which the second pivoting lever is coupled to the first base, can be formed by a control curve, for example, and a sensing element that senses this control curve. In this instance, either the second pivoting lever or the first base is equipped with the control curve, wherein the respective other part is equipped with the sensing element. The control curve in or on the selected component can be implemented as, for example, a groove curve (also referred to as a slotted track) and/or rib curve (as track-shaped appendage that runs in a manner corresponding to that of the control curve) and/or cam disk. The groove curve can be embodied, for example, as a single groove curve for one sensing element and/or a double or multiple groove curve for two or more sensing elements. The rib curve can likewise be embodied for interacting with one or a plurality of sensing elements. The same applies to the cam disk. The sensing elements can be embodied, for example, as appendages or pins or as rollers, optionally also so as to be spring-loaded. All these variants are able to be implemented in the closure mechanism according to the invention.

The segments can have seals, for example on the lateral faces of the segments that face the adjacent segments, and/or interlock in portions, for example by way of the tongue-and-groove connection. The seals are elastomer seals, for example. These options, in the closed state, are intended to ensure fluid-tight and/or gas-tight sealing, on the one hand, and when opening also ideally ensure that no gap is created between adjacent segments through which fluid can pass, on the other hand. The tightness is of course adapted to the assigned fluid. In the case of gases, other levels of tightness have to be achieved than in the case of bulk materials, for example. Accordingly, other tolerances between the adjacent segments have also to be implemented.

It could arise in particular in special motion sequences of the segments during the opening procedure that the lateral faces of linear embodiment no longer bear on the adjacent lateral face. For this purpose, the lateral faces can be profiled such that the latter interlock in these critical positions or permanently interlock. One example to this end provides that one of the lateral faces is provided with a convexity. The opposite lateral face of the adjacent segment indeed has a linear external face, but proceeding from this linear external face has a concavity provided so as to be complementary to the convexity. The convexity in terms of the thickness thereof is preferably smaller than the thickness of the segment; accordingly, the complementary concavity is a slot within the lateral face. As a result of the convexity invading the slot, i.e. the concavity, adjacent segments are coupled to one another in the axial direction such that the plate-shaped segments stabilize one another.

A further improvement in this context can be achieved in that a lateral face has a linear external face having projecting guide cams that are axially spaced apart. These guide cams project in the circumferential direction, so to speak. During a sub-portion of the mutual moving procedure of the segments, the aforementioned convexity moves between the guide cams in the adjacent segment and as a result is axially guided, i.e. the adjacent segments here too are axially coupled to one another.

In order for the lateral faces to be adapted in an even more advantageous and harmonized manner to the chosen motion sequence when opening and closing the closure mechanism according to the invention, adjacent lateral faces in portions can be configured such that they form a tongue-and-groove connection. This tongue-and-groove connection is preferably configured such that, when viewed in the axial direction, no gap arises between adjacent segments during the entire opening and closing procedure, i.e. that the tongue of one segment engages permanently, along the entire overlapping region of the adjacent segments, in the groove of the adjacent segment.

One preferred embodiment here provides that the lateral face having the groove has a convexity in the circumferential direction, and the lateral face having the tongue, in a complementary manner, has a concavity. In this instance, the tongue projects in the circumferential direction from this concave lateral face.

A further variant and improvement in this context can be achieved in that a guide web, which is integrally molded on the convexity, extends from the convexity in the direction toward the radially outer circumferential periphery of the segment. This guide web is part of the segment having the convexity, and is preferably integrally molded thereon. This guide web at the end of the opening procedure, i.e. at least in the last fifth of the movement of the driving element in the opening procedure, moves into a tip-proximal groove in the adjacent segment. In terms of the closed state, the tip-proximal groove is configured in the central region of the segment, at the location where the segment has a tip. The guide web can invade the tip-proximal groove also in the completely opened state of the closure mechanism, or alternatively only in the completely opened state of the closure mechanism. In any case, an axial coupling of adjacent segments is also performed here.

With a view to improving the sealing effect, it can be advantageous for the segments to laterally press against one another. As has been mentioned at the outset, this pressing action is not decisive in terms of the function of the closure mechanism according to the invention, because each segment by way of the four bar linkage is unequivocally defined in each position. This pressing action can be advantageous merely in terms of the sealing effect. Provided to this end is, for example, a torsion spring for each segment, the torsion spring being positioned about one of the two articulation points on the segment.

The segments should preferably have such a shape, and the four bar linkage and the cam mechanism should be mutually adapted such that no gap, at least no gap which permits a view in the axial direction, is created between directly adjacent segments during the opening procedure. As a result of the flexible construction according to the invention, this can be achieved in that the cam mechanism can be adapted to the mutual position and orientation of the segments during the entire opening procedure, i.e. this representing the result of the desired relative movements of the segments.

In terms of the closed state, the segments converge preferably acutely toward the center, and/or have a substantially triangular design.

Furthermore, the segments can have a substantially triangular basic shape, wherein the sides that converge toward the center preferably have a linear basic shape, having linear lateral faces of which portions may also be configured as a convexity or as a recess, or be provided with the aforementioned guide cams, as has been mentioned above, which however are optionally not visible during operation. The basic shape nevertheless remains substantially triangular. The external circumferential periphery does not have to have a linear profile but can have arbitrary shapes or integrally molded arms such that a triangular shape is referred to only in terms of the overall principle.

If the tip converges acutely, the closure mechanism according to the invention can enable complete closing, also in the center. Should lower manufacturing tolerances be desirable here, or else provisions be made in terms of wear and tear (for example in the case of hard bulk materials) in order for this complete closing to be implemented at all times, a seal can be attached (either as a separate part or by overmolding) to at least one segment in the region of the tip. This seal, for example an elastomer seal, in this instance forms the center of the closure mechanism in the closed state, and the other segments by way of their tips press against the seal. Of course, more than one segment may also have such a seal in the region of the tip.

In the closure mechanism according to the invention the relative mutual movements of the segments can be established such that an almost circular opening (implemented by way of a polygonal shape) is achievable without slots between adjacent segments, as in a diaphragm known from the prior art, having linearly guided segments and (when viewed axially) having lateral faces that, proceeding from the respective tip, run linearly. In the closure mechanism according to the invention, however, this takes place by means of a lever mechanism having articulation points rather than by linear guides.

As has been demonstrated in experiments, the closure mechanism is particularly optimized in terms of movement when the two articulation points on the respective segment have an ideally large mutual spacing. To this end, the two articulation points on the segment are located in different halves of the triangular segment. The halves are created by an angle bisector running through the tip of the segment. As a result of the articulation points being located in different halves of the segment, this for at least one articulation point results in a motion sequence having a reversal of direction during the opening and closing. Should the second pivoting lever be pivotably attached to the articulation point which is subjected to the reversal of direction, the cam mechanism, i.e. the one or a plurality of control curves thereof, in this instance is correspondingly configured such that the second pivoting lever during the opening procedure first pivots in the direction of the center and subsequently pivots outward, thus performs the exactly matching reversal of direction of rotation.

Another variant of the invention provides that the cam mechanism is configured such that the segments at the beginning of the opening procedure first perform a radial movement toward the outside and subsequently perform a pivoting movement, more specifically a curved movement, toward the outside. As a result of the purely radial movement, there is no transverse mutual movement of the segments; rather, a spacing which may be bridged by the seal is formed between the segments. This variant is particularly suitable when seals are attached to the lateral faces. Seals become particularly rapidly dysfunctional when they rub-up laterally against one another, or a rubbing movement is exerted laterally on the seal by an adjoining part. However, if the elastic seal is only subjected to perpendicular pressure, and if this pressure is cancelled again by a perpendicular movement, this results only in the seal being compressed and released without a transverse movement being performed. This specifically is implemented by the variant such that a purely radial movement between the segments is performed at the beginning of the opening procedure. The corresponding seals are consequently only compressed during the last moment of the closing movement, without being simultaneously stressed in the longitudinal direction.

The cam mechanism can also be configured such that a pivoting movement of the segments, having a superimposed radial movement component takes place right at the beginning of the opening procedure, such that a spacing between the segments is formed from the beginning, simultaneously with the pivoting movement so as to avoid rubbing and thus wear and tear of the seals, as has already been mentioned. The exact motion path of the segments can be embodied such that the optimum mutual spacing of the segments for the respective application can be maintained at all times, for example as a function of the selected material for the segments and of the geometry of the sealing system.

Another possibility for locking the segments to one another in the closed state in order to generate a solid, closed plate from the segments, lies in that the segments have a tapered tip and the tips in the closed state converge in the center, wherein the segments on one lateral face have a centering appendage. This centering appendage projects laterally, and in the closed state invades an in particular complementary clearance in a directly opposite lateral face of the adjacent segment. In this way, the segments are mechanically locked to one another. This type of mutual locking of the segments can be provided additionally or alternatively to the aforementioned convexities or guide cams.

In order for the mutual movement of the first pivoting levers or of the second pivoting levers to be synchronized in an optimal manner, and for the mutual angular position of the pivoting levers to be kept constant at all times, a mechanical coupling device which is separate from the first and the second base can be provided. This coupling device connects the pivoting levers to one another, i.e. either the first pivoting levers to one another or the second pivoting levers to one another. Examples of such a coupling device are coupling rods which connect adjacent pivoting levers to one another, gear wheels, or the like.

In order to increase the stability of the construction and to achieve an integral disposal of the components, the mutual axial disposal of the components and/or the disposal of the rotary mountings can be varied. For example, pivoting levers or bases here can be axially situated on both sides of the segments, and/or pivoting levers can encompass the segments on the external periphery and in this way lie on the axially opposite sides of the segment. This nested disposal can be designed such that components, for example a base, are/is axially fixed between other components, for example pivoting levers and the respective other base. Savings in terms of fastening elements can be possible in the case of a clever disposal. The design in terms of construction can be simplified, the weight can be reduced, and the available installation space can be utilized in an optimal manner. In the case of a pivoting lever that encompasses a segment, a slotted track does of course not have to be provided only on one side, but one slotted track can be provided on both legs of the pivoting lever (the pivoting lever in this case having one leg on each side of the segment).

In order to have even more individual possibilities for optimization in the design of the exact motion sequence when opening and closing the closure mechanism, the pivot bearings of the first pivoting lever in one variant can be moved on a freely definable path rather than on an orbit. Provided to this end in or on the first base, as well as in or on the second base, is in each case a curved track, e.g. in each case one slotted track, the latter by virtue of the mutual relative movement of the two bases also moving relative to one another. These two curved tracks intersect when viewed in the axial direction. The intersection point defines the position of the pivot bearing of the first pivoting lever and, as a result of the aforementioned relative movement, travels during the opening and closing. The pivot bearings of the first pivoting levers can have, for example, axially projecting protrusions or appendages on the first pivoting levers, which protrusions or appendages are guided on a curved track, e.g. a slotted track, of the first base as well as on a curved track, e.g. a slotted track, of the second base.

A refinement of this variant can be designed such that the first pivoting levers are not guided on a travelling intersection point of the two curved tracks of the first and the second base, but that the first pivoting levers for coupling to the two bases have two coupling elements (for example axially projecting protrusions or appendages) instead of one common coupling element, of which one coupling element is guided on a curved track, e.g. slotted track, of the first base, and the second coupling element is guided on a curved track, e.g. slotted track, of the second base.

Since the closure mechanism according to the invention can also be provided for sealing an opening, the opening being closed very tightly, one variant of the invention provides that the segments on their outer circumferential periphery, on at least one axial end face, preferably on both axial end faces, have a protruding periphery. This periphery projects axially and has the shape of a segment of a circle. In the closed state of the closure mechanism, these projecting peripheries complement one another so as to form a closed, encircling ring-shaped appendage, in particular annular appendage. The closure mechanism is installed on or in a housing, specifically in the region of a bore which can be closed or released by the closure mechanism. A seal which seals the segments in relation to the housing can be provided between the housing and the ring-shaped appendage.

The sealing action can be performed in various ways. For example, an annular seal is provided on the housing, or two annular seals are provided should projecting peripheries be present on both axial end faces, the assigned ring-shaped appendage in the closed state pressing against the annular seal/seals. In this way, one side of the closure mechanism is sealed in relation to the housing by one ring-shaped appendage.

Alternatively thereto, the sealing concept can also be chosen such that the projecting periphery on the segments is equipped with a seal and presses against the housing, with or without a seal on the housing. Moreover, as an alternative to an annular seal, a seal of arbitrary shape, which is adapted to the shape of the projecting peripheries on the segments, can also be implemented.

The first or second base can be part of the housing, or be fixedly attached to the housing, whereas the respective other base is moved in this instance, that is to say moved relative to the housing in order for the closure mechanism to be activated.

Further features and advantages of the invention are derived from the description hereunder and from the drawings hereunder, reference being made to the latter.

DETAILED DESCRIPTION OF THE DRAWINGS

Figure 1:
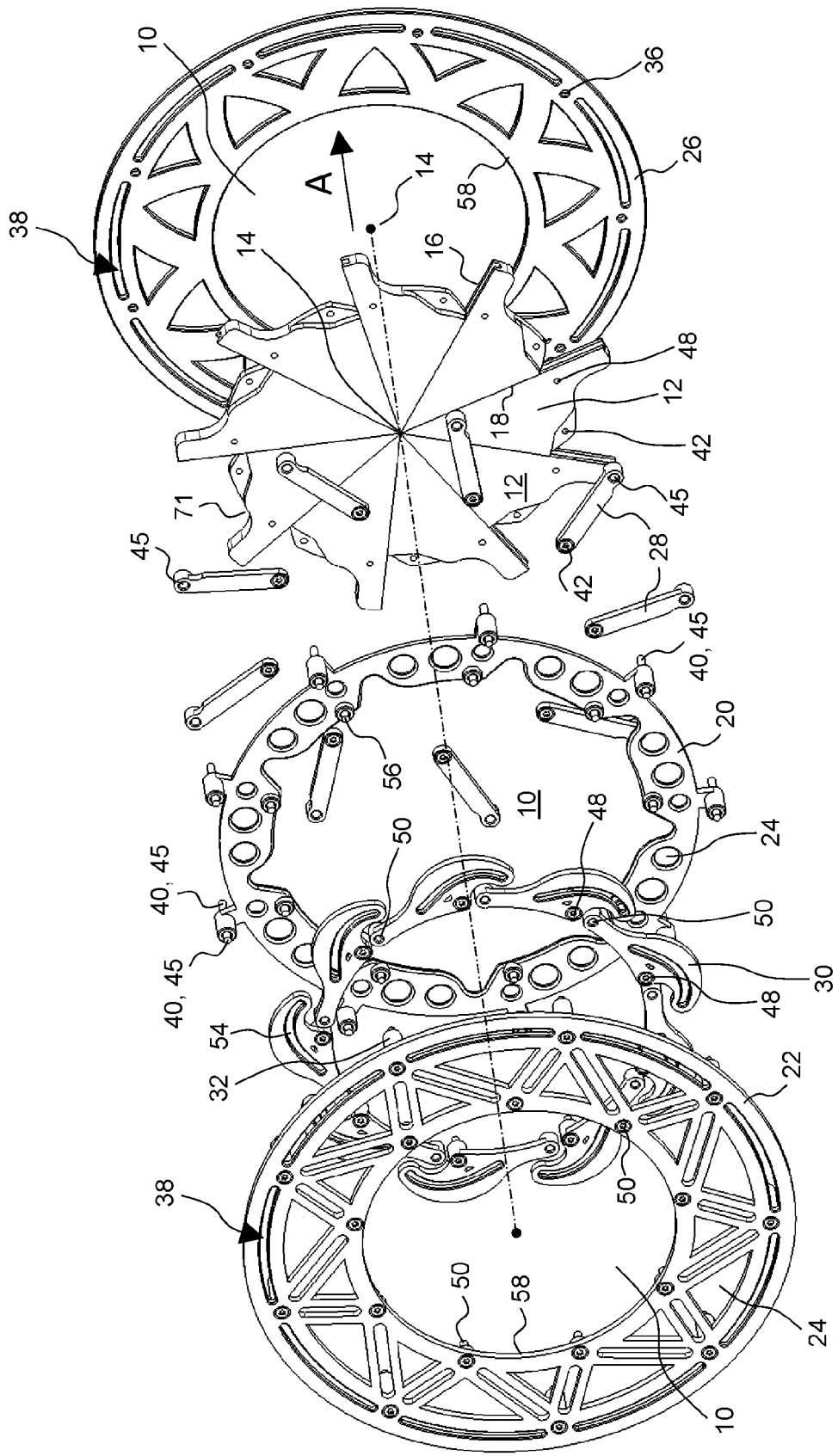
FIG. 1 shows an exploded view of a first, exemplary embodiment of the closure mechanism according to the invention in the closed state.

Illustrated in FIG. 1 is a closure mechanism which, as mentioned at the outset, is suitable for the more varied applications and is embodied in the manner of a diaphragm.

The closure mechanism is inserted into a housing, which is illustrated later and has a bore, and is suitable for opening this bore and selectively also for closing the latter, for example. The closure mechanism per se has an opening 10 which is in alignment with the bore in the housing. This opening 10 can be closed by segments 12 which can be moved relative to one another.

The segments 12 are in particular embodied so as to be substantially triangular and taper acutely toward a center 14, the latter also being the center 14 of the opening 10.

The segments preferably have a plate-shaped design, that is to say that the segments are relatively thin and have lateral faces 16, 18 which converge toward the center 14 and are linear in the plan view and are oriented in opposite directions. Each segment thus has a lateral face 16 which lies directly opposite the lateral face 18 of the adjacent segment 12.

Moreover, the closure mechanism comprises a first base 20, here in the form of a ring, which likewise has the opening 10, and adjoining thereto a second base 22, the latter likewise being in the form of a ring which has the opening 10. The two rings that form the base 20, 22 are preferably configured in the shape of disks and for reducing the weight can have clearances 24, this however only being optional. The second base 22 lies on an end side of the first base 20, a third base 26, here likewise in the form of a disk-shaped ring, lies on the opposite end side.

In the embodiment shown, which is not to be understood to be limiting, the segments 12 in the axial direction A (perpendicular to the plane of the opening 10) lie between the first base 20 and the third base 26.

The term "base" is not limited to a flat circular disk but describes a holding structure having an opening which is preferably integral but may also be embodied in multiple parts. The disk-shape is distinguished by a minimal axial installation space.

Each segment 12 is part of a dedicated four bar linkage. The four bar linkage is defined by a dedicated first pivoting lever 28 and a dedicated second pivoting lever 30 and the segment 12 is defined as a central link of the four bar linkage.

All of the first pivoting levers 28 are of an identical configuration, i.e. are identical parts, just like the two pivoting levers 30, while being dissimilar to the first pivoting levers 28, but represent identical parts per se.

The first base 20 is movable relative to the second base 22 and to the third base 26, i.e. conversely the second and the third base 22 and 26, respectively, can also be conjointly moved relative to the first base 20.

Figure 2:
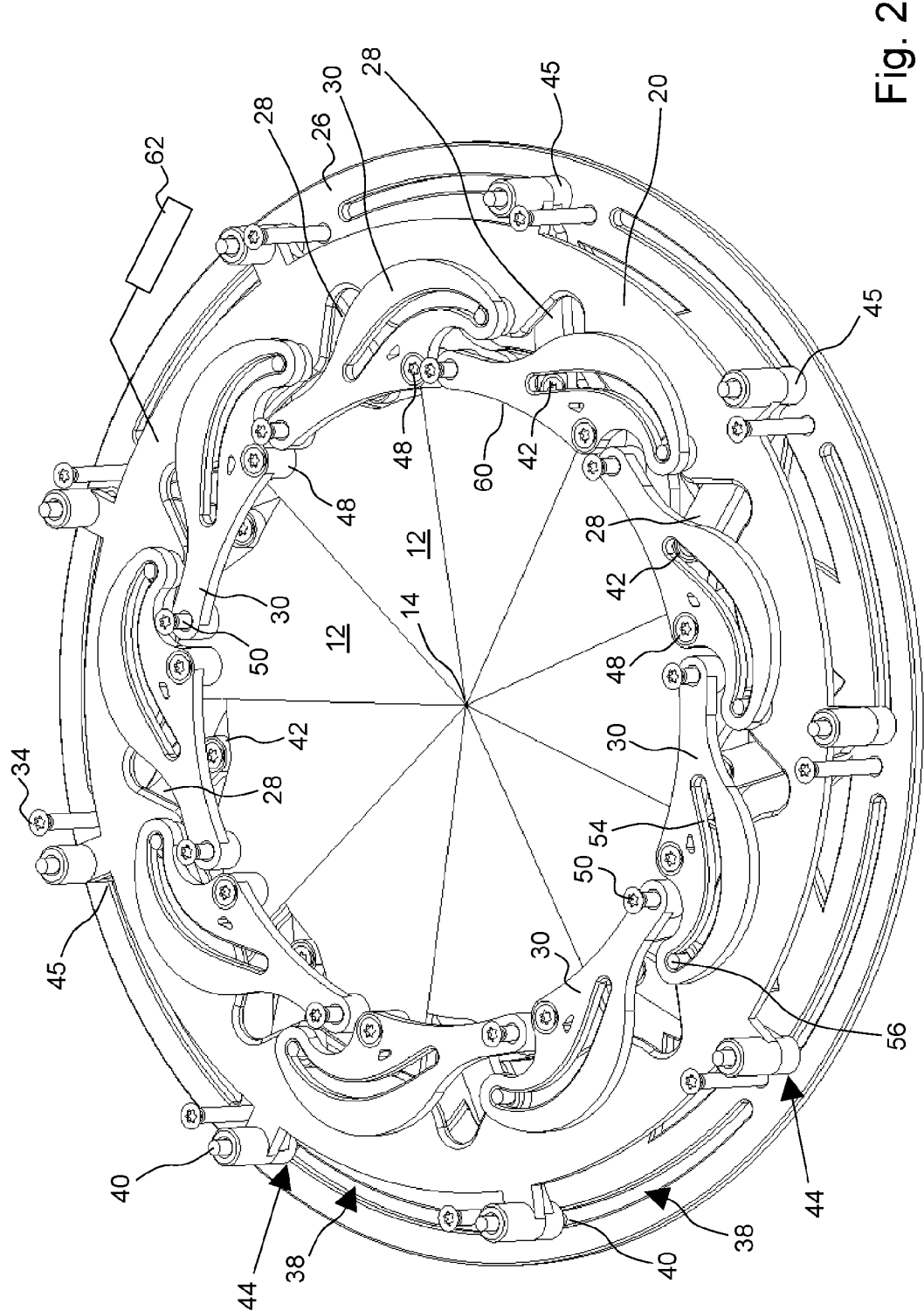
FIG. 2 shows a perspective view of the closure mechanism as per FIG. 1 in the closed state, wherein a base has been removed for the sake of better visibility of the mechanism.

While the second base 22 and the third base 26 are axially spaced apart from one another, the bases 22, 26 are connected to one another, specifically by way of spacers 32, which can be seen in FIG. 1, in conjunction with fastening elements 34, for example screws, which here run through the spacers (see FIG. 2). Corresponding fastening bores 36 can be seen in the third base 26 in FIG. 1. However, the type of fastening is not limited to this fastening method.

The first base 20, in the embodiment illustrated, by way of a rotary mounting 44 (see FIG. 2) is rotatably coupled to the second base 22 and also to the third base 26. To this end, the second and the third base 22, 26 have slotted guides 38 in the shape of segments of a circle, protrusions 40 on the first base 20 protruding into the slotted guides 38. Derived as a result of the slotted guides 38 distributed on the circumference and the numerous protrusions 40, is an outstanding rotary mounting with little play between the first base 20 and the second base 22.

The mounting of the segments 12 will be discussed hereunder.

As mentioned, each segment 12 has a central part of a dedicated four bar linkage which, apart from the assigned segment 12, has a first pivoting lever 28 which is pivotably attached to a first articulation point 42 on the assigned segment. At the preferably opposite end of the respective first pivoting lever 28, each pivoting lever 28 by way of a first pivot bearing 45 is attached to the first base 20.

The pivot bearing 45 in the embodiment illustrated, this not to be understood to be limiting, has an opening in the first pivoting lever 28, the pin-type protrusion 40 on the first base 20 engaging in the opening, the protrusion 40 also invading the slotted guide 38 such that two mountings are achieved with one protrusion 40. The pivot bearing 45 is consequently formed by the protrusion 40 and the opening into which the protrusion 40 protrudes.

The first articulation point 42 is preferably disposed in a corner region of the corresponding segment 12 that is an outer corner region in the circumferential direction; this likewise not to be understood to be limiting.

Laterally spaced apart therefrom, i.e. in the circumferential direction in terms of the center 14, the second pivoting lever 30 by way of a second articulation point 48 is pivotably fastened to the assigned segment 12.

At the distant end of the second pivoting lever 30, the latter by way of a second pivot bearing 50 is coupled to the second base 22. For example, a pin or a screw, and a corresponding opening in which the pin or the screw engages, can be configured as a pivot bearing.

Only by way of example to this end, an opening in the region of the second pivot bearing 15 on the pivoting lever 30, and a screw in the region of the second base 22 in the region of the second pivot bearing 50 are illustrated in FIG. 1.

The second base 22 is omitted in FIG. 2 in order to enhance the clarity. However, the second pivot bearings 50 can be identified in that the corresponding threaded bolts by way of the heads thereof are spaced apart toward the top, out of the drawing plane, from the second pivot levers 30 assigned thereto. This spacing corresponds to the thickness of the second base 22.

It can be readily seen in FIG. 2 that each second pivoting lever 30 by way of a cam mechanism is mechanically coupled to the first base 20 such that the second pivoting levers 30 and the first base 20 in terms of their mutual position are unequivocally established. The cam mechanism in the present case comprises a slotted track 54 as the control curve, and a pin-type appendage 56 as a sensing element which invades the slotted track 54, wherein the slotted track 54 by way of example in the illustrated embodiment is present in the second pivoting lever 30, and the appendage 56 is present on the first base 20.

As can be seen in FIGS. 1 to 5, all first pivoting levers 28 are pivotably attached to the first base 20, and all second pivoting levers 30 are pivotably attached to the second base 22. The pivoting levers 28, 30 are in each case identically oriented and uniformly distributed on the circumference.

The opening 10 in the present case is defined by an outer periphery 58 of the second base 22 and of the third base 26, the second base 22 and the third base 26 having the same internal cross section which is smaller than the internal cross section of the annular first base 20. Of course, the first base 20 could also define the opening 10.

All of the pivot bearings 45, 50 in the axial view, i.e. when viewed in the axial direction A, lie radially outside the outer periphery 58 and thus outside the opening 10.

In the embodiment illustrated, the first pivot bearing 45 is in each case attached so as to be radially further outside than the assigned second pivot bearing 50, this also being only optional.

In the closed state of the closure mechanism, which can be seen in FIG. 2, the first pivoting lever 28 runs so as to be more steeply inclined in relation to a directly adjoining outer peripheral region 60 (cf. the first pivoting lever 28 in FIG. 2, which is at approximately 3 o'clock) than the assigned second pivoting lever 30, which in FIG. 2 in a counterclockwise manner lies ahead of the pivoting lever 28, i.e. at approximately 2 o'clock.

It can furthermore be readily seen in FIG. 2 that all of the segments 12 which have a design in the shape of a segment of a circle, lie in a common plane and complement one another so as to form a plate-type closure.

The movement of the closure mechanism in the present case takes place by way of a rotating movement of the first base 20, for example by way of a drive 62 which is symbolically illustrated in FIG. 2 and can be configured so as to be movable. Conversely, the third base 26 and thus the second base 22 can of course also be moved relative to the first base 20, which in this instance is stationary.

Figure 3:
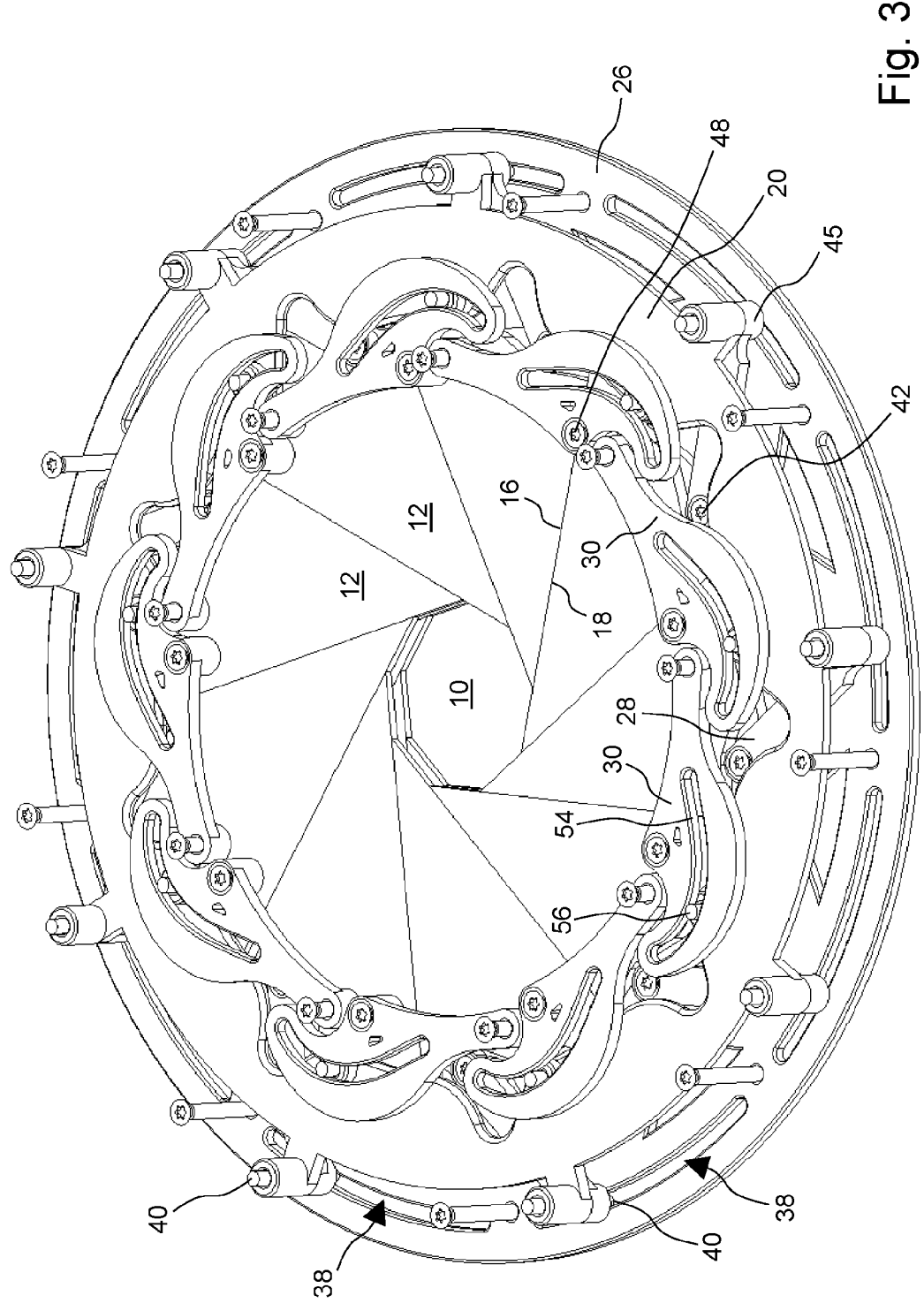
FIG. 3 shows a perspective view of the closure mechanism according to FIG. 2 in the partially opened state.

When the first base 20 is moved in a counterclockwise manner, the protrusions 40 travel in the assigned slotted guide 38 of the second base 22 and of the third base 26, as can be seen in FIG. 3. The first pivot bearings 45, which in the embodiment illustrated are also formed by the pin-type protrusions 40, thus also travel along a segment of a circle and thus entrain the first articulation point 42 and thus the corresponding segment 12 toward the outside. At the same time, the assigned appendage 56 also travels conjointly with the base 20 in the counterclockwise manner and pivots the second pivoting lever 30 about the pivot bearing 50, which is stationary in the space. The transmission of movement to the segment 12 takes place by way of the second articulation point 48. In the exemplary embodiment illustrated, the articulation points 42, 48 lie in opposite corner regions on the radially outer circumferential peripheral region, i.e. close to the circumferential periphery 71 (see FIG. 1) of the assigned segment, this however not to be understood as being limiting.

In the variant illustrated, the slotted track 54 is configured such that the second pivoting lever 30 in the opening procedure first pivots in the direction of the center and subsequently pivots outward. This results in an optimal mutual movement of the segments 12, as the segments 12 when opening the closure mechanism bear laterally on one another without any visible gap, or directly adjoin one another without any visible gap. This movement is optimal in terms of tightness when the segments 12, in the axial view, proceeding from the respective tip 70 run linearly on both lateral faces 16, 18.

Figure 4:
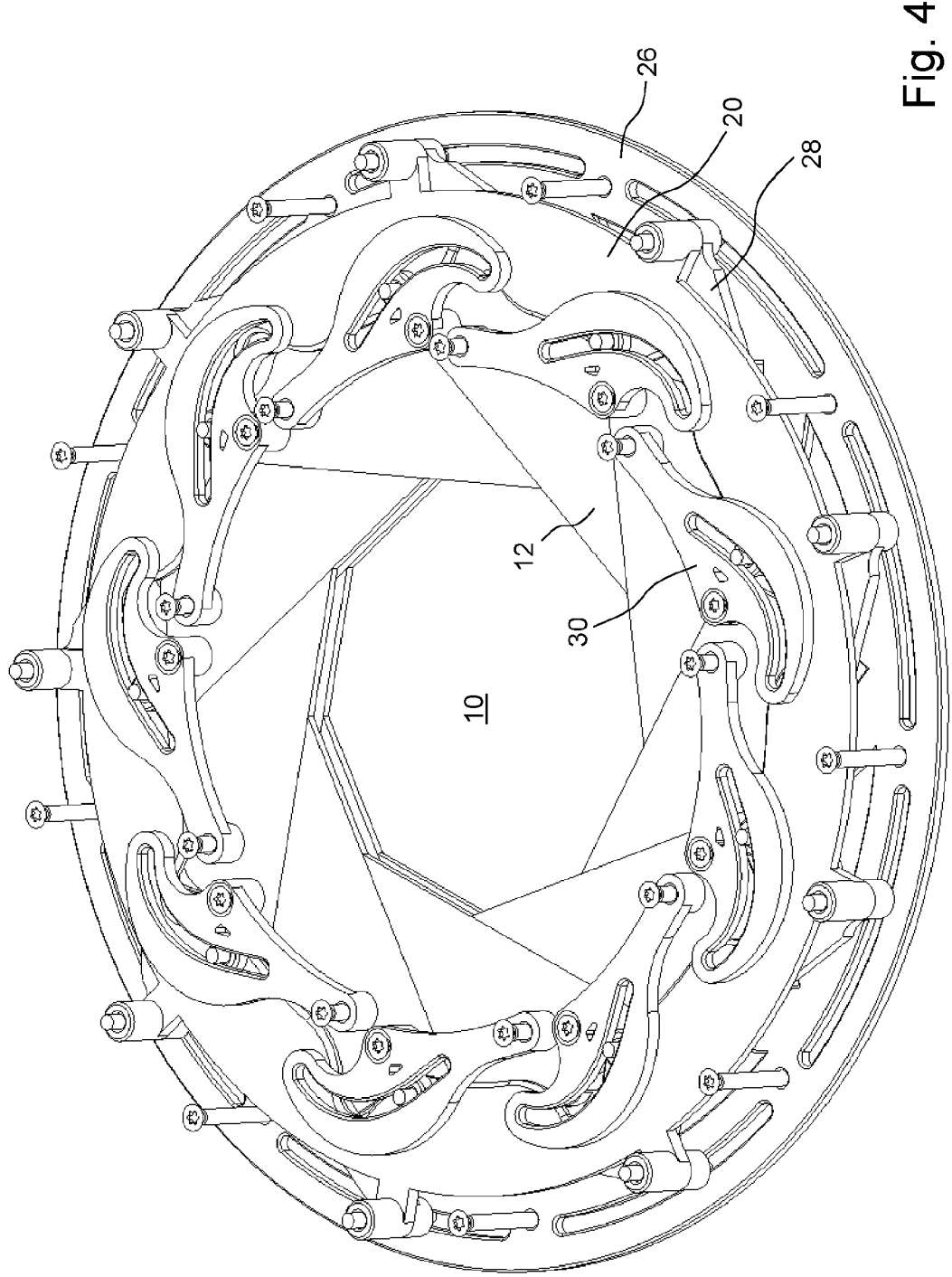
FIG. 4 shows a perspective view of the closure mechanism according to FIG. 2 in a more opened state.
Figure 5:
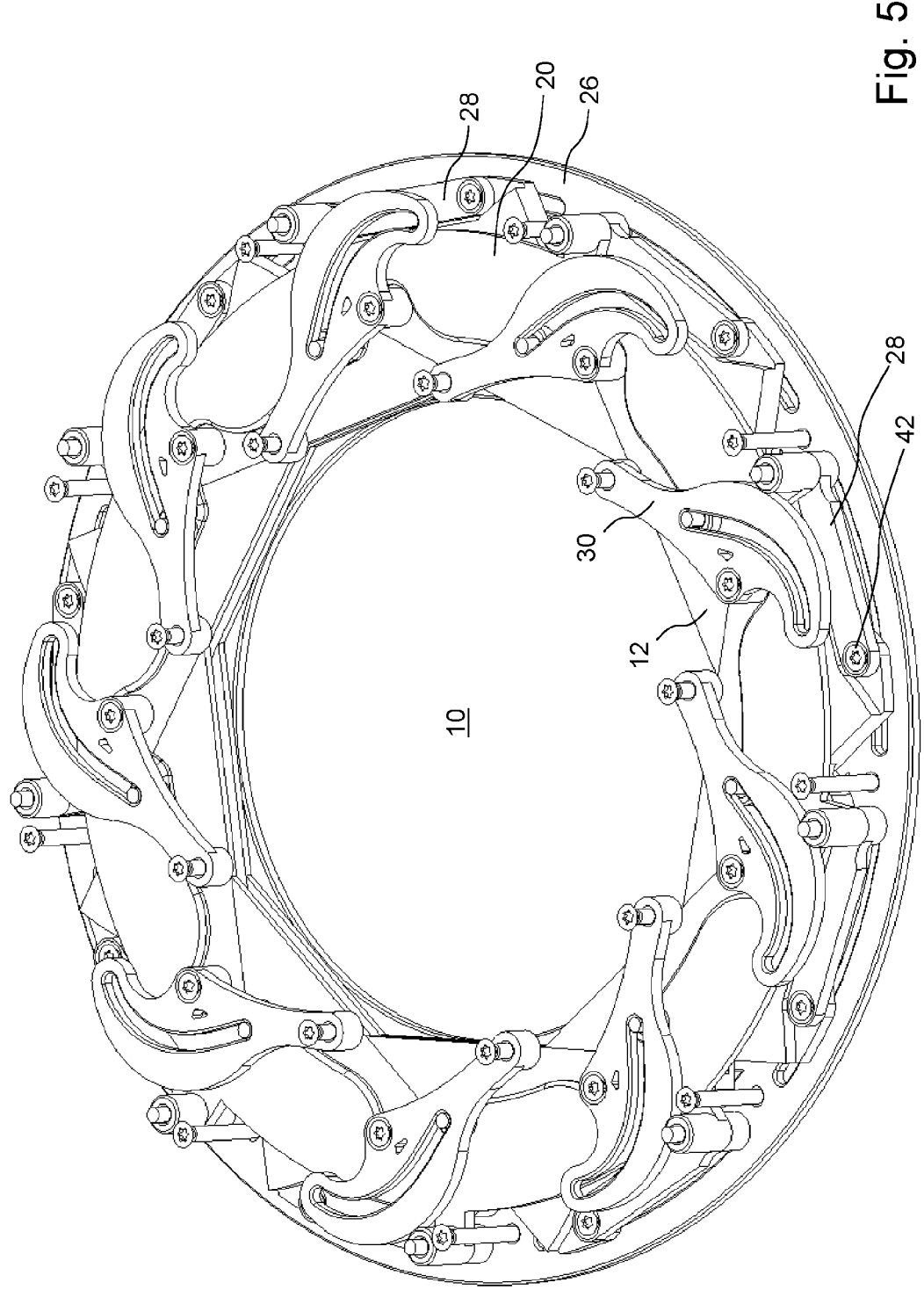
FIG. 5 shows a perspective view of the closure mechanism according to FIG. 2 in the completely opened state.

FIGS. 3 to 5, which show sequential situations during opening, highlight that the segments 12 in each opening position by way of the lateral faces 16, 18 thereof bear on the adjoining segments 12 and no lateral gap between adjacent segments 12 is generated. The opening 10 created, and becoming ever larger, has the contours of a polygon, as is customary in diaphragms.

As a result of each segment 12 being part of a four bar linkage, the segment 12 has a dedicated, established mechanical control and a dedicated drive impulse that emanates from the first base 20. Jamming of the segments 12 is prevented.

It can also be seen that the slotted track 54 is flat and runs without any identifiable kinks but instead as a slight arc. This ensures optimum force ratios and lever ratios that moreover avoid jamming.

When comparing FIGS. 2 and 5, it can also be seen that the angle of rotation for completely opening and closing the closure mechanism is extremely small such that the actuation stroke of the drive 62 can be minimal. This enables very rapid opening and closing.

In the completely opened state, the first pivoting levers 28 extend approximately along a tangent about the center 14 to a circle through the first pivot bearings 45, whereas the second pivoting levers 30 now run at a steeper incline and approximately along a radial line, wherein the position and orientation of the pivoting levers 28, 30 is always determined in relation to a connecting line between the assigned articulation point 42, 48 and the respective pivot bearing 45, 50.

Figure 6:
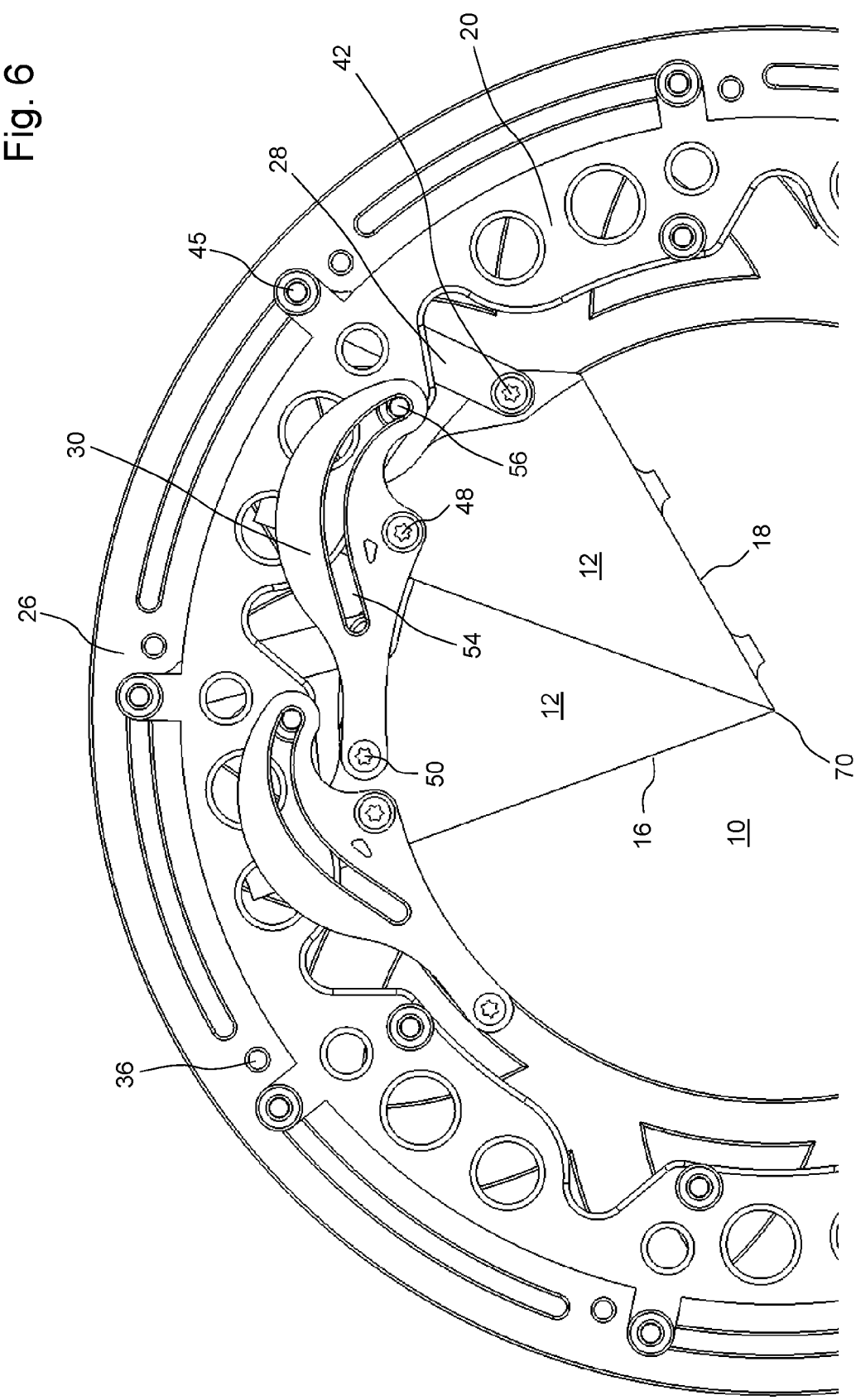
FIG. 6 shows an enlarged partial view of the closure mechanism according to FIG. 2, having the base removed, in which only two segments are illustrated for the sake of clarity, in the closed state.
Figure 7:
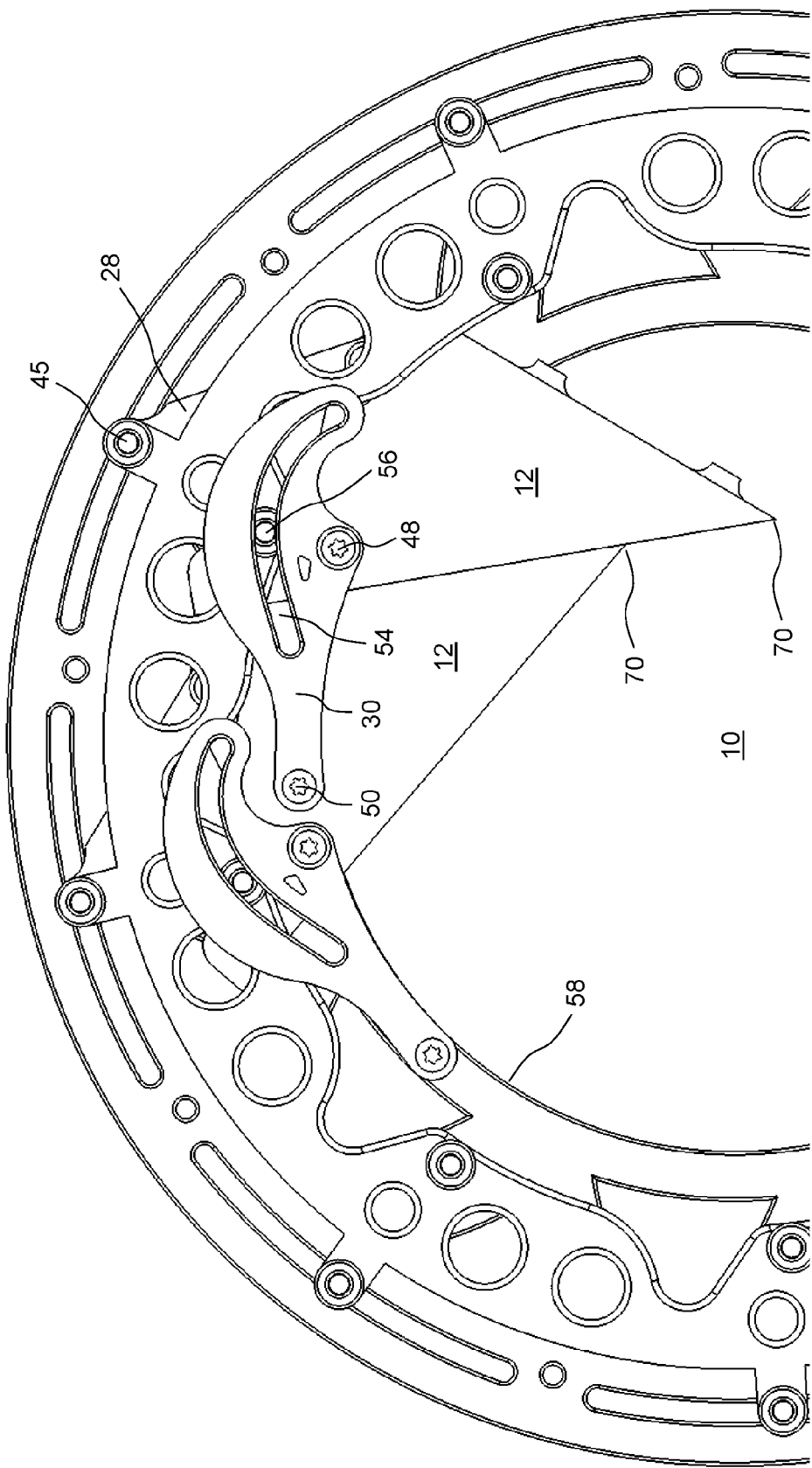
FIG. 7 shows a view corresponding to that according to FIG. 6, only in a more opened state.
Figure 8:
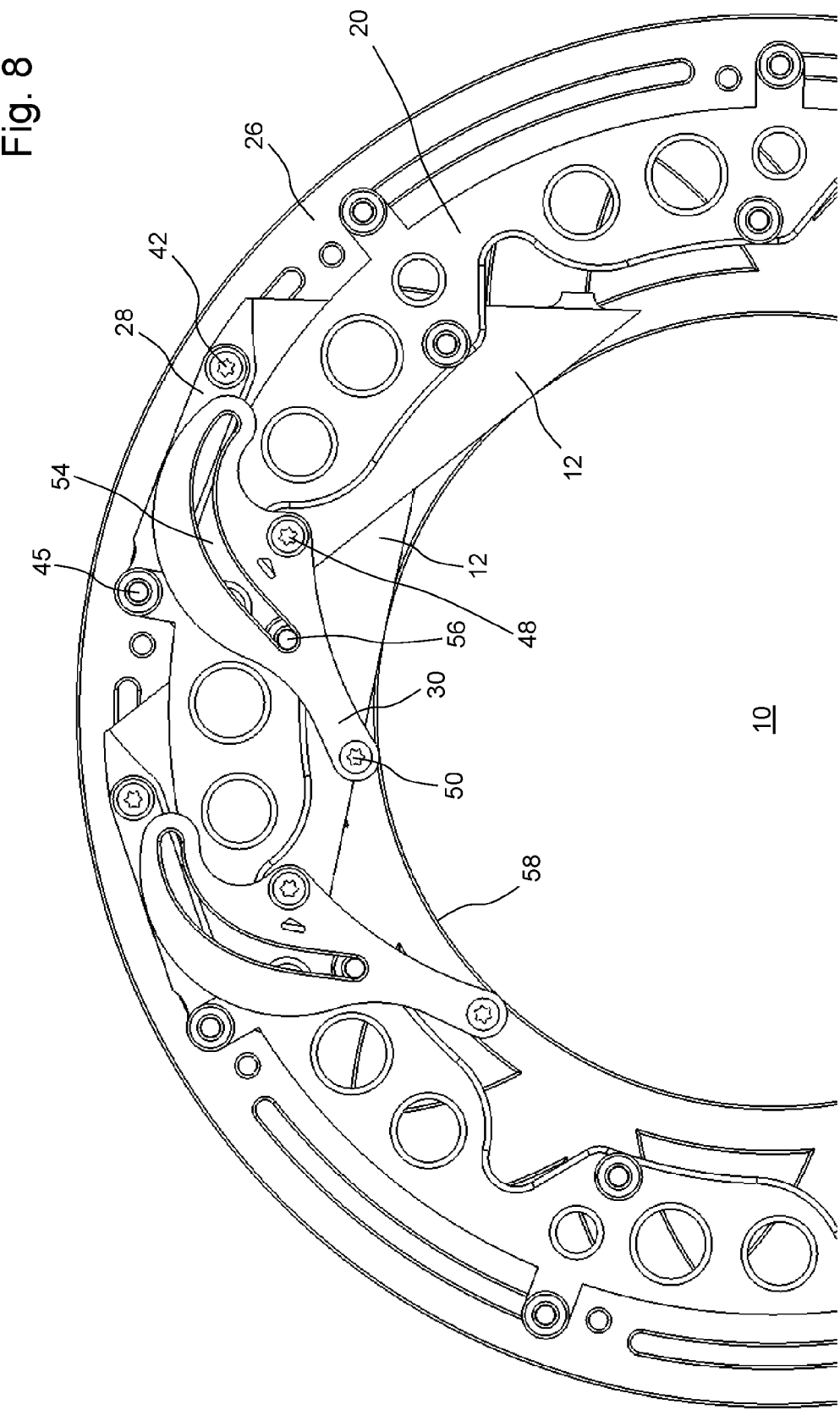
FIG. 8 shows a view corresponding to that according to FIG. 6 of the closure mechanism, only in the completely opened state.

FIGS. 6 to 8 are plan views without the second base 22, on which the movements by means of two segments when the closing mechanism is opened are more easily reproducible.

It can be readily seen in FIG. 8 that all of the segments 12 in the completely opened state lie outside the outer periphery 58 such that the opening 10 is defined by the outer periphery 58. The rotating movement for completely opening here even comprises an angular range of <70°, in particular <35°.

The tips 70 of the substantially triangular segments 12 during the opening procedure move outward on a curved track which inevitably results from the lever mechanism in conjunction with the slotted track 54.

Figure 9:
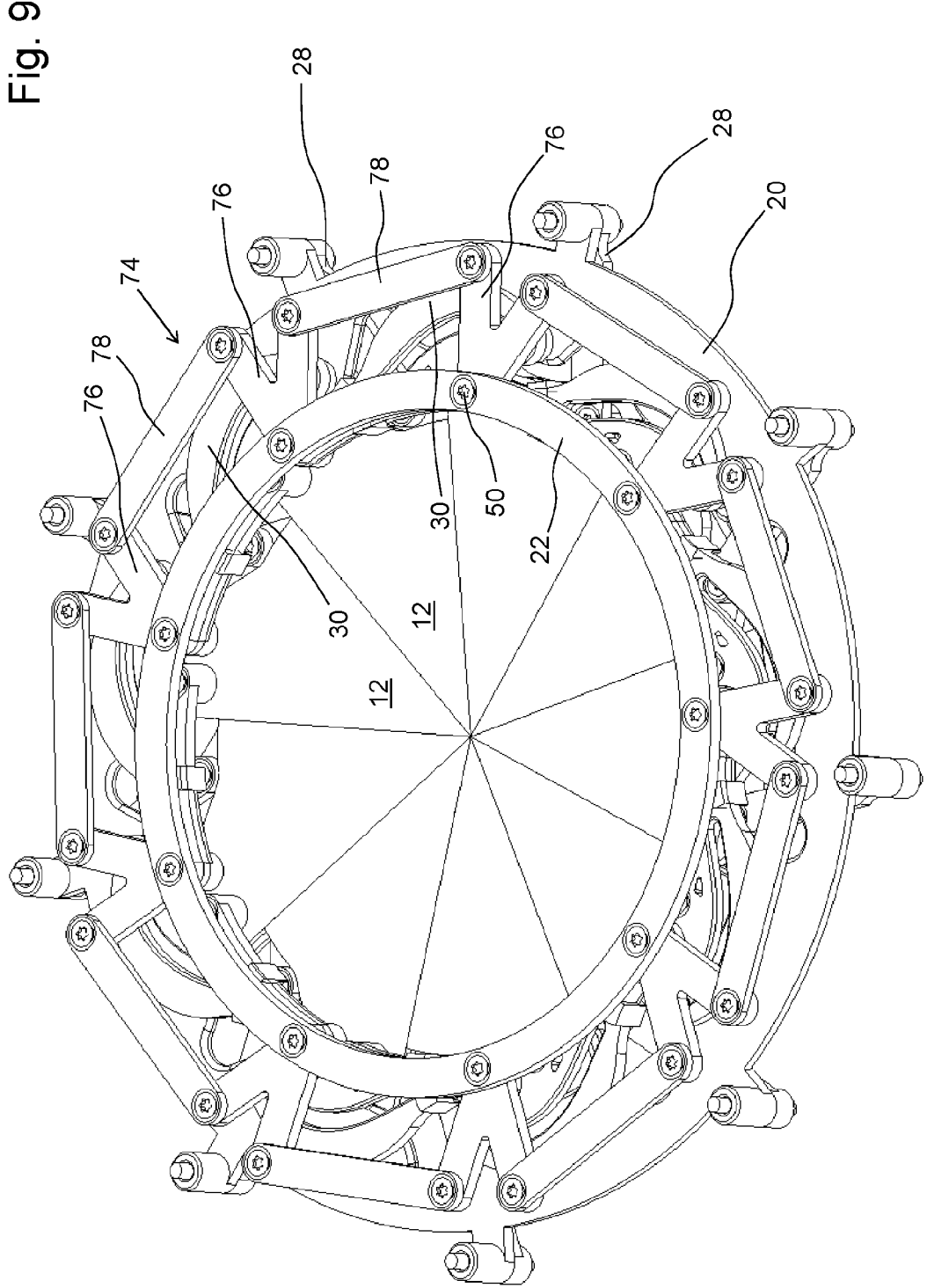
FIG. 9 shows a second embodiment of the closure mechanism, which is of an embodiment similar to that of FIG. 1, having a coupling device for connecting pivoting levers.

The second pivoting levers 30 in FIG. 9 are mechanically connected to one another by way of a coupling device 74. Each second pivoting lever 30 by way of the coupling device is mechanically connected to a second pivoting lever 30 that adjoins the former in front and behind in the circumferential direction such that synchronizing of the movements of the second pivoting levers 30 is performed in addition to the coupling by way of the first base 20.

The coupling device 74 comprises a lever 76 which is integrally molded in the region of the second pivot bearing and can bifurcate in a V-shaped manner, for example. A coupling rod 78 is pivotably attached to the lever 76, which coupling bar 78 runs to a lever 76 which is adjacent in a counterclockwise manner, and is pivotably attached to the lever 76. A second coupling rod 78 runs in a clockwise manner from another arm of the levers 76 to a lever 76 of the second pivoting lever 30 that is adjacent in this direction.

The advantage of this assembly lies in that, owing to the synchronization of the identical first or second pivoting levers 28, 30, a rotary mounting between the first and the second base 20, 22 can be dispensed with because the bases 20, 22 in this assembly are mutually centered as a result of the synchronization. The slotted guides 38 in the shape of segments of circles can thus also be dispensed with.

The coupling device 74 could also be implemented by gear wheels instead of the coupling rod 78, for example, the gear wheels fixedly coupling the second pivoting levers 30 to one another.

Figure 10:
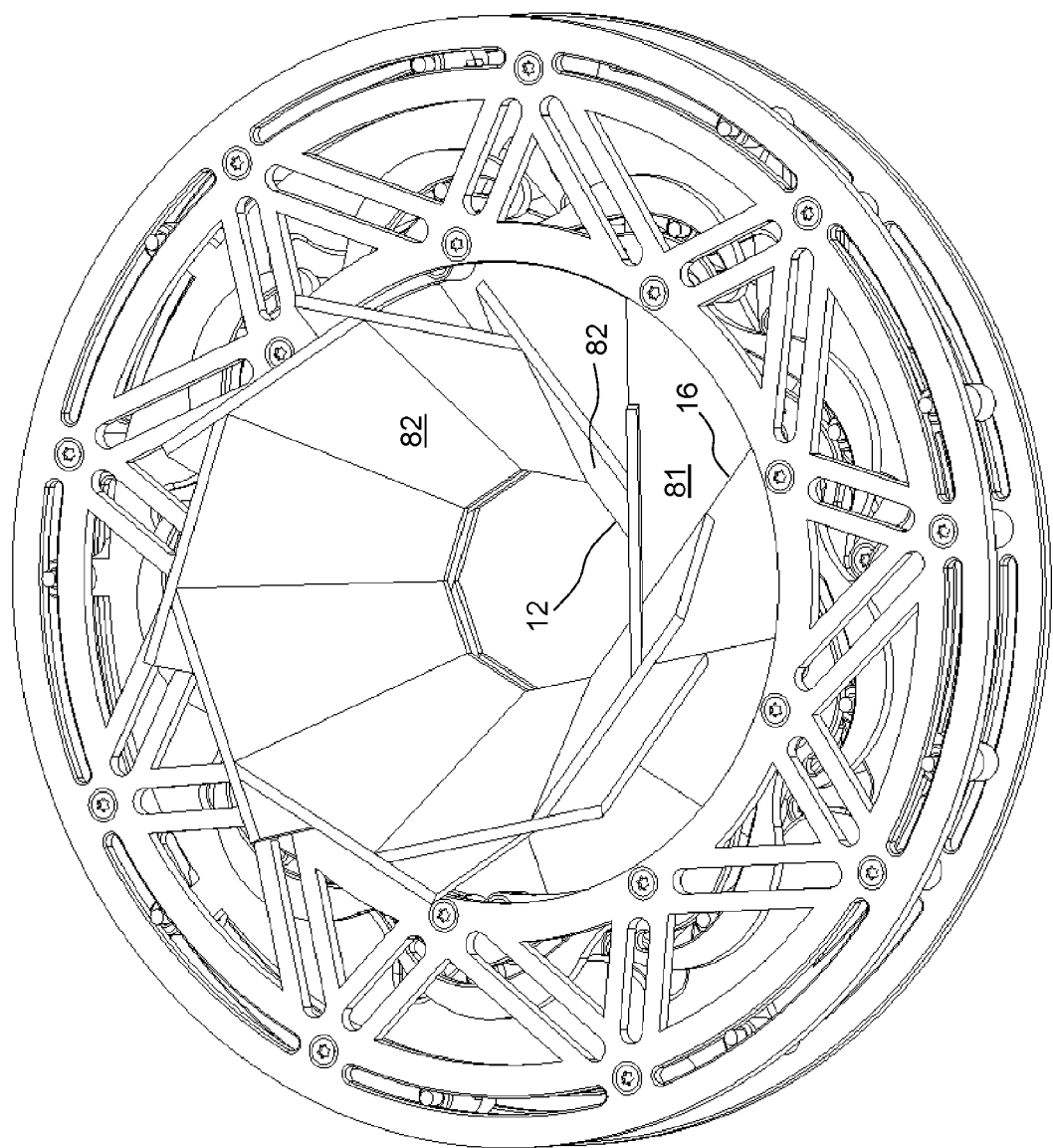
FIG. 10 shows a closure mechanism which is somewhat modified in comparison to the first embodiment, in the partially opened state, and having a funnel-shaped inlet.
Figure 11:
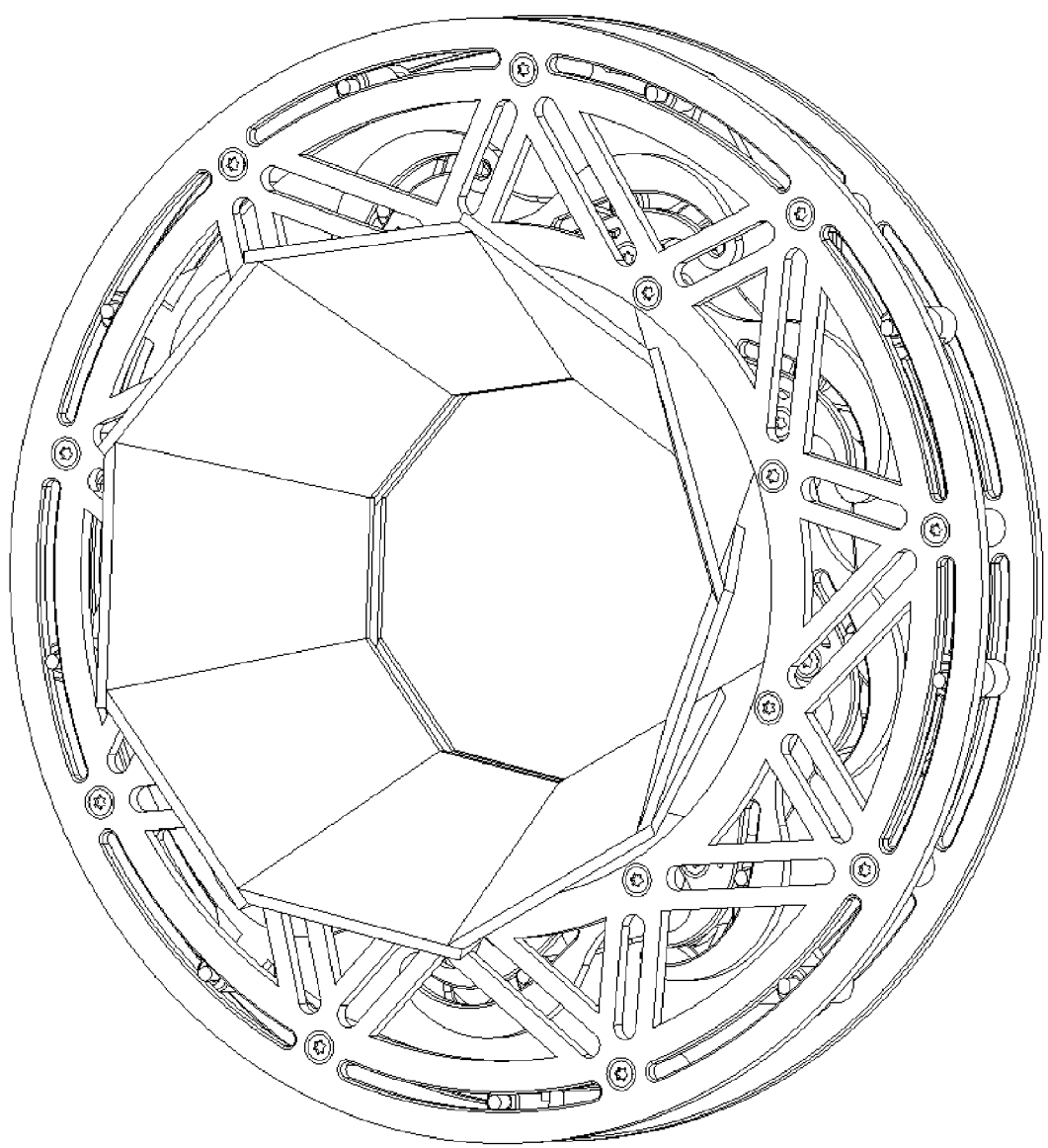
FIG. 11 shows the closure mechanism as per FIG. 10 in a more opened state.
Figure 12:
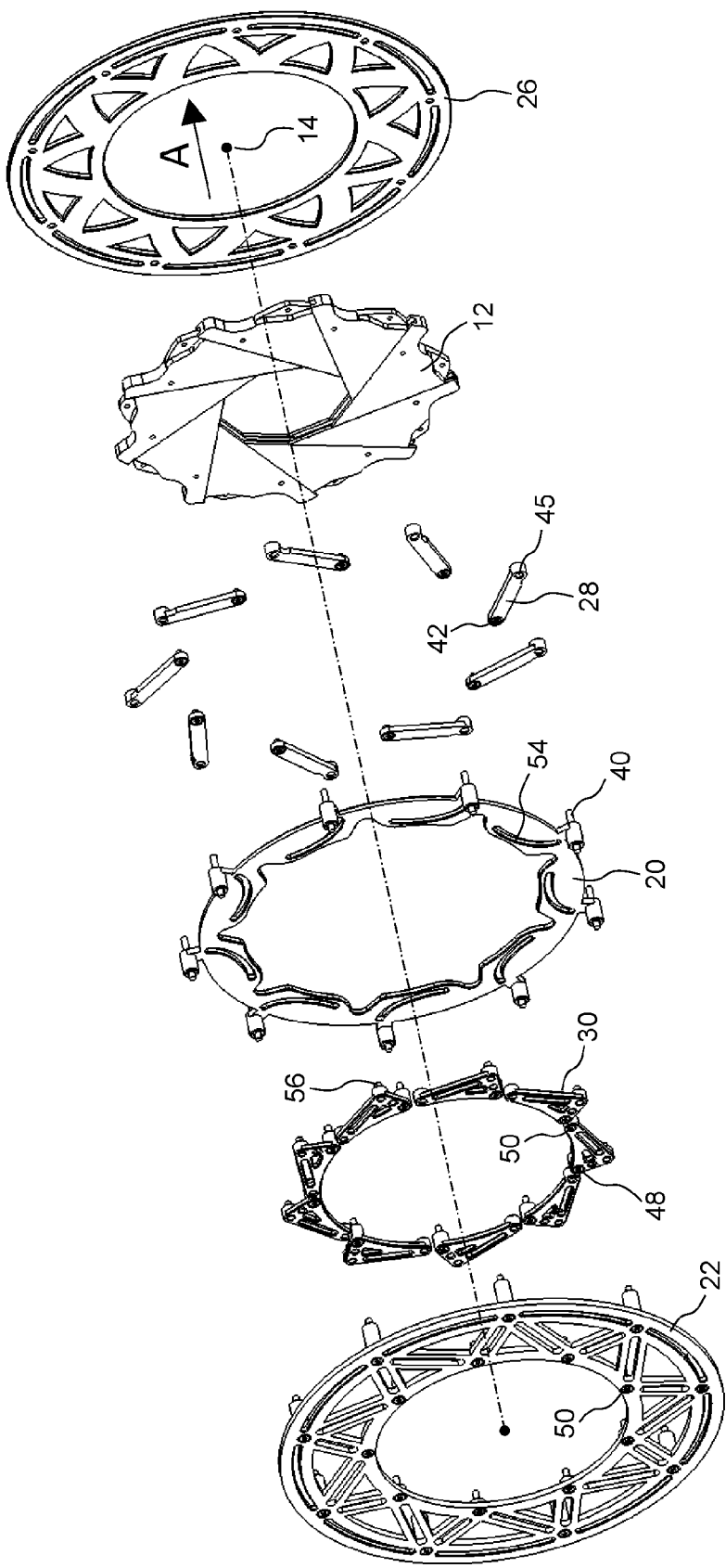
FIG. 12 shows an exploded view of a third embodiment of the closure mechanism according to the invention in the partially opened state.

FIGS. 10 and 11 show a further variant of the invention in which the segments 12, in each case on a lateral face 16, have axially projecting walls integrally molded thereon. These walls extend in the axial direction A, either so as to be parallel to the direction A or slightly obliquely to the latter, wherein the oblique variant is shown in FIGS. 10 and 11. The segments 12 are thus divided into a closure portion 81, which lies in a common plane, and a pipe segment portion 82 attached thereto. Depending on whether these pipe segment portions are exactly aligned in the axial direction A, the pipe segment portions in all of the positions of the segments 12 complement one another so as to form a pipe which is polygonal in the cross section and has a variable cross section or, should the pipe segment portions be slightly oblique, complement one another so as to form a funnel as is shown in FIG. 10. Here too, the funnel has a variable cross section as can be seen from the comparison of FIGS. 10 and 11.

This variant is advantageous in particular when the closure mechanism is used in a plant for filling bulk material. This bulk material flows into the pipe or the funnel from above.

The embodiment as per FIGS. 12 to 15 is based on the embodiment as per FIGS. 1 to 8, wherein a reversal of the motion systems here however takes place in that the slotted track 54 for each segment 12 is not configured in the second pivoting lever 30 but in the first base 20. For this purpose, the second pivoting levers 30 however have in each case one projecting appendage 56 (see FIG. 12) which protrudes into the assigned slotted track 54.

In other respects, the second pivoting levers 30 here too are in each case connected to the segment thereof by way of a second articulation point 48, and by way of a second pivot bearing 50 to the second base 22. The same applies also to the first pivoting levers 28 and the first articulation points 42 thereof, and to the first pivot bearings 45 that connect the first pivot levers 28 to the first base 20.

Figure 13:
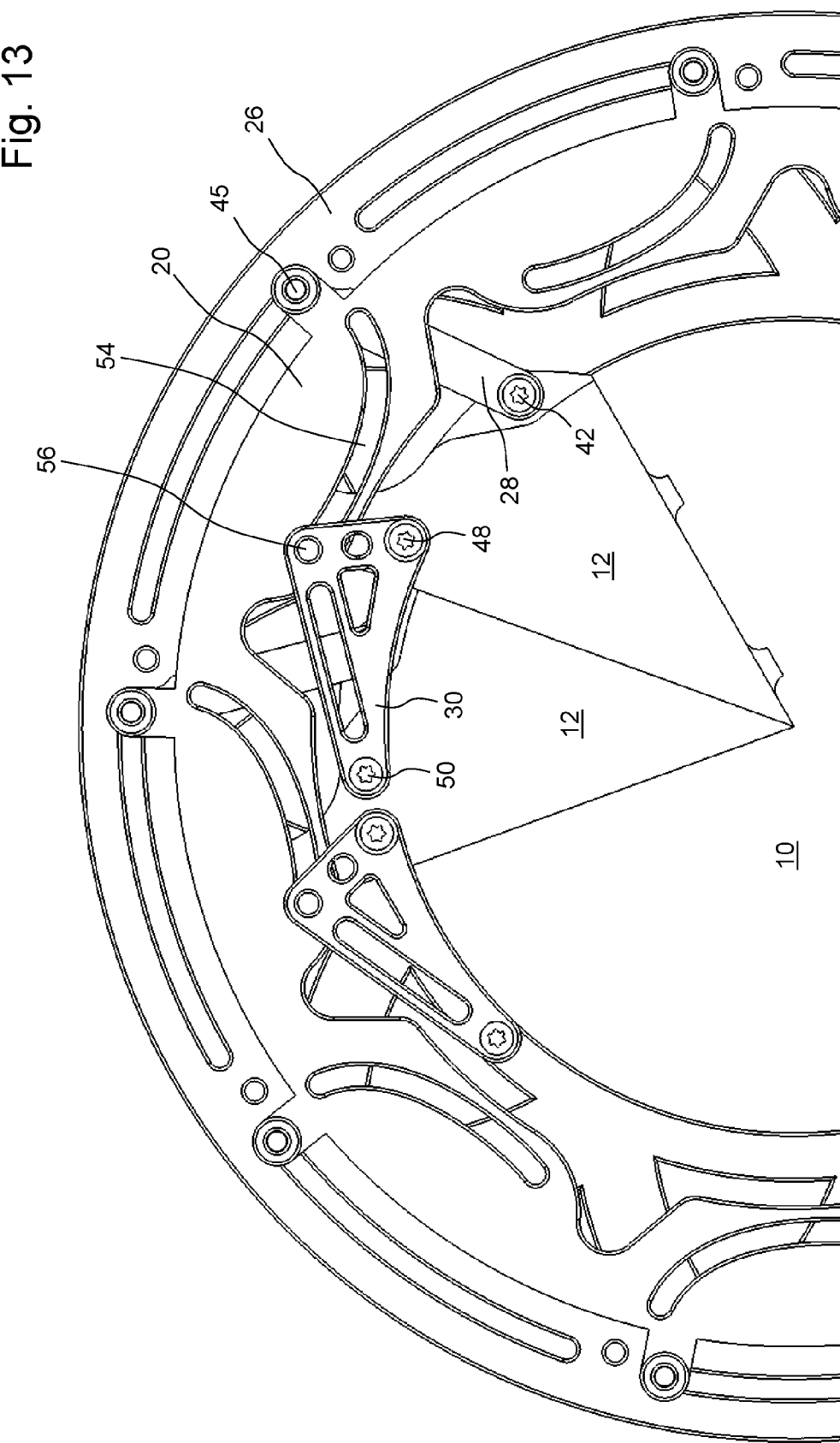
FIG. 13 shows the closure mechanism as per FIG. 12 in a detailed view, having only two segments and an omitted base, in the closed state.
Figure 14:
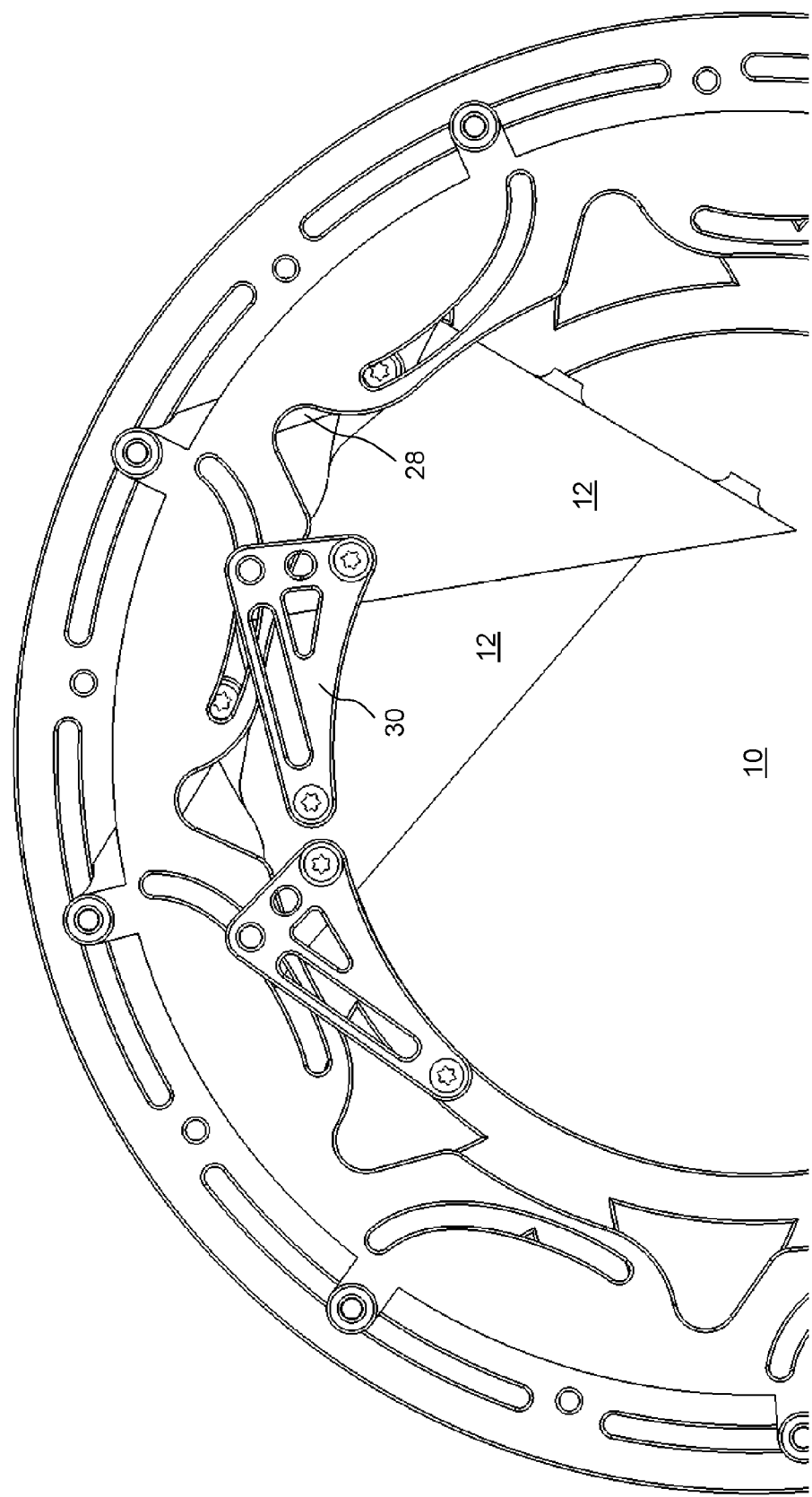
FIG. 14 shows a view of the closure mechanism corresponding to that according to FIG. 13 in the partially opened state.
Figure 15:
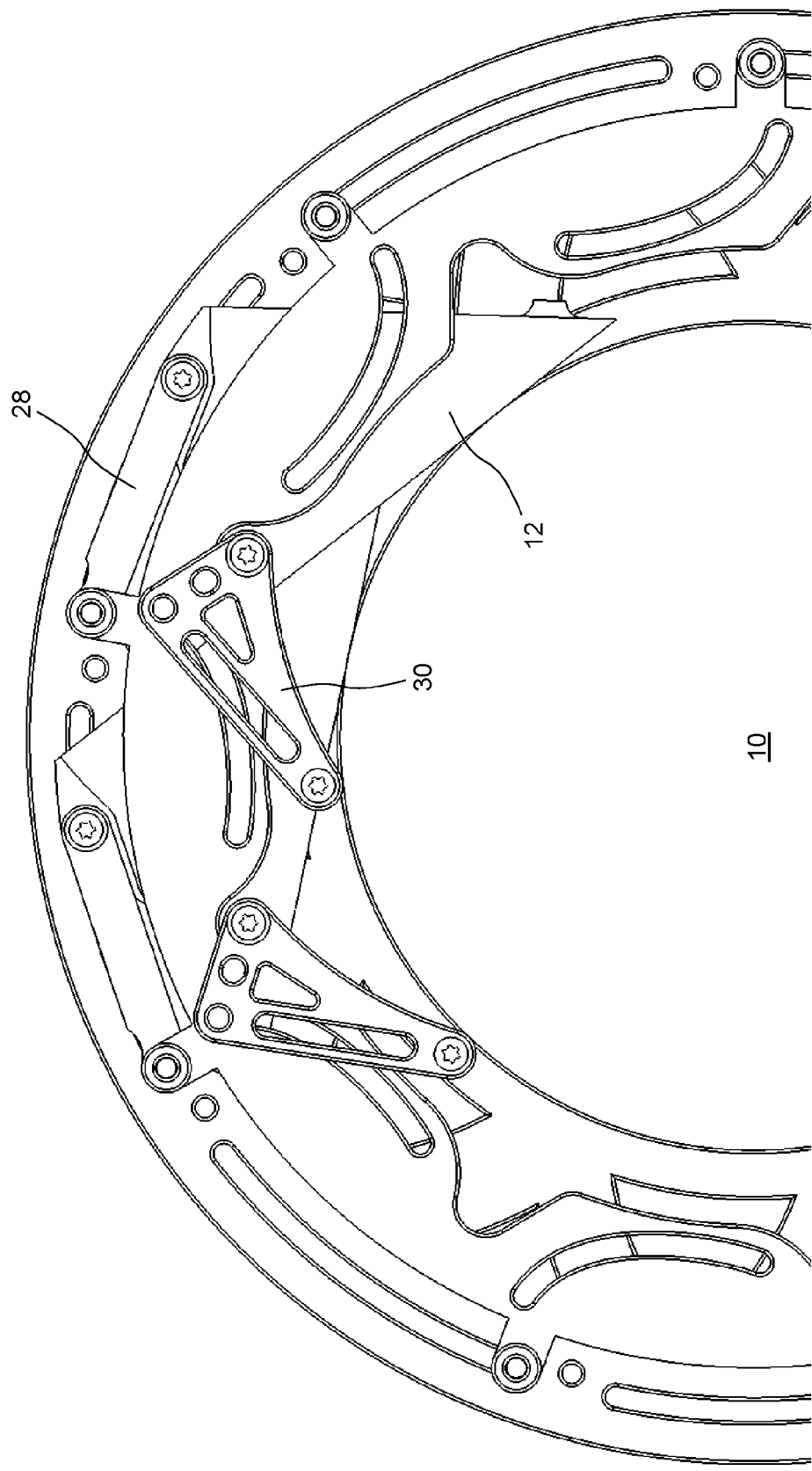
FIG. 15 shows a view of the closure mechanism corresponding to that according to FIG. 13 in the completely opened state.

To be seen in FIGS. 13 to 15 are the motion sequences when rotating the first base 20 relative to the second base 22, this leading to an opening procedure which corresponds to that of the first embodiment as per FIGS. 1 to 8. For the sake of improved clarity, the second base 22 has been omitted while the third base 26 can be seen. Details do not have to be discussed here; all of the advantages and individual features, with the exception of the slotted track 54 and the appendage 56 being swapped, correspond to those of the first embodiment.

Figure 16:
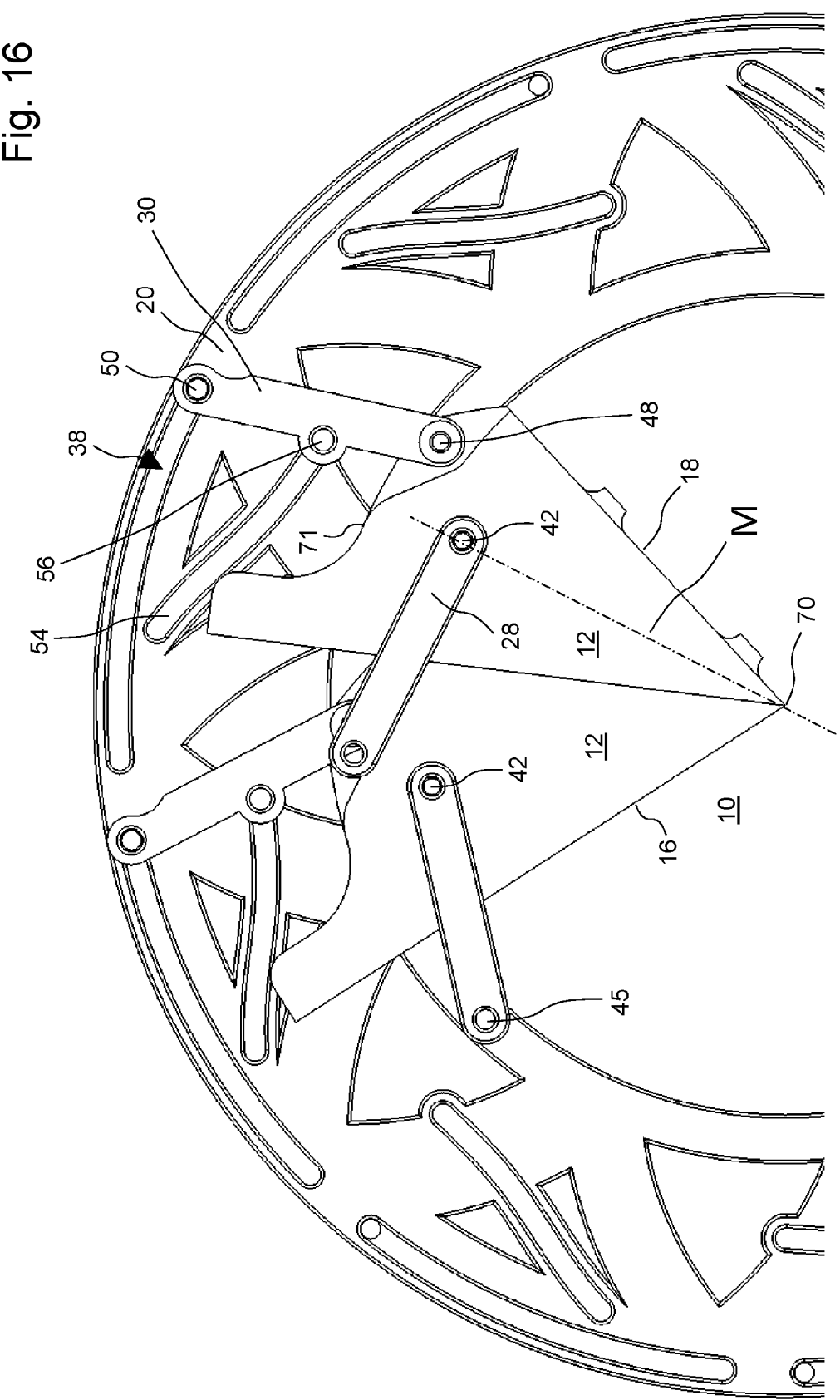
FIG. 16 shows an enlarged view of a closure mechanism according to a fourth embodiment, having two segments and an omitted base, in the closed state.
Figure 17:
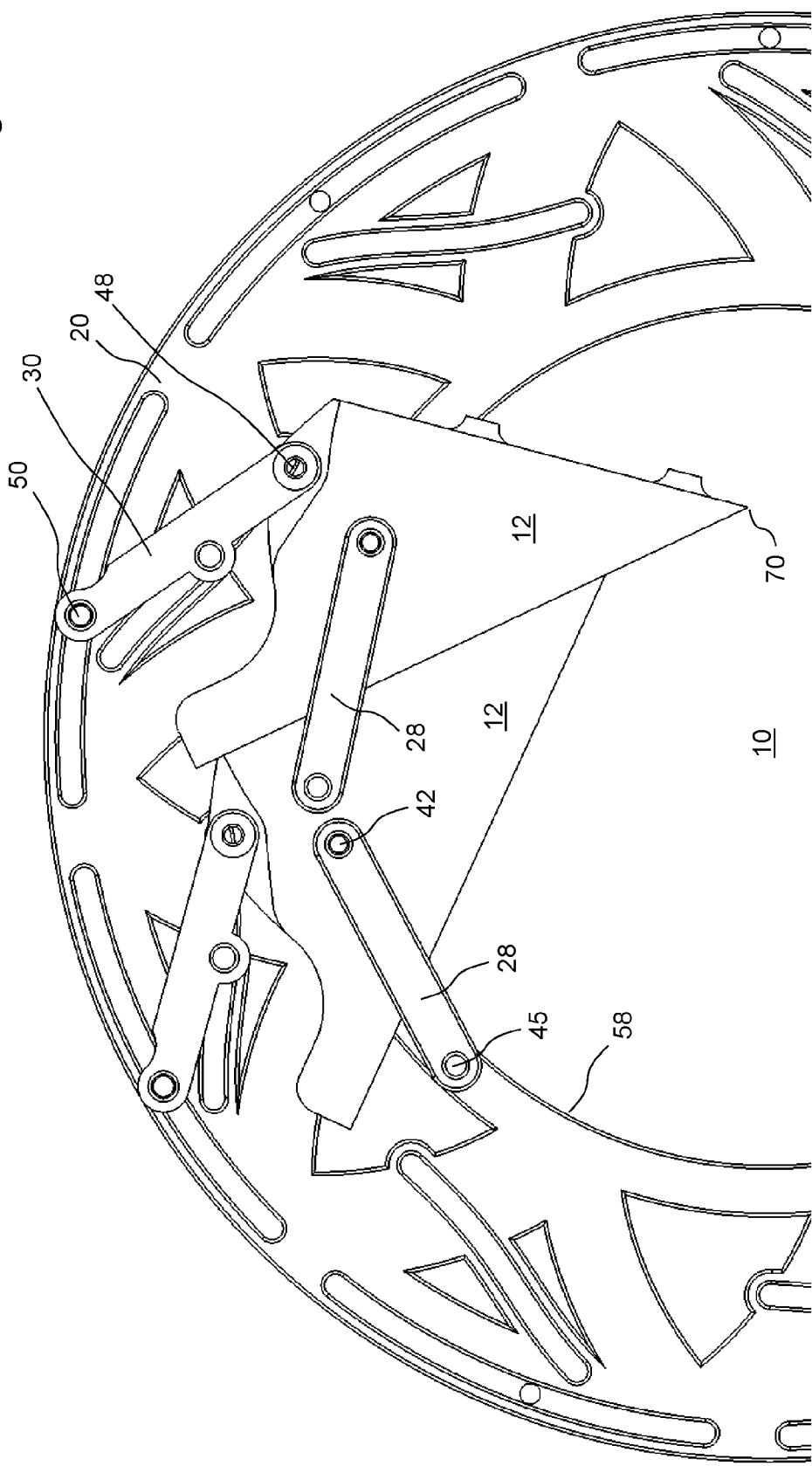
FIG. 17 shows the closure mechanism as per FIG. 16 in a partially opened position.
Figure 18:
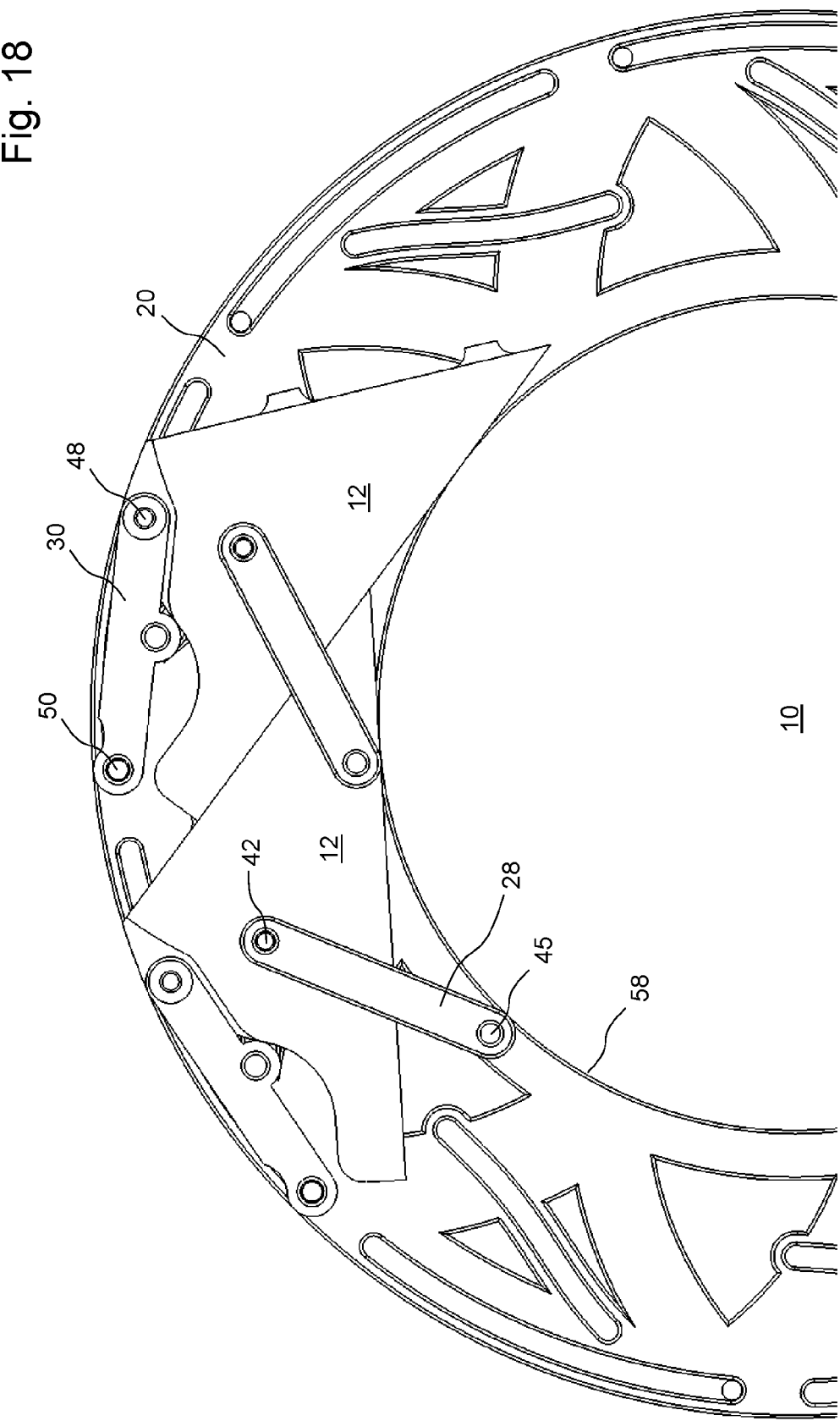
FIG. 18 shows the closure mechanism as per FIG. 16 in a completely opened state.

In the embodiment as per FIGS. 16 to 18, when compared with FIG. 1, each pivoting lever, which in the closed state is at a steeper incline, is coupled to the cam mechanism, whereas the pivoting lever, which previously has been embodied as a slotted lever and in the closed state of the closure mechanism is at a flatter incline, assumes the role of a pure pivoting lever, similar to the pivoting lever 28 in FIG. 1. Furthermore, the slotted track 54 is placed in the ring which in FIG. 1 formed the second base 22, or in that which formed the third base 26.

In terms of the nomenclature, this means that the first and the second pivoting levers 28, 30, as well as the first and the second base 20, 22 are swapped in comparison to FIG. 1. The first base 20 now has the slotted guide 38, i.e. the first and the second base swap their arrangement in comparison to FIGS. 1 and 12. The first base 20 in FIG. 12, which represents the driven part of the closure mechanism, has the slotted tracks 54 for all second pivoting levers 30, wherein these pivoting levers 30 have in each case one appendage 56 that invades the assigned slotted track 54.

The second articulation points 48 of the second pivoting levers 13 now lie in a corner region between the circumferential periphery 71 and the lateral face 18, whereas the first articulation points 42 of the first pivoting levers 28 now run in the region of a centerline M, the latter representing the angle bisector which, proceeding from the tip 70, is between the lateral faces 16, 18.

The first pivot bearings 45 here are mounted on the first base 20. The second base 22, which has been omitted for the sake of enhancing clarity, is presently driven and moves the second pivot bearings 50. It can again be seen here too that the slotted track 54 has a very slight curvature and a flat angle relative to a tangent to the circle through the appendage 56, such that jamming is prevented and a very positive wedge effect is moreover achieved in the movement of the second base 22 in the circumferential direction. The different opening steps and motion paths of the segments 12 are derived from the comparison of FIGS. 16 to 18.

Figure 19:
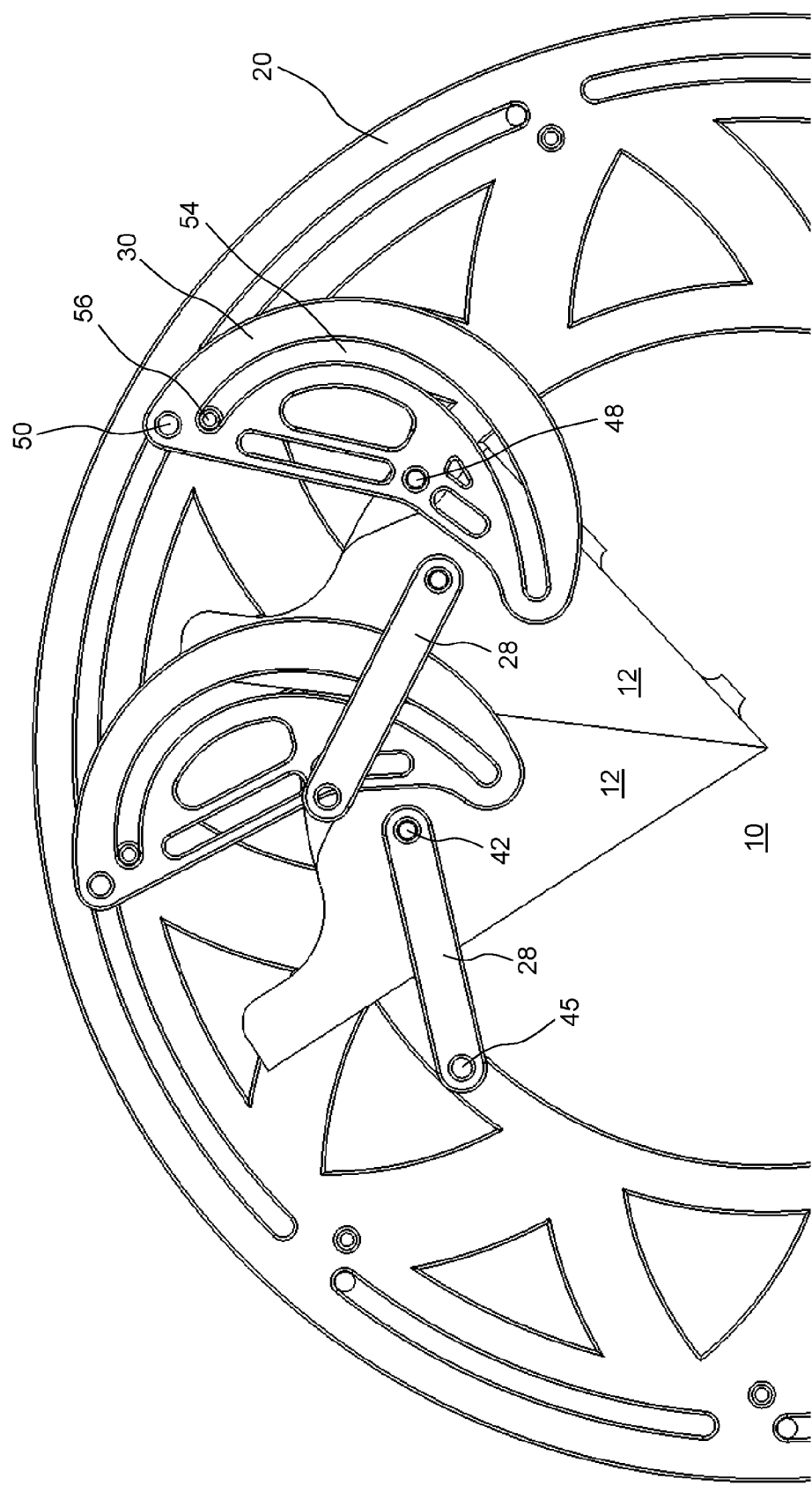
FIG. 19 shows a fifth embodiment of the closure mechanism according to the invention, having two segments and an omitted base, in the completely closed state.
Figure 20:
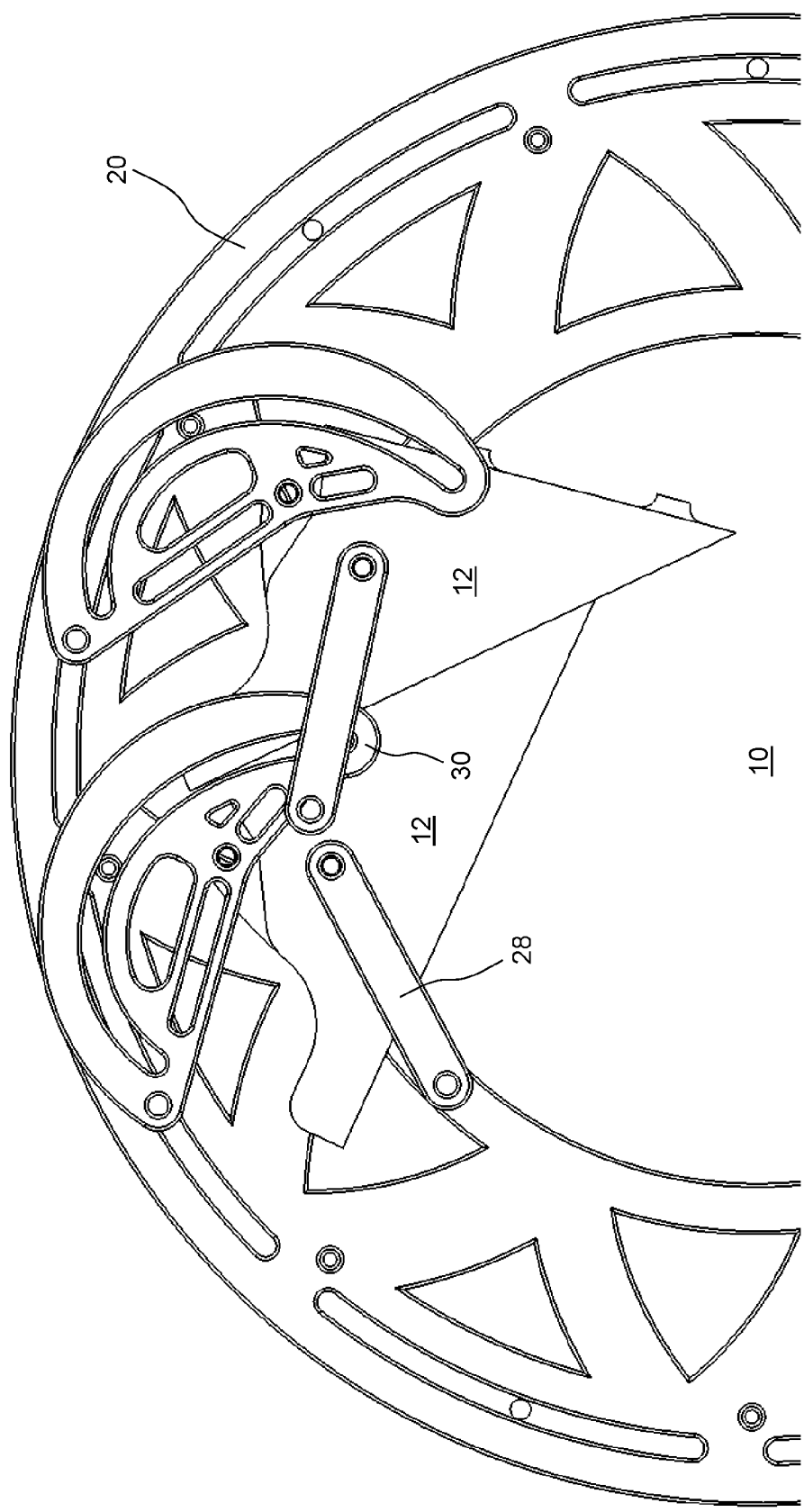
FIG. 20 shows the closure mechanism as per FIG. 19 in a partially opened state.
Figure 21:
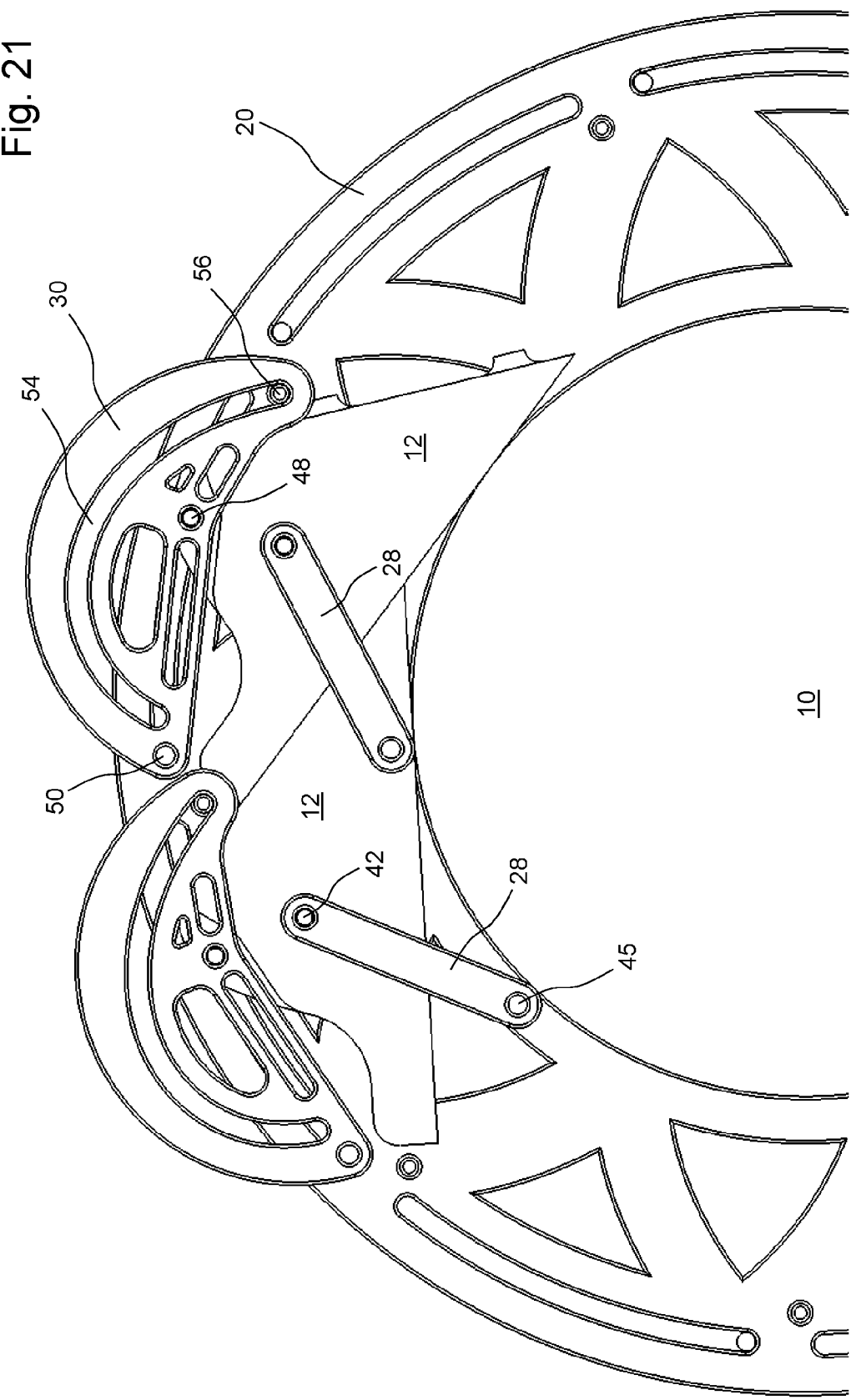
FIG. 21 shows the closure mechanism as per FIG. 19 in a completely opened state.

The embodiment as per FIGS. 19 to 21 corresponds substantially to that as per FIGS. 16 to 18, wherein here the slotted track 54 is yet again configured in the pivoting lever 30. However, as opposed to the embodiment as per FIGS. 1 to 8, the pivoting lever 30 here too is that pivoting lever that in the closed state is at a steeper incline and thus closer to the radial.

FIGS. 22 to 25 show a special variant in which the adjacent segments 12 in the region of the lateral faces 16, 18 thereof interlock in order to permanently couple the segments to one another in the axial direction A and to additionally initiate an optimum sealing effect. In the following embodiment, each segment 12 on a lateral face 16, proceeding from the tip 70, has a convexity 80 which extends only across part of the axial height. In terms of FIG. 22 this means that a planar portion of the lateral face 16, which is linear in the plan view, is also present above and below the convexity 80.

This linear and planar portion above and below the convexity 80 extends from the tip to the opposite end 83, for example.

The convexity 80 extends across the planar portion of the segment which in the closed state, when viewed in the axial direction A, closes the opening 10, the convexity 80 then running back to the planar portion of the lateral face 16 again.

Depending on the specific application and on the adaptation of the closure mechanism, the convexity 80 can have different thicknesses (i.e. maximum spacings from the planar portion of the lateral face 16) and/or lengths and contours. There are likewise embodiments in which the convexity 80 at the radially front and rear end projects from the planar portion of the lateral face 16 to a dissimilar extent. For example, a residual thickness can still be maintained on the radially outer end of the convexity 80, this residual thickness corresponding to the desired mutual spacing of the lateral faces 16 and 18 and being advantageous for the design of a sealing system.

The opposite lateral face 18 of each segment has a concavity 84 which is complementary to the convexity 80 and in the closed state invades the convexity 80. Here too, a planar portion of the lateral face 18, which is linear in the plan view and from the tip 70 extends completely radially outward, for example, is still present above and below the concavity 84.

The lateral face 18, above and below the concavity, that is to say on both sides of the concavity 84 in the axial direction A close to the tip 70 has guide cams 86 which project in the circumferential direction, the spacing of which being marginally greater than the axial thickness of the convexity 80.

Proceeding from the location of the convexity 80 that projects the farthest in the circumferential direction, an integrally molded guide web 88 which transitions to the convexity 80 extends radially outward, the guide web 88 being positioned approximately in the axial center of the convexity 80 and having a lesser thickness than the convexity 80. This guide web 88 can even run to the end 83.

Each segment 12 in the region of the tip 70, at the axial height of the linear guide web 88, is provided with a tip-proximal groove 90, the axial height of the latter being marginally larger than the axial height of the guide web 88. Accordingly, the tip-proximal groove 90 also extends into part of the convexity 80.

The convexity 80 and the concavity 84, and the guide web 88 and the tip-proximal groove 90, cooperate in each case in pairs so as to achieve axial coupling of the segments, on the one hand, and a sealing effect during the opening movement, on the other hand, as is explained hereunder.

A depression 92, into which an assigned guide cam 86 of the adjacent segment 12 can in each case plunge, is also present above and below the convexity 80 in the lateral face 16.

Clearances 94, which in radial terms are significantly longer than the guide cams 86 are furthermore likewise present radially outside and after the convexity 80, so as to be above and below the guide web 88, the guide cams being able to invade the clearances 94 when the segments are in the opened state. This will be discussed by means of the figures hereunder during the opening procedure.

In the closed state, the convexities 80 lie in the complementary concavities 84 of the adjacent segment 12, and the guide cams 86 lie in the depressions 92. A groove 96 is provided in the concavity 84, approximately in the center and at the axial height of the guide web 88, the guide web 88 likewise being able to be received in the groove 96 in the closed state and during the opening movement, such that no gap which would offer a view therethrough in the axial direction can arise even in the radially outer region between adjacent segments 12.

Figure 23:
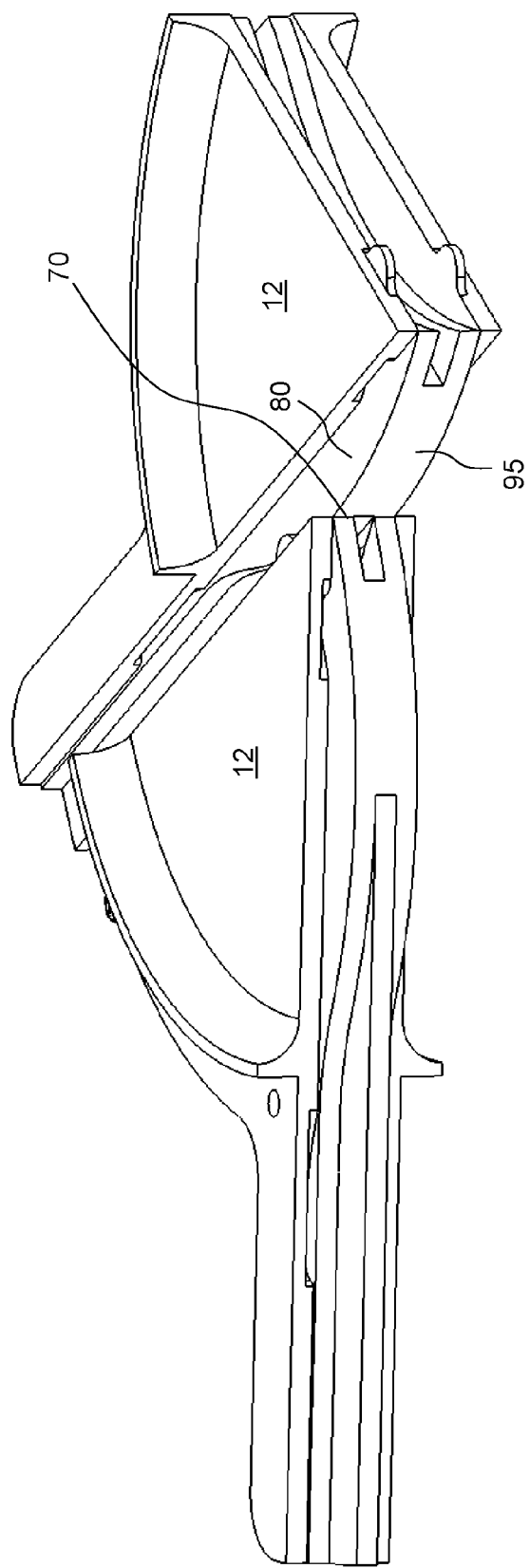
FIG. 23 shows a view of the segments corresponding to that according to FIG. 22, in the partially opened state of the closure mechanism.
Figure 24:
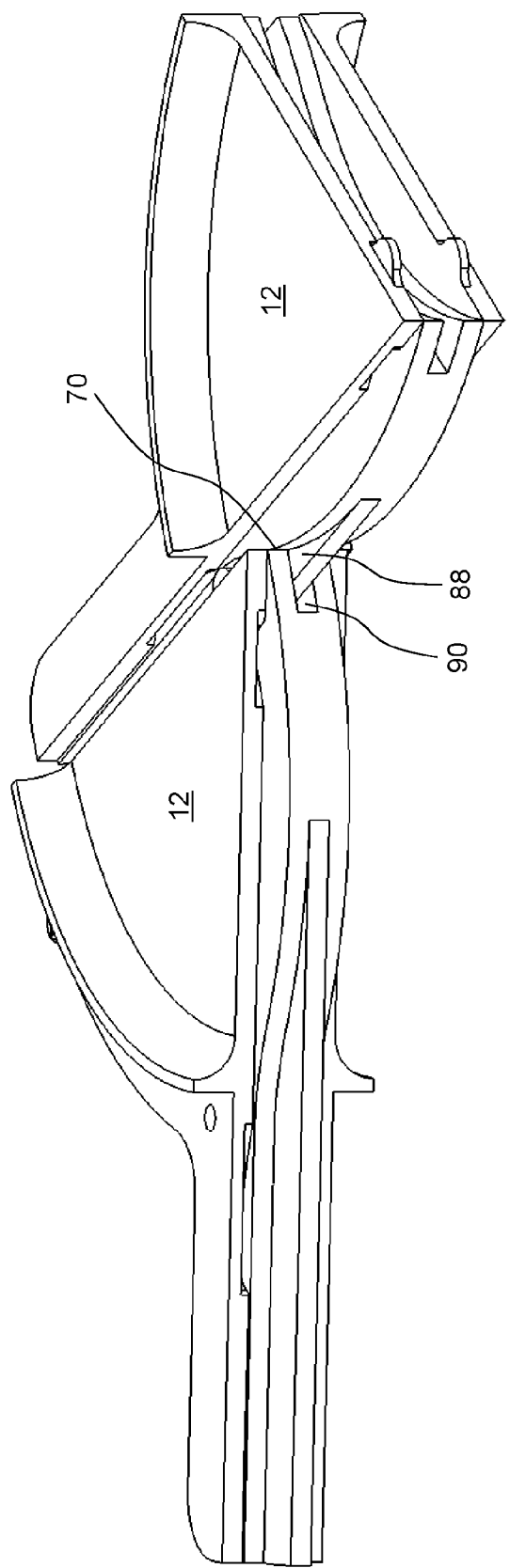
FIG. 24 shows the segments according to FIG. 22 in an even more opened state of the closure mechanism.

Depending on the control curve, it can arise during the opening procedure that the tip 70 is not moved along the planar portion of the adjacent lateral face 16 but along a resultant curve which is exactly implemented by the convexity 80 in the relative coordinate system of the adjoining segment 12. The tip 70 thus travels along the external face 95 of the convexity 80, as can be seen in FIG. 23. The guide cams 86 therebetween receive the convexity 80 in the process, largely without play in the axial direction. No gap arises between the segments 12 when the segments are viewed in the axial direction A. In this instance, when a segment 12 by way of the tip thereof has been moved radially outward in the circumferential direction, so as to be most remote from the planar portion of the lateral face 16, the guide web 88 invades the groove 90, as can be seen in FIG. 24. The tip 70 continues to be very close to the shell face of the convexity 80, or is even in contact with the latter.

Figure 25:
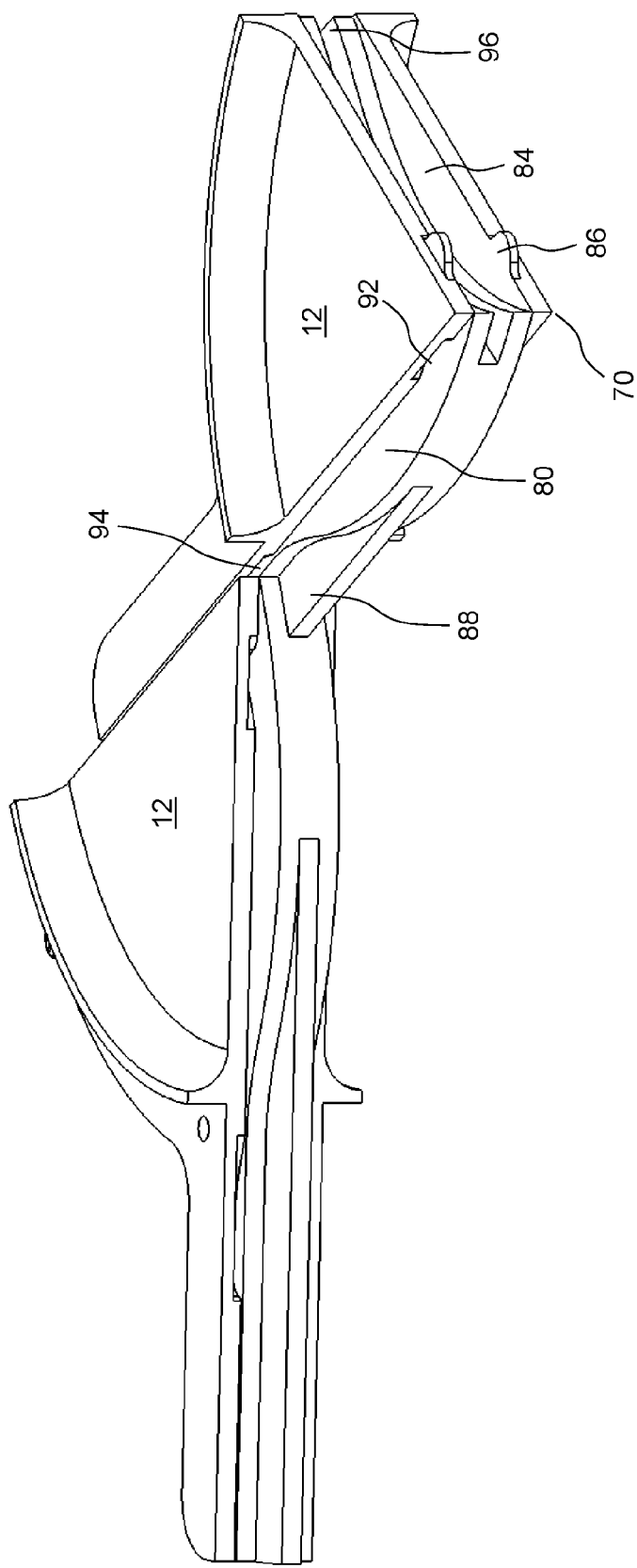
FIG. 25 shows the segments according to FIG. 22 in the completely opened state of the closure mechanism.

When the tip 70 has moved along the adjacent segment 12 so far that the tip 70 lies beyond the convexity 80, as is shown in FIG. 25, the guide web 88 as before is received in the groove 90 and the groove 96, on the one hand, and each guide cam 86 can plunge into the long clearance 94, on the other hand, as is indicated in FIG. 25. The grooves 90 and 96 may have different depths.

The guide cams 86 in the closed state optionally also serve as a centering appendage, and the depressions 92 can also be considered to be clearances which are complementary to the latter, wherein there is yet another embodiment to this end, which will be explained later in conjunction with FIGS. 28 to 30.

Figure 26:
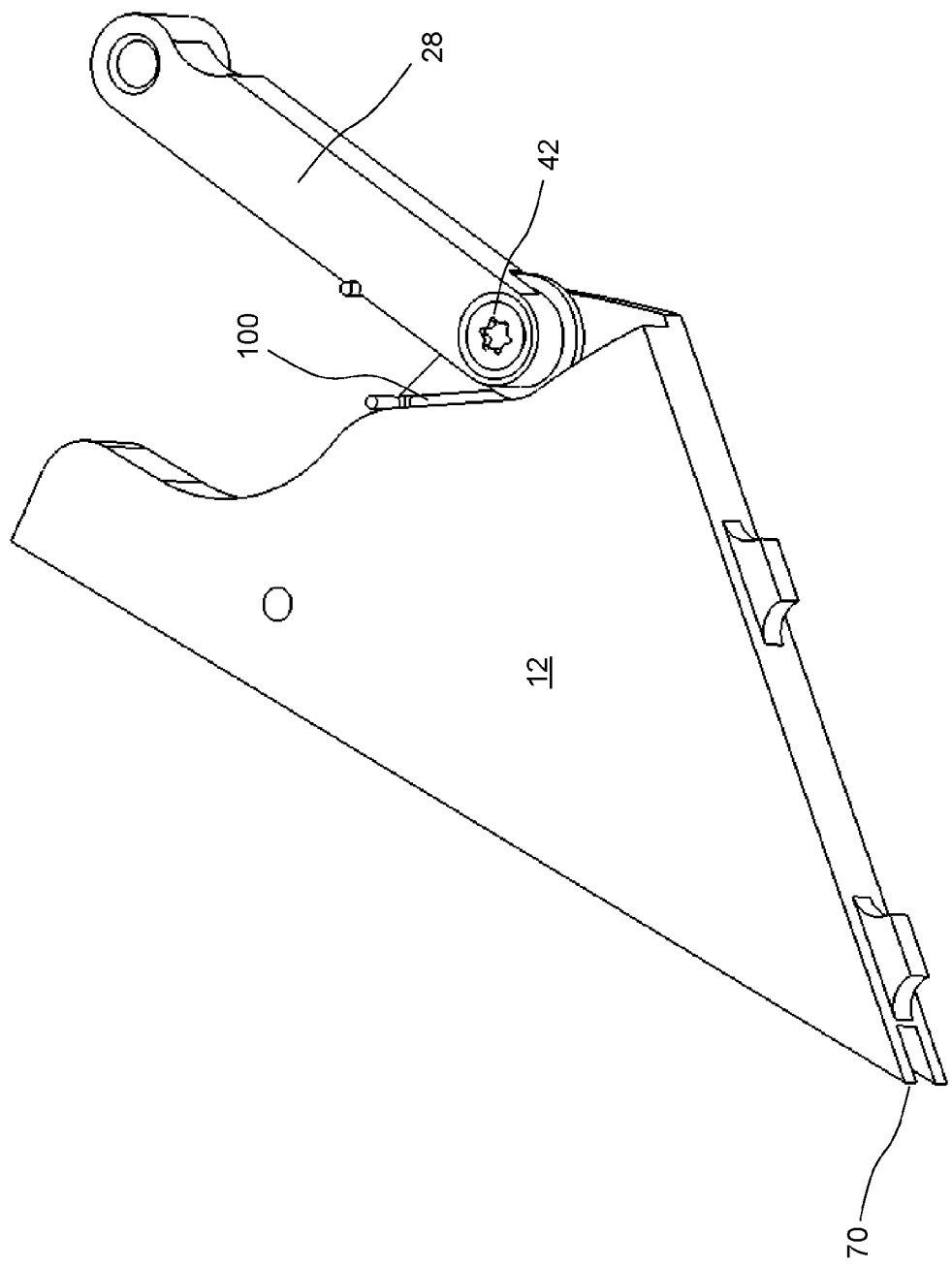
FIG. 26 shows a perspective view of a segment which by way of a torsion spring is impinged with a force.

A preloading device, for example a torsion spring 100, as is illustrated in FIG. 26, can be provided for preloading the segments 12 in one direction. The torsion spring 100 is provided on one of the articulation points 42, 48, here on the articulation point 42, and causes the segment 12 to be braced toward the associated pivoting lever, here the pivoting lever 28.

The background to this is that slight lifting of the tip 70 of the segments 12 from the respective adjoining lateral faces of the respective adjacent other segment 12, such as may arise as a result of manufacturing-related play or tolerances in the joints, for example, is not desirable in many specific applications and can be reduced or entirely avoided by preloading.

Figure 22:
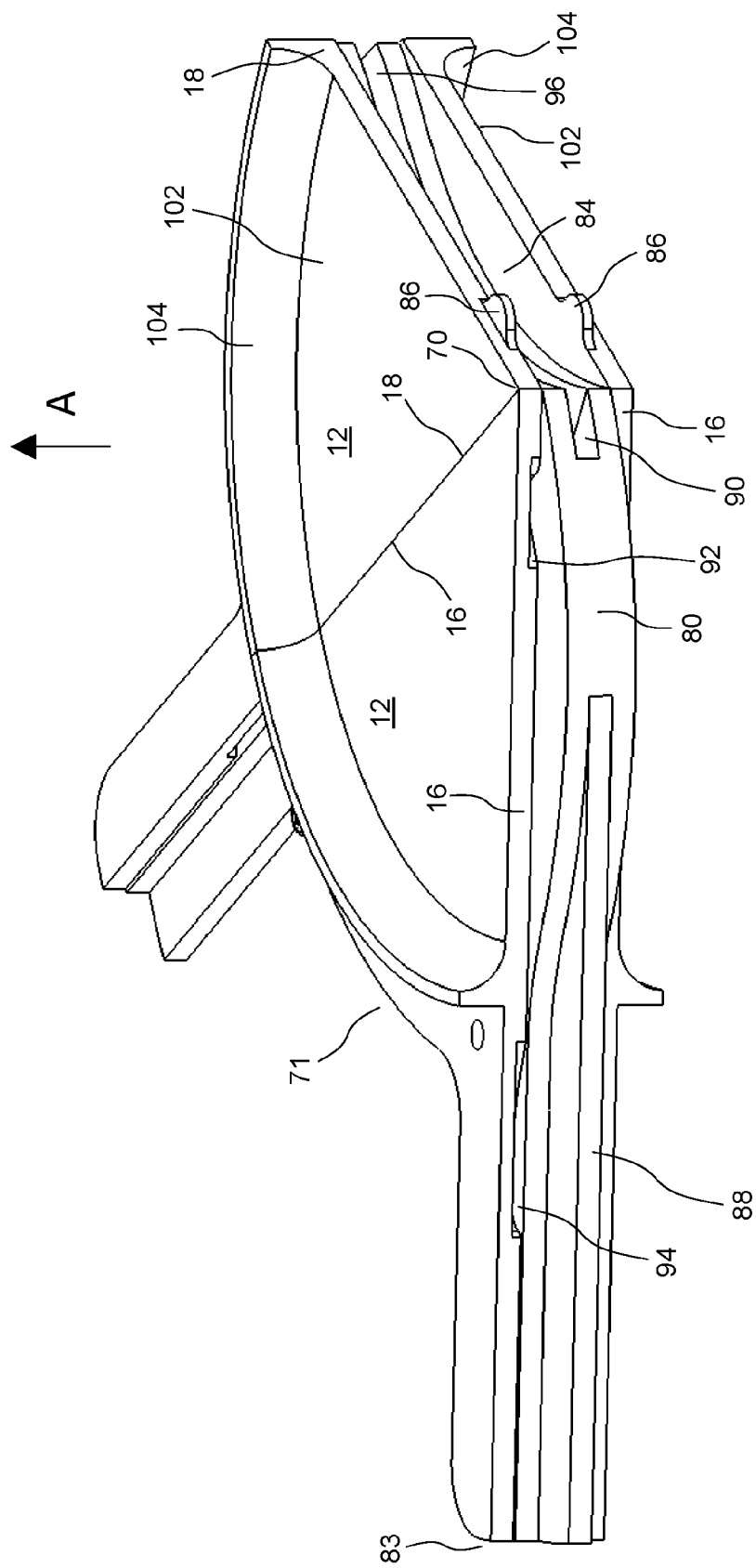
FIG. 22 shows a perspective view of two adjacent segments of the closure mechanism according to the invention, for illustrating a sealing system, in the closed state.

In the embodiment as per FIG. 22 it can also be seen that the segments 12 on the outer circumferential periphery 71 thereof, at least in one axial end face, here on the opposite axial end faces 102, have projecting peripheries 104 which are portions of segments of circles. These peripheries 104 in the closed state complement one another so as to form a closed, encircling, circular annular appendage.

Figure 27:
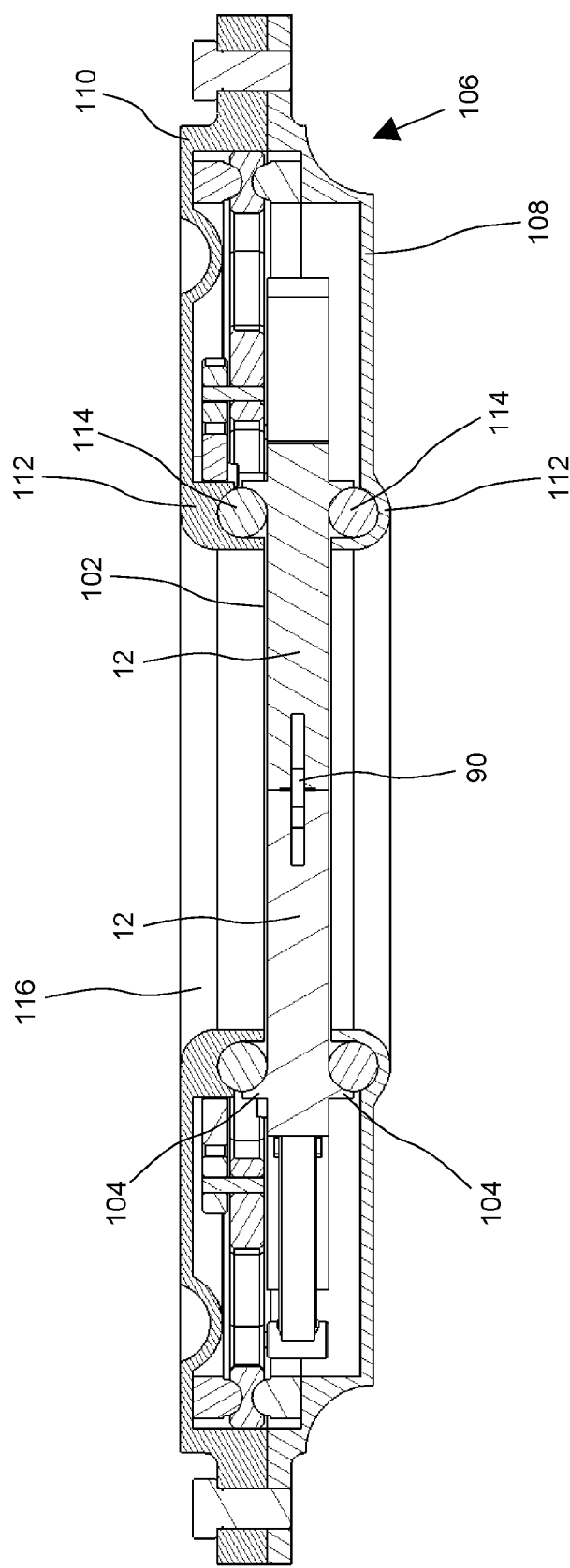
FIG. 27 shows a sectional view in a plane comprising the central axis, when the closure mechanism is installed in a housing and is in the closed state.

The closure mechanism is usually installed in a housing 106, see FIG. 27. The housing 106 has a bore 116 which is in alignment with the opening 10. The housing 106 in this embodiment is embodied having two shells 108, 110. The housing 106 can be, for example, a wall, or part of a plate, of an apparatus, of an industrial plant, of a container or of a line in which the closure mechanism is to operate. The shells 108, 110 surround the first, the second and the third base 20, 22, 26 and on the radially inner periphery also extend inward beyond the projecting peripheries 104 so as to in the axial direction ultimately get very close to the end faces 102 of the segments. When viewed in the cross section, this results in an L-shaped sealing periphery 112 which on each shell 108, 110 receives an annular seal 114.

In the closed state of the closure mechanism, the projecting peripheries 104 press against the assigned annular seal 114 and seal the closure mechanism in relation to the housing 106.

Figure 28:
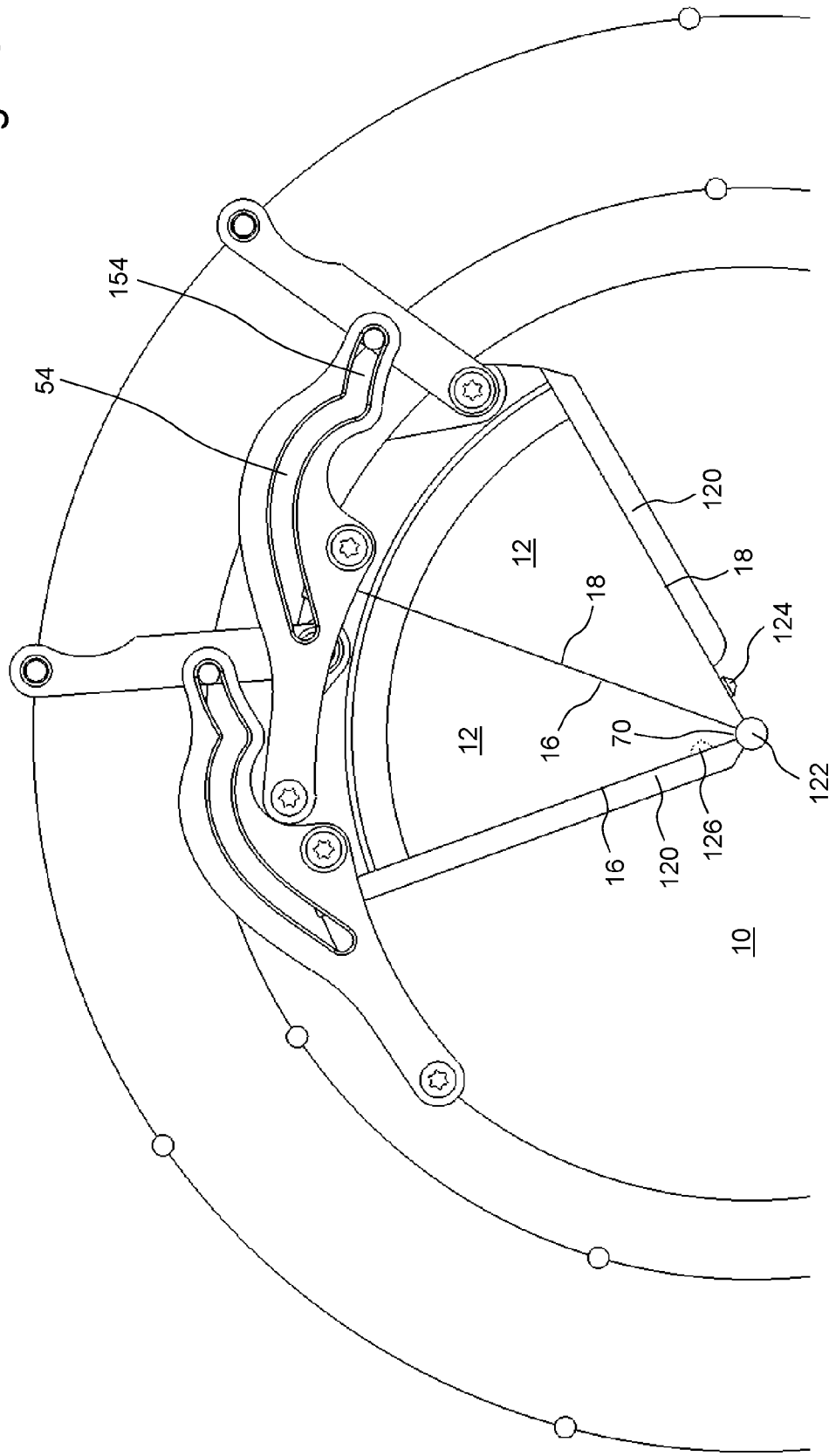
FIG. 28 shows an enlarged view of the closure mechanism according to the invention and according to a sixth embodiment, having two segments and an omitted base, in the closed state.
Figure 29:
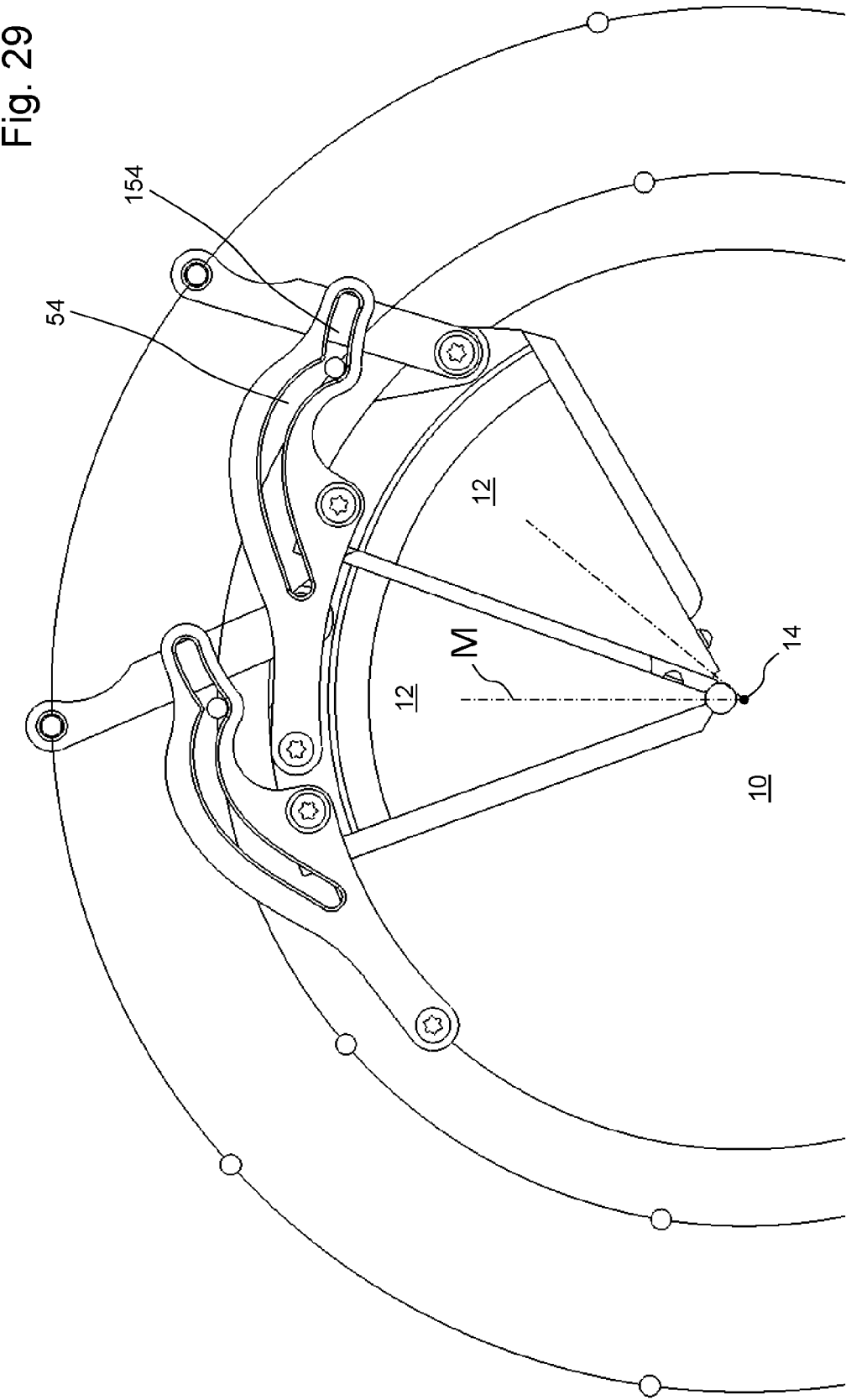
FIG. 29 shows the closure mechanism as per FIG. 28 in the somewhat opened state.
Figure 30:
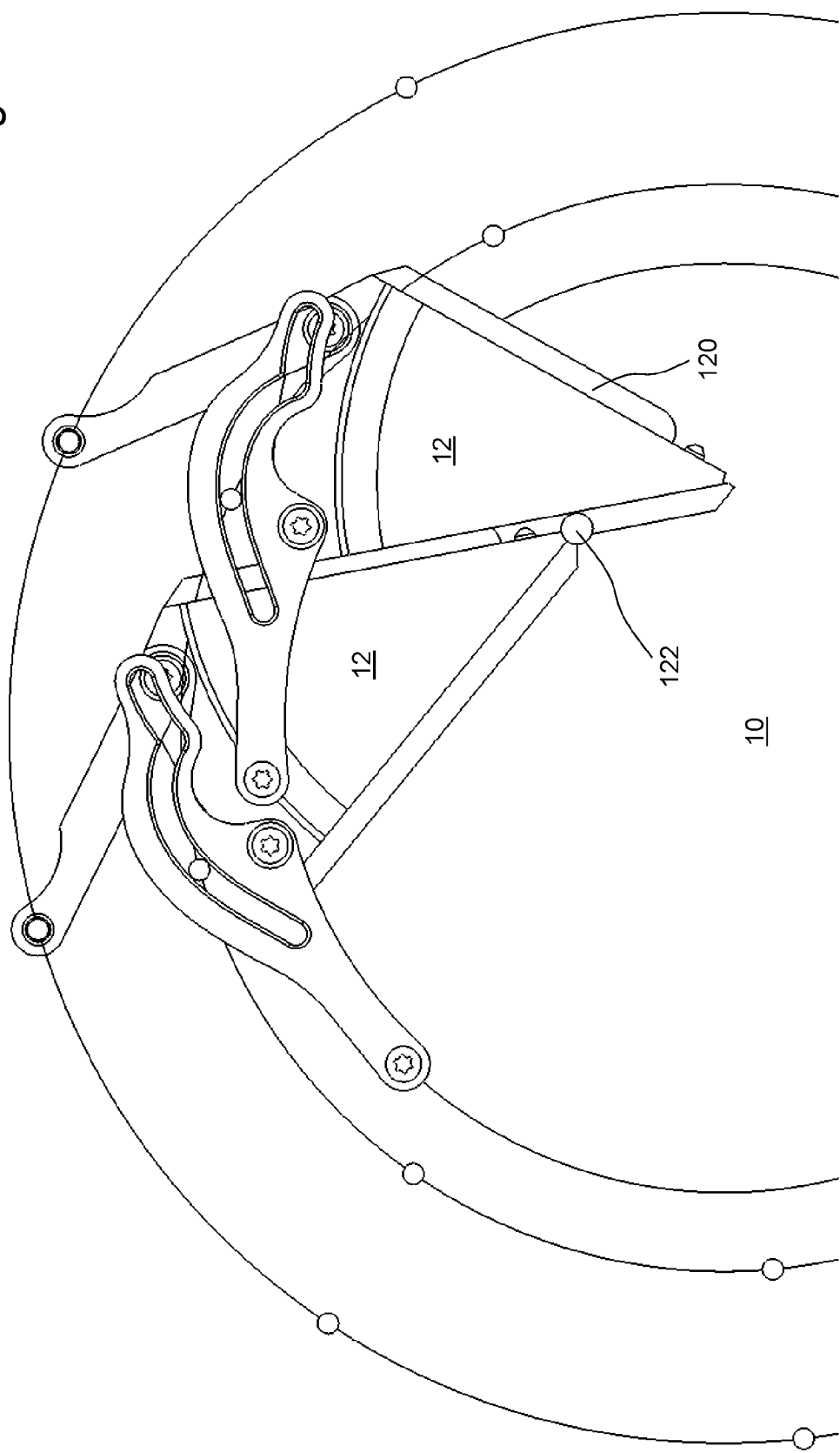
FIG. 30 shows the closure mechanism as per FIG. 28 in a more opened state.

In the embodiment as per FIGS. 28 to 30, the segments 12 at least on one or both lateral faces 16, 18, have a solid or elastic rib 120. This rib, when viewed in the axial direction, ensures a closed contour of the opening 10 formed by the adjacent segments, and can also assume the function of a seal.

While optional and not relating to the ribs 120 or being functionally coupled to the latter, one or a plurality of segments 12 on the tip 70 can moreover have a centric seal 122 which ensures that the center 14 is sealed at all times, even when the tips 70 were to be somewhat worn. The tips 70 in this instance press into the centric seal 120 when the closure mechanism is in the closed state.

While this is also not limited to this embodiment having the seals, one or a plurality of centering appendages 124, close to the tips 70, for example on a lateral face 18, can project from the segment 12 in the circumferential direction, the centering appendages 124 in the closed state potentially invading a complementary clearance 126 in the other lateral face 16, for example, this making possible the mechanical coupling of the segments, already mentioned previously, and mutual centering of the segments in the radial direction. To this end, the centering appendage can have a conical taper in order for the centering function to be simplified.

However, a particular movement of the segments is optimal for opening in this variant, because the centering appendage 124 by virtue of the conical shape and of the shape of the complementary clearance 126 does not have any play in all directions. For this reason, no relative movement as is the case in the other embodiments, that is to say no sliding along the adjacent lateral faces 16, 18 of adjacent segments 12 can take place at the beginning of the opening procedure. Rather, the segments 12 have to be diverged in a mutually perpendicular manner without any lateral movement component, so that the centering appendage 124 in the longitudinal extent thereof can move straight out of the clearance 126. For this reason, the slotted track 54 is provided with a slotted track portion 154, the latter acting at the beginning of the opening procedure. The curve here is designed such that the segments 12 relative to the center 14 are moved in a purely radial manner toward the outside, i.e. the centerline M of the segments 12 being displaced along a radial such that the segments 12 are initially simply radially diverged without any mutual displacing movement of the segments 12. Once the centering appendages 124 are outside the complementary clearances 126 thereof, the combined and superimposed movement about a plurality of the pivot axes can take place, as is shown in FIG. 30. Owing to the mutual spacings of the planar parts of the lateral faces 16, 18 and of the ribs 120, gaps between adjacent segments 12 also do not arise here, which would permit a view in the axial direction.

Figure 31:
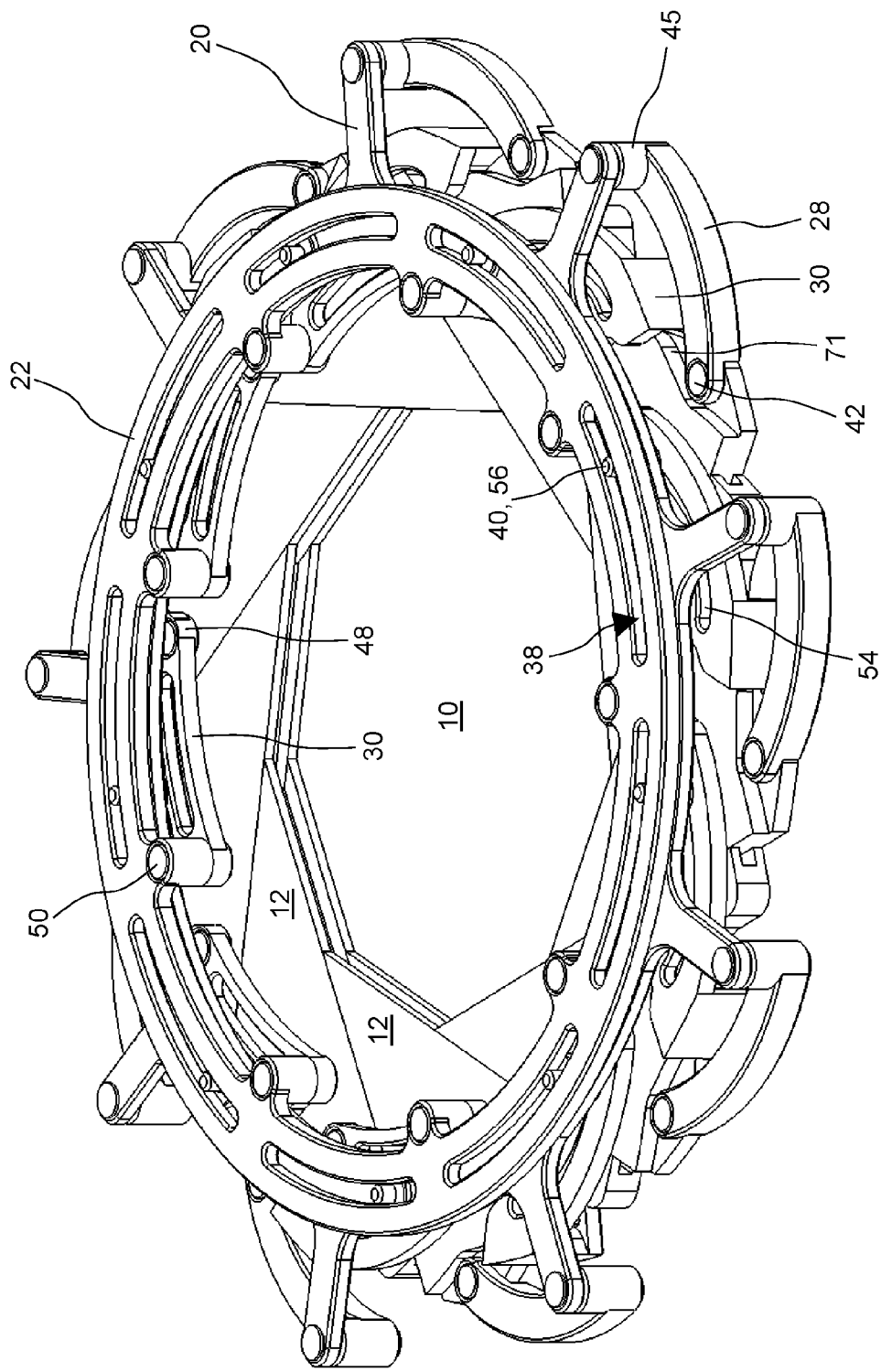
FIG. 31 shows a perspective view from above of a seventh embodiment of the closure mechanism according to the invention, which is of a configuration similar to that of the first embodiment, but has a rotary mounting disposed further toward the inside and has two pivoting levers which encompass the segments on the outer periphery and axially lie on both sides of the segments, in the partially opened state.
Figure 32:
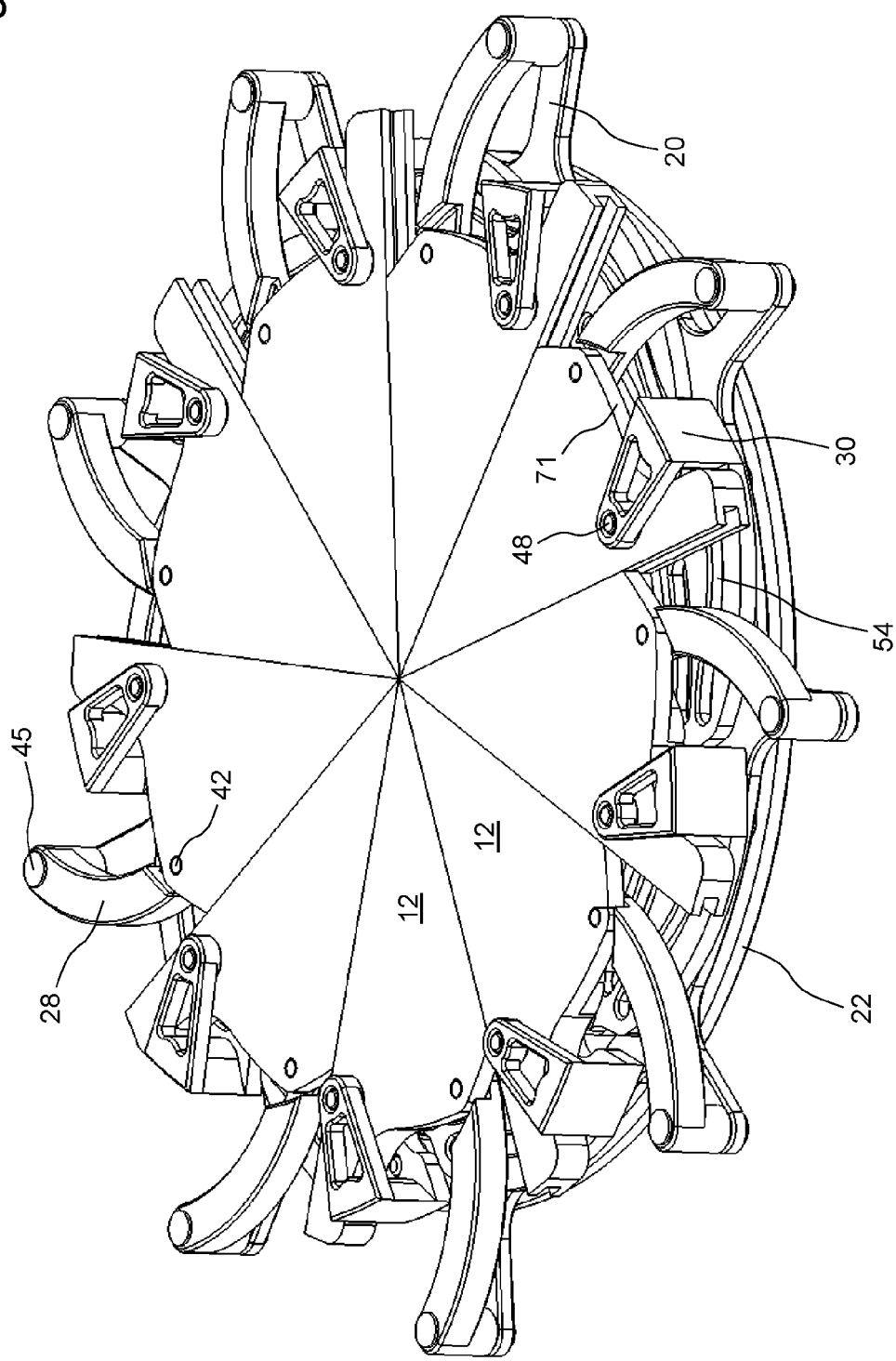
FIG. 32 shows a perspective view from below of the closure mechanism according to FIG. 31 in the closed state.

The embodiment as per FIGS. 31 to 32 corresponds substantially to that of FIG. 1, wherein the rotary mounting 44 here, having the slotted guides 38 in the shape of circular segments and the protrusions 40 that engage in the slotted guides 38, is however disposed so as to be radially further inside, and the protrusions 40 simultaneously assume the function of the appendages 56.

Furthermore, the second pivoting levers 30 in terms of the shape thereof are embodied such that the second pivoting levers 30 encompass the segments 12 on the outer circumferential periphery 71 of the latter, such that each segment 12 lies axial between axially spaced apart legs of the second pivoting lever 30, and the second pivoting lever 30 stabilizes the assigned segment 12 thereof from both axial sides.

The pivot bearing 45 between the first pivoting lever 28 and the first base 20 here is configured having a dedicated protrusion (not visible) and an opening (not visible) into which the protrusion protrudes. It is irrelevant here too whether the protrusion is provided on the pivoting lever 28 or on the base 20, and the opening on the respective other part.

The segments 12 can lie with minimum axial play between the configured legs of the second pivoting lever 30 and in the case of axial loading even slightly contact the legs in order to be supported.

As can be readily seen in FIG. 31, the first base 20 proceeding from the ring, can optionally have star-shaped radially outward protruding outriggers on which the first pivot bearings 45 are provided.

Figure 33:
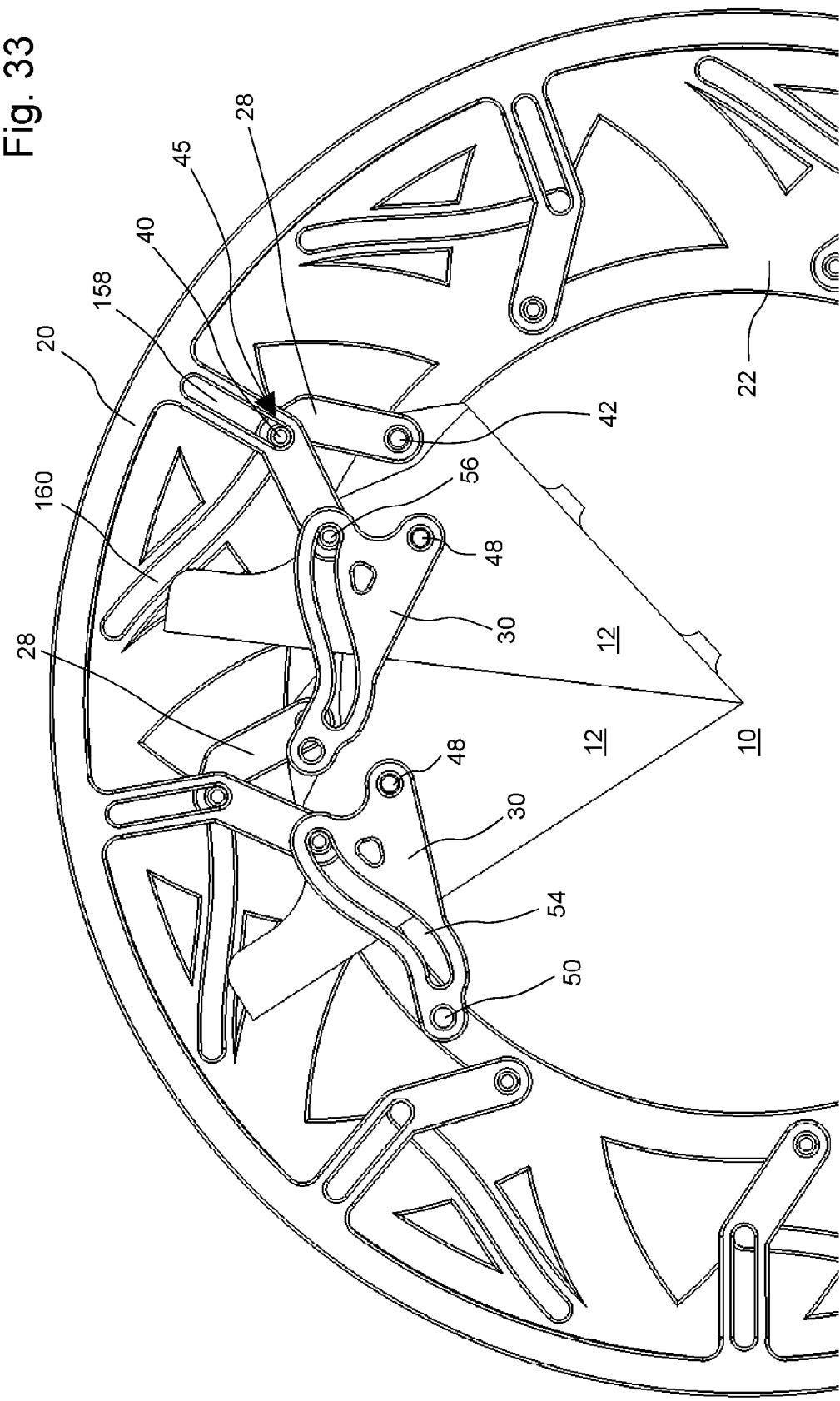
FIG. 33 shows an enlarged partial view of the closure mechanism according to the invention and according to an eighth embodiment, which is of a configuration similar to that of the first embodiment, but in which the protrusions of the pivot bearings of the first pivoting levers are not moved on an orbit but the position of these protrusions is defined by two intersecting curved tracks that move relative to one another, one of which being situated on the first base and one of which being situated on the second base, illustrated having only two segments and an omitted base for the sake of improved clarity, in the closed state.
Figure 34:
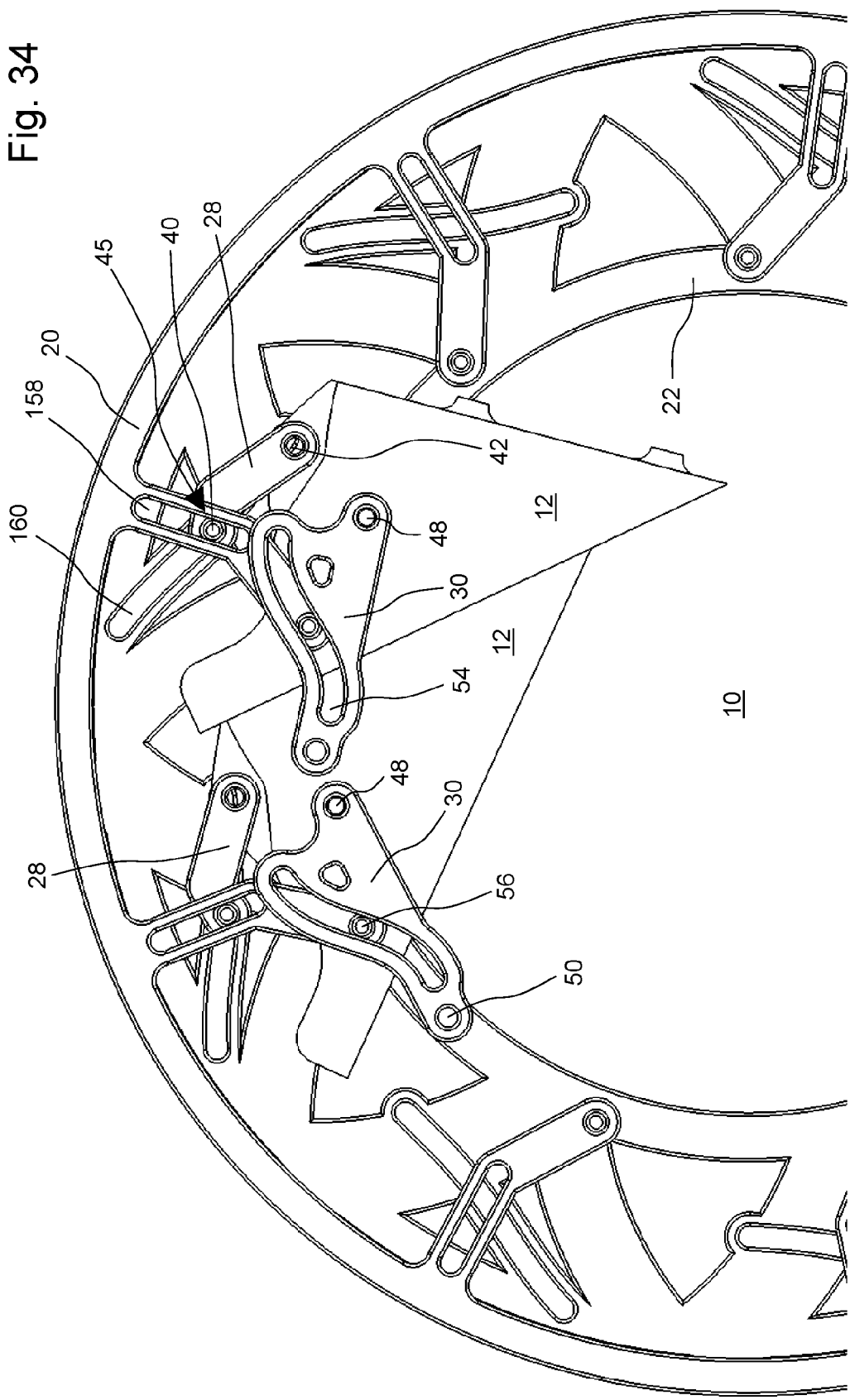
FIG. 34 shows a view corresponding to that according to FIG. 33 in the partially opened state.
Figure 35:
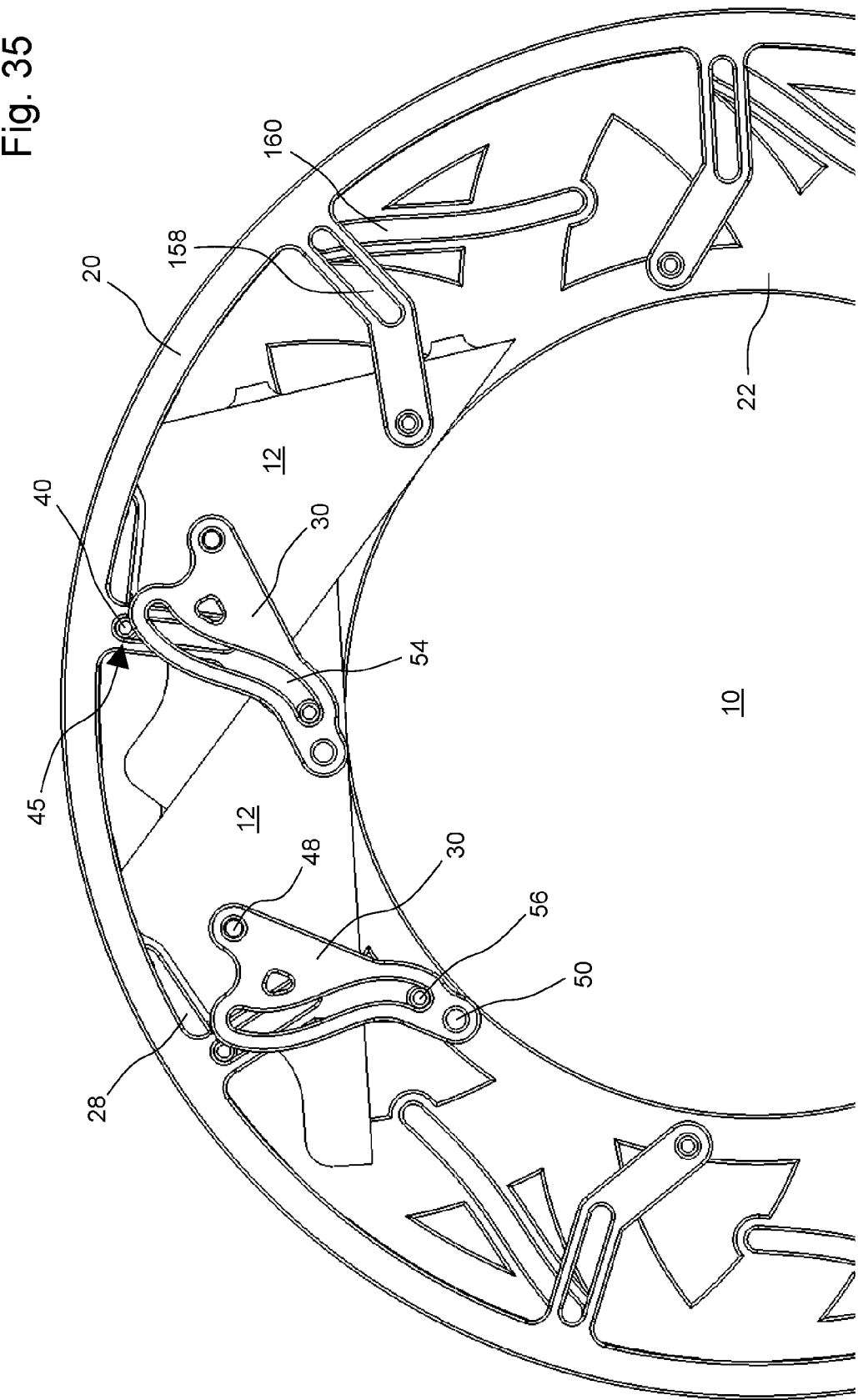
FIG. 35 shows a view corresponding to that according to FIG. 33 of the closure mechanism in the completely opened state.

The embodiment as per FIGS. 33 to 35 corresponds substantially to the first embodiment. The FIGS. 33 to 35 here are similar to the illustrations in FIGS. 6 to 8.

However, the protrusions 40 of the pivot bearings 45 of the first pivoting levers 28 in this variant are not moved along an orbit in the second base 22, but the position of the protrusions 40 is instead defined by curved tracks 158 (in the first base 20) and 160 (in the second base 22) which move relative to one another and intersect, when viewed in the axial direction, the curved tracks 158 and 160 conjointly with the assigned protrusion 40 forming a travelling pivot bearing 45 in the space. When viewed in the axial direction, this results in a travelling intersection point between the curved tracks 158 and 160 that establishes the changing position of the pivot bearing 45 and of the protrusion 40. The curved tracks 158, 160 here are slotted tracks, this not to be understood as being limiting.

The curved tracks 158, 160 can be curved in portions or be completely curved and/or run in a linear manner.

In this embodiment, a protrusion 40 which conjointly defines the pivot bearing 45 fulfils a dual function. The protrusion 40 is part of the pivot bearing 45 between the first pivoting lever 28 and the first base 20, and acts as a coupling element and is part of a slotted guide between the first pivoting lever 28 and the second base 22.

This embodiment is distinguished in that the path of the protrusion 40, and thus that of the pivot bearing 45, can be freely designed and does not run along a segment of the circle about the center.

Figure 36:
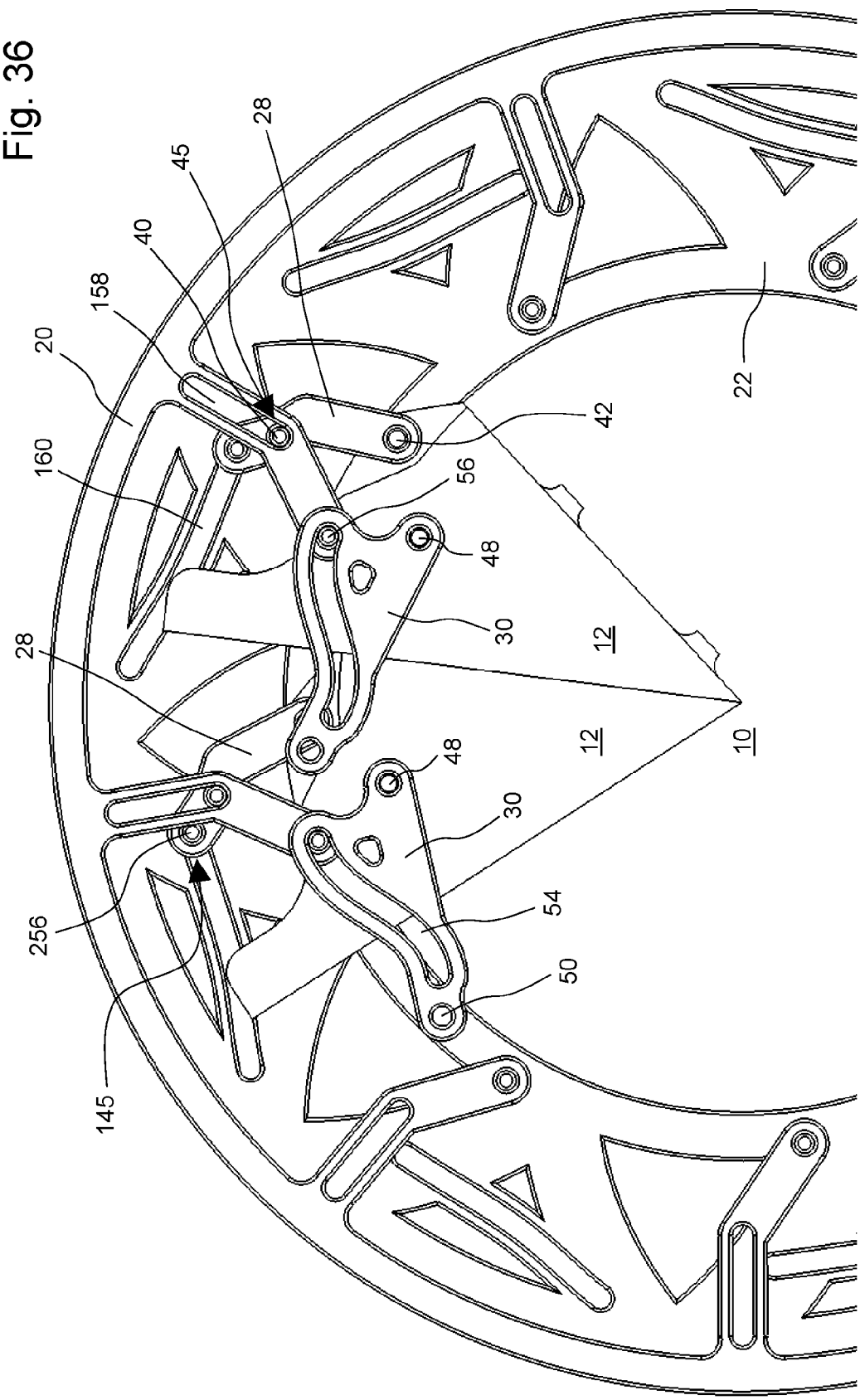
FIG. 36 shows an enlarged partial view of the closure mechanism according to the invention and according to a ninth embodiment, which is of a configuration similar to that of the eighth embodiment, but in which the first pivoting levers are not simultaneously coupled to both bases by way of a protrusion of a pivot bearing, but by way of a protrusion are coupled to the first base and by way of a dedicated coupling element are coupled to the second base, illustrated having only two segments and an omitted first base for the sake of improved clarity, in the closed state.
Figure 37:
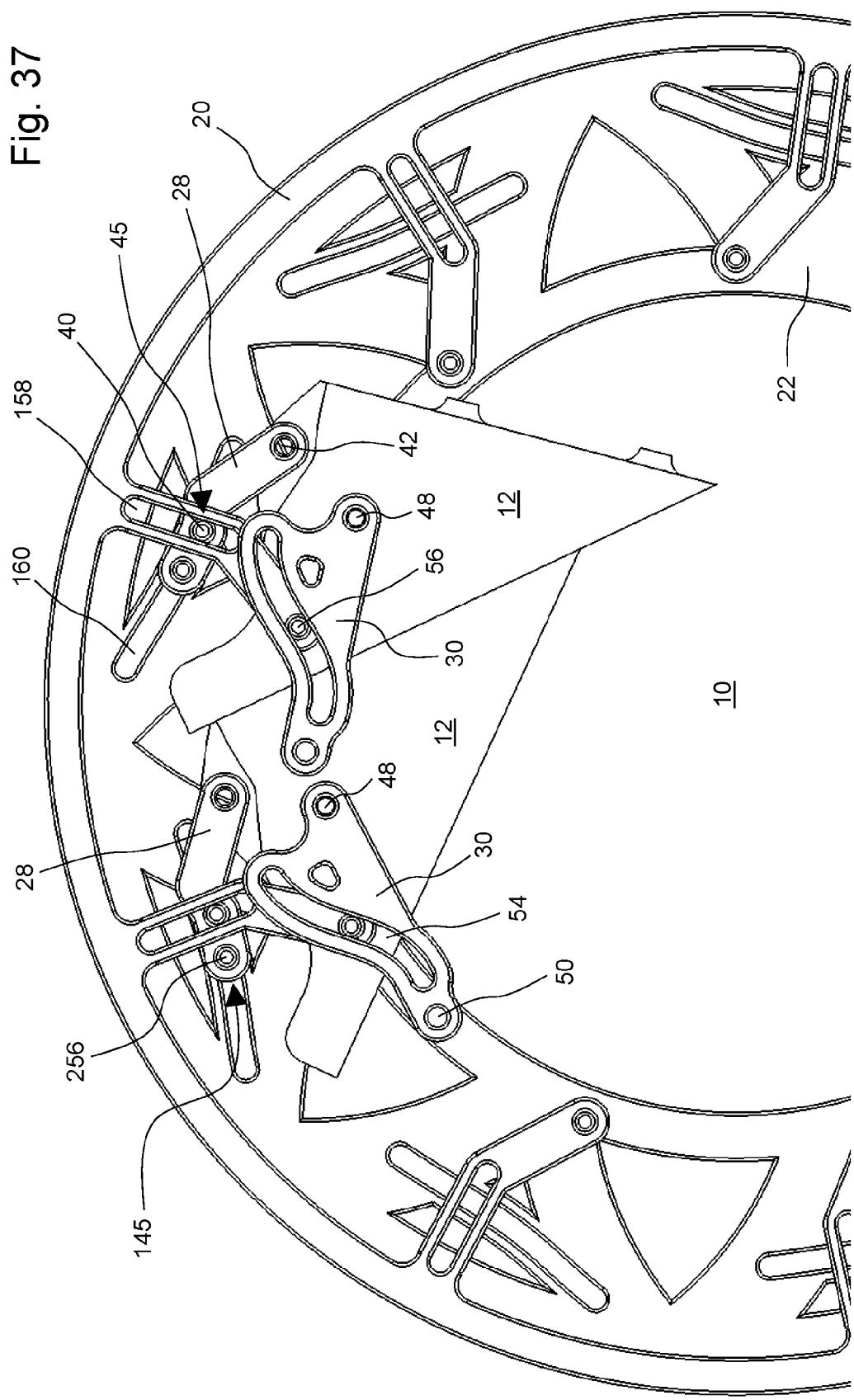
FIG. 37 shows a view corresponding to that according to FIG. 36 in the partially opened state.
Figure 38:
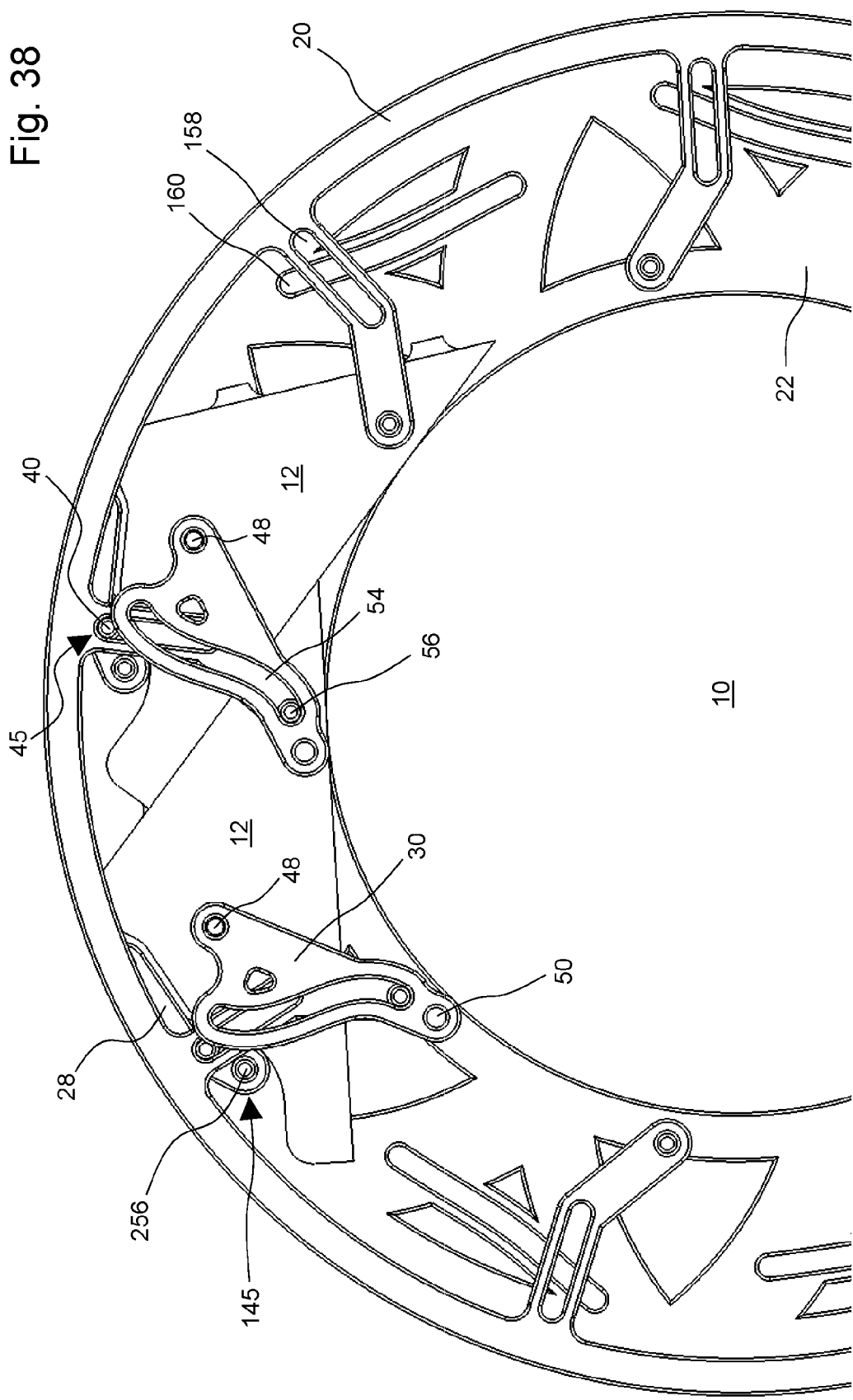
FIG. 38 shows a view corresponding to that according to FIG. 36 of the closure mechanism in the completely opened state.
Figure 39:
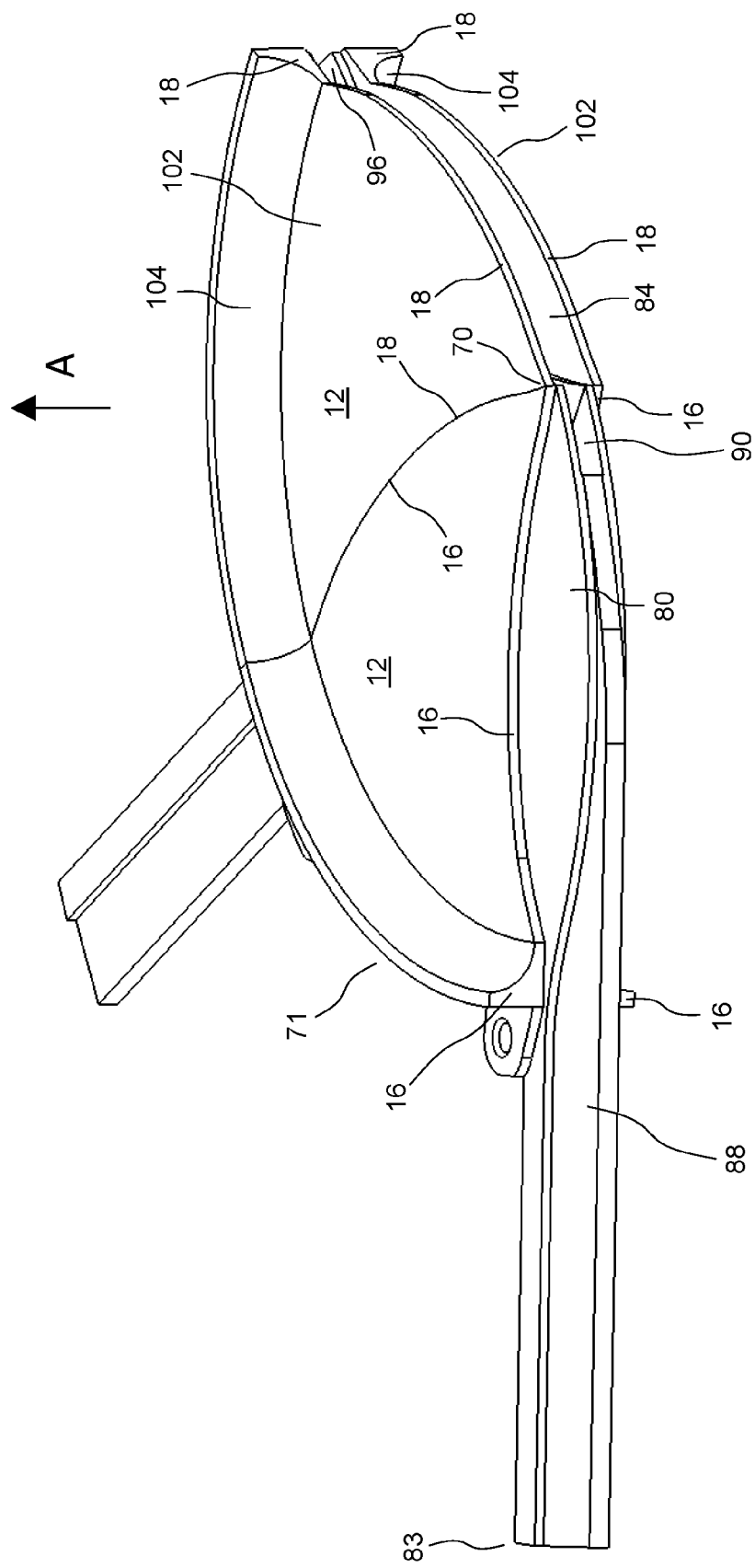
FIG. 39 shows a perspective view of two adjacent segments of the closure mechanism according to the invention, which are of a configuration similar to that of FIG. 22, but in which the lateral faces are not linear or planar, but have a curved shape, and in which the guide cams protruding in the circumferential direction are of an enlarged embodiment and integrated in a harmonized manner in the lateral faces, in the closed state of the closure mechanism.
Figure 40:
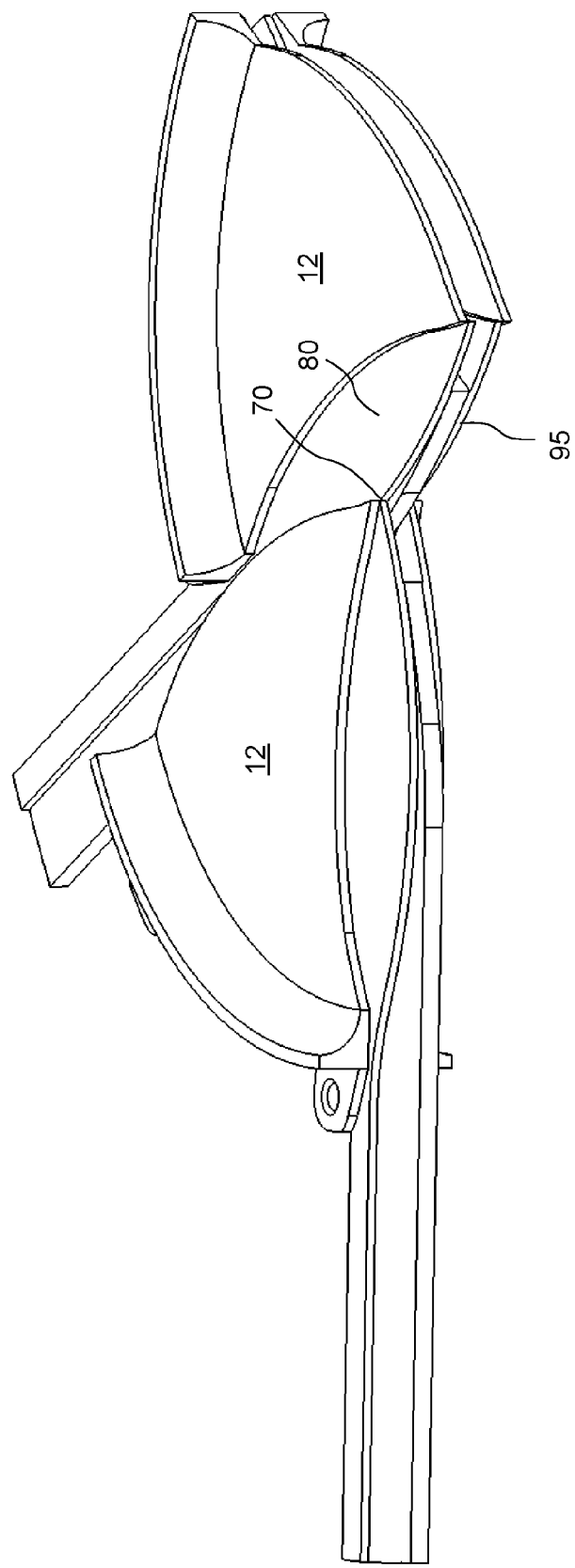
FIG. 40 shows a view of the segments corresponding to that according to FIG. 39, in the partially opened state of the closure mechanism.
Figure 41:
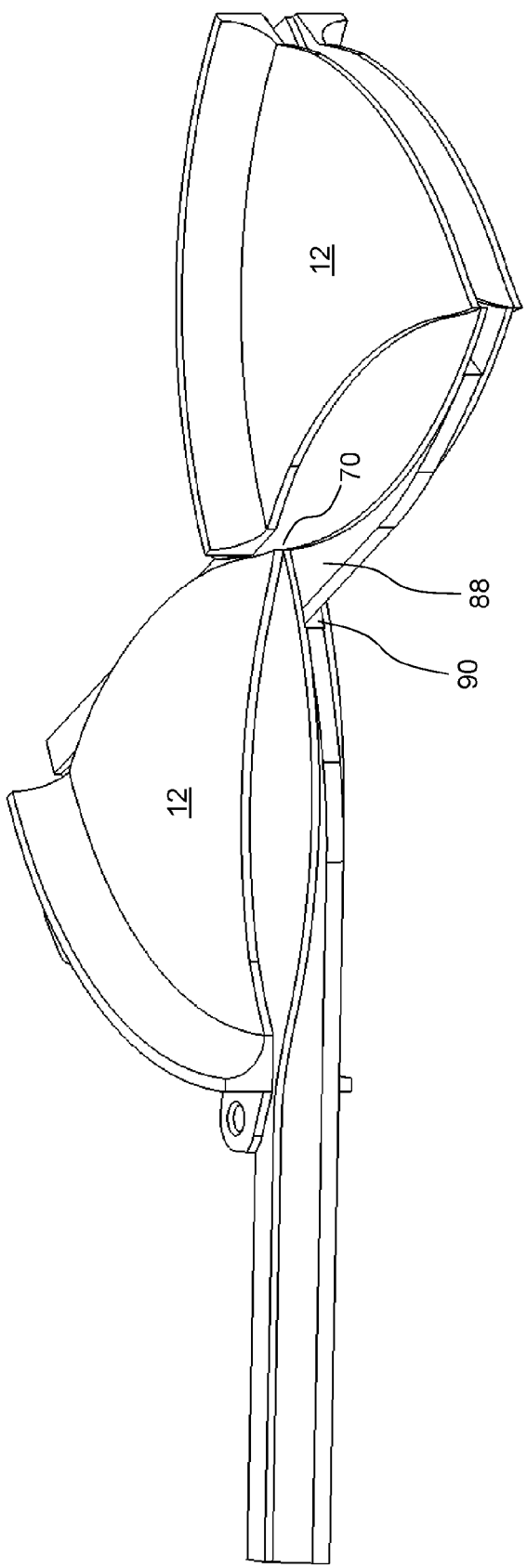
FIG. 41 shows the segments according to FIG. 39 in an even more opened state of the closure mechanism.
Figure 42:
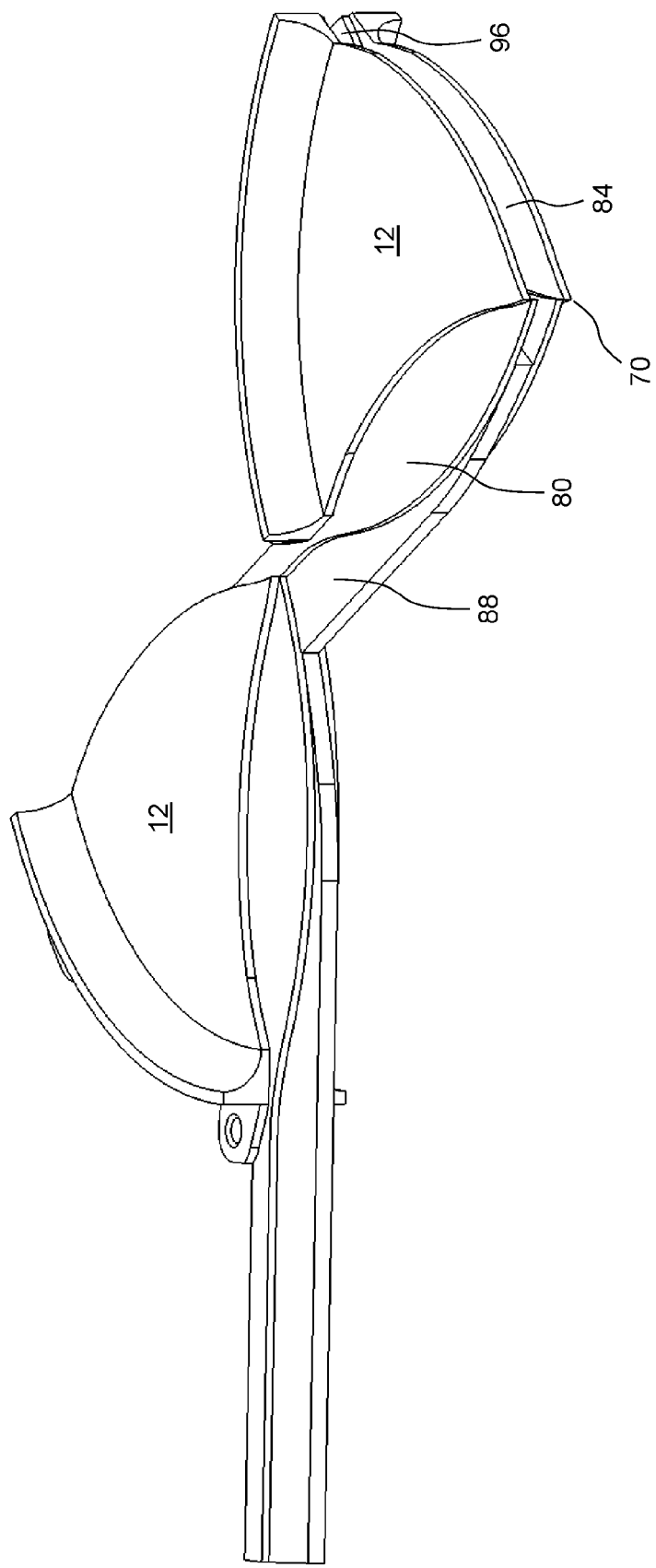
FIG. 42 shows the segments according to FIG. 39 in the completely opened state of the closure mechanism.

The embodiment as per FIGS. 36 to 38 corresponds substantially to that as per FIGS. 33 to 35, wherein the first pivoting levers 28 here have a protrusion 40, which is guided by the curved track 158 (here embodied as a slotted track, for example) of the first base 20, as well as an appendage 256 which is guided by the curved track 160 (here embodied as a slotted track, for example) of the second base 22, and conjointly with the curved track 160 forms a further pivot bearing 145. The dual function of the protrusion 40 illustrated in FIGS. 33 to 35 is thus cancelled here.

The variants as per FIGS. 33 to 38 show different articulations and actuations of the first pivoting lever 28. These first pivoting levers 28, having the articulation and the actuation thereof, can of course also be combined in an arbitrary manner with the second pivoting levers 30, as shown and described in the previous embodiments, in particular in FIGS. 6 to 8 and 13 to 21.

The embodiment as per FIGS. 39 to 42 corresponds substantially to that as per FIGS. 22 to 25, wherein a tongue-and-groove connection between adjacent segments 12, which acts during the entire motion sequence, is present.

The lateral faces 18 in the circumferential direction are shaped in an arcuate convex manner, and in the center thereof have a groove-type concavity 84.

The opposite lateral face 16 of the adjacent segment 12, and the opposite lateral face 16 of the same segment 12 however, are shaped so as to be concave and complementary to the convex lateral face 18, and in the axial center thereof have a convexly running convexity 80 which can engage in the groove-type concavity 84 of the adjacent segment 12.

The guide web 88, which in the axial direction is narrower than the convexity 80, continues the convexity 80 in the radially outward manner and ensures that the adjacent segments 12 at all times engage in one another according to the tongue-and-groove principle.

Figure 43:
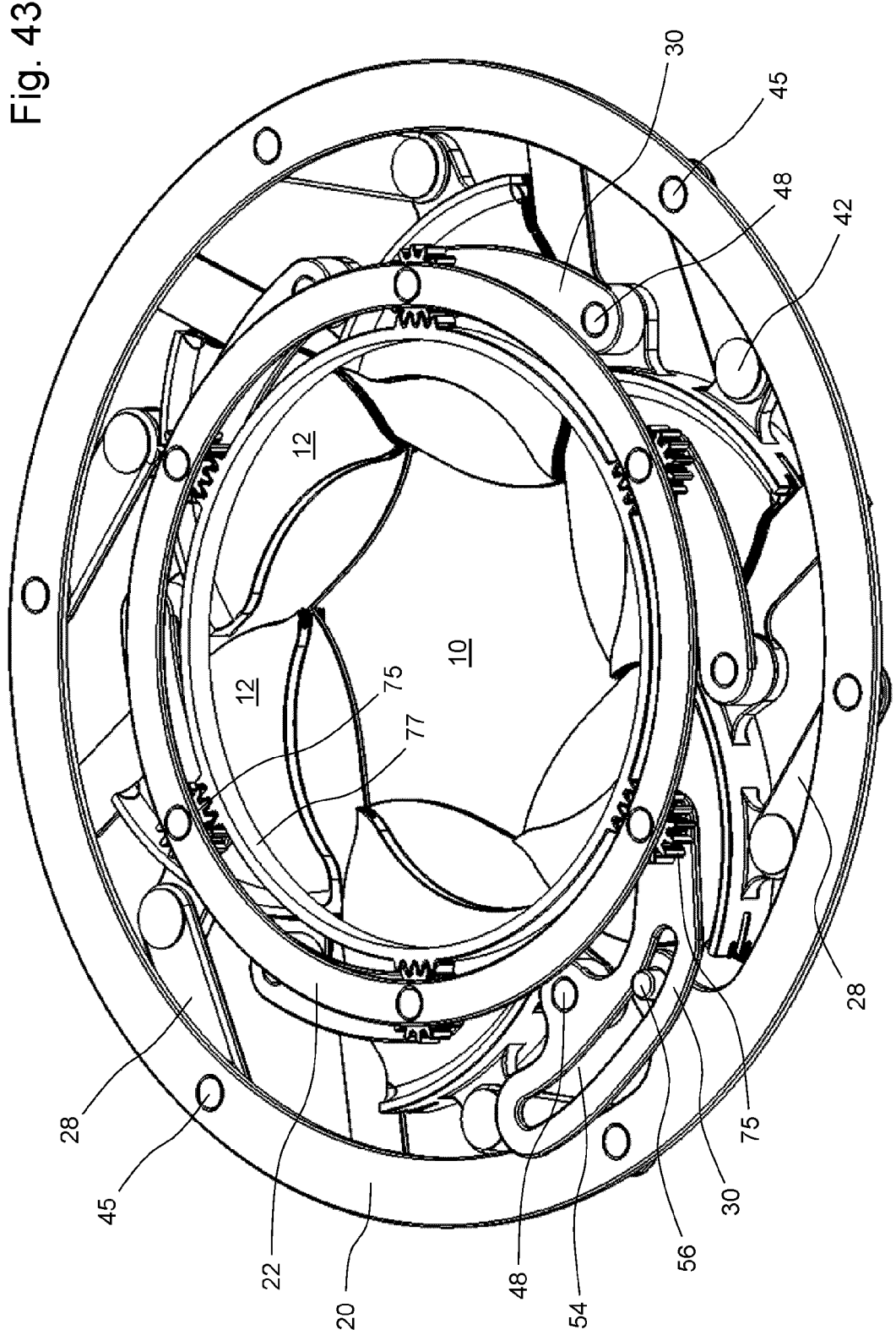
FIG. 43 shows a perspective view of the closure mechanism according to the invention and according to a tenth embodiment, which is of a configuration similar to that of FIG. 9, but in which only a second pivoting lever supports the control curve of the cam mechanism and all other second pivoting levers by way of a toothed ring as the coupling device are mechanically connected in a synchronized manner to the second pivoting lever that supports the control curve, and thus by way of the cam mechanism are also coupled to the first base.
Figure 44:
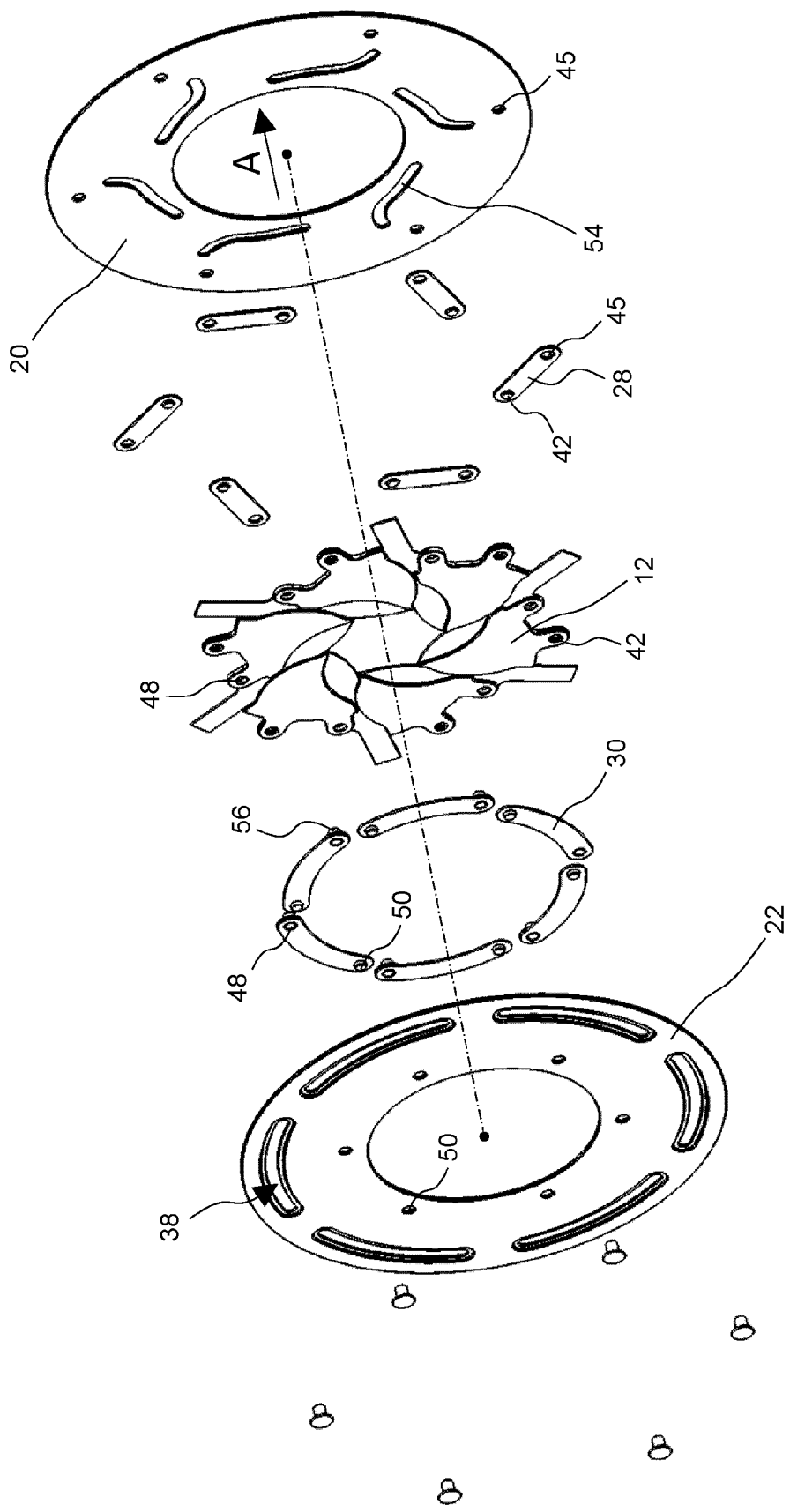
FIG. 44 shows an exploded view of an eleventh embodiment of the closure mechanism according to the invention in the partially opened state.

The embodiment as per FIG. 43 corresponds substantially to that as per FIG. 9, wherein the coupling device here is composed of toothings 75 that are fixedly connected to the second pivoting levers 30, and of a ring element 77 populated with a toothing. As a result of the mechanical synchronization of all second pivoting levers 30 by means of this coupling device, all second pivoting levers 30 can now be coupled to the first base by way of a single second pivoting lever 30 and by way of only one cam mechanism. The movement, which is predefined by the cam mechanism of the singular second pivoting lever 30, is consequently transmitted to the other second pivoting levers 30 by way of the particular coupling device. A simpler construction of the remaining second pivoting levers 30 is made possible as a result. The ring element 77, similar to a sun gear of a planetary gearbox, can be held between the toothings 75, or be selectively additionally mounted so as to be rotatable on the first base 20 or on the second base 22. The first base 20 and the second base 22 are mounted so as to be mutually rotatable, as has already been described in FIG. 31, for example. For improved clarity, no such rotary mountings were illustrated in FIG. 43.

The embodiment as per FIGS. 44 to 47 is based on the embodiment as per FIGS. 12 to 15, wherein the projecting appendage 56 of the second pivoting lever 30 is disposed on the second articulation point 48. A more compact construction mode having fewer components is made possible as a result.

Moreover, another shape of the segments 12, and a control curve 54 which has been adapted to this shape of segment, have been chosen.

In other aspects, the second pivoting levers 30 here are in each case connected to the segment thereof by way of one second articulation point 48, and connected to the second base 22 by way of a second pivot bearing 50. The same also applies to the first pivoting levers 28 and the first articulation points 42 thereof, and to the first pivot bearings 45 which connect the pivoting levers 28 to the first base 20.

Figure 45:
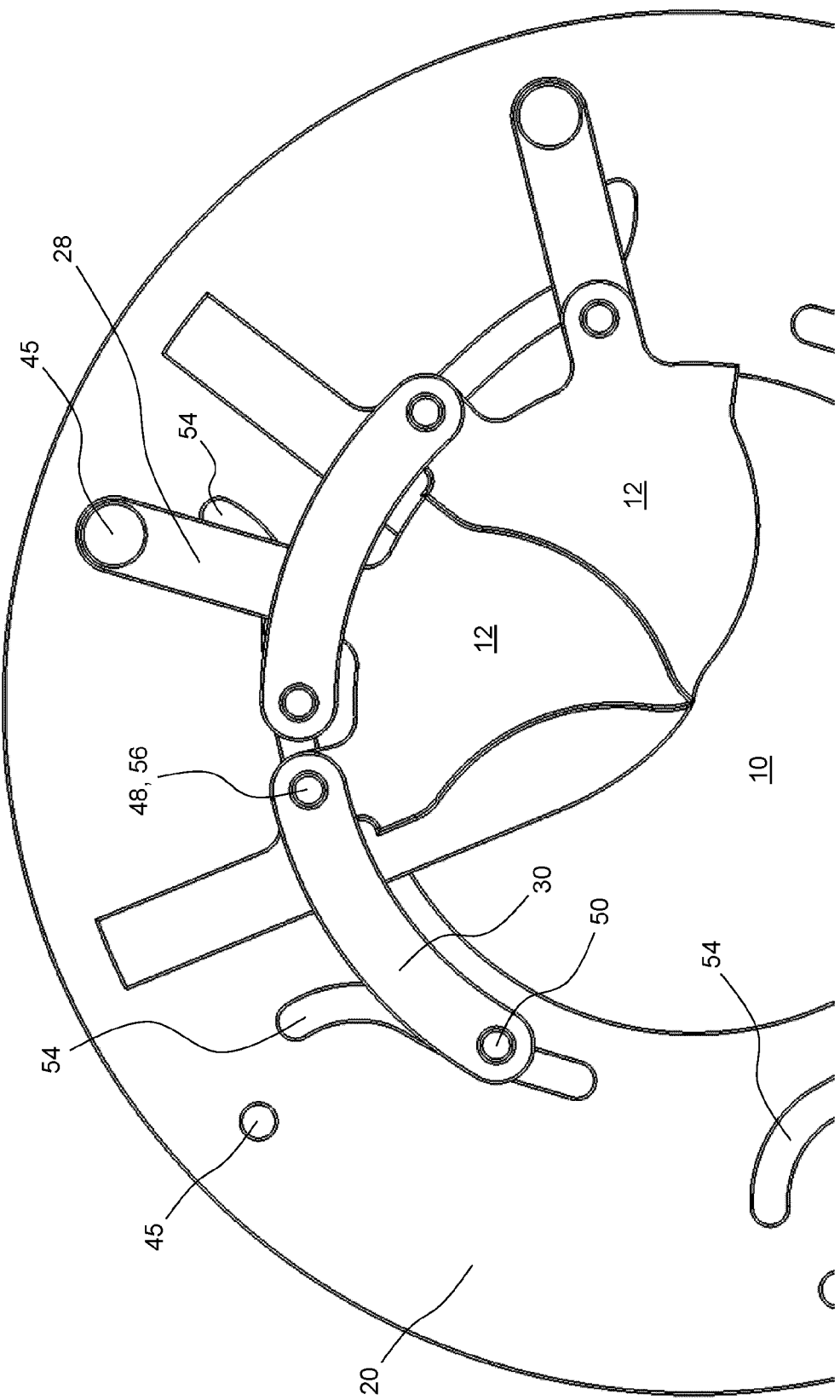
FIG. 45 shows the closure mechanism as per FIG. 44 in a detailed view, having only two segments and an omitted base, in the closed state.
Figure 46:
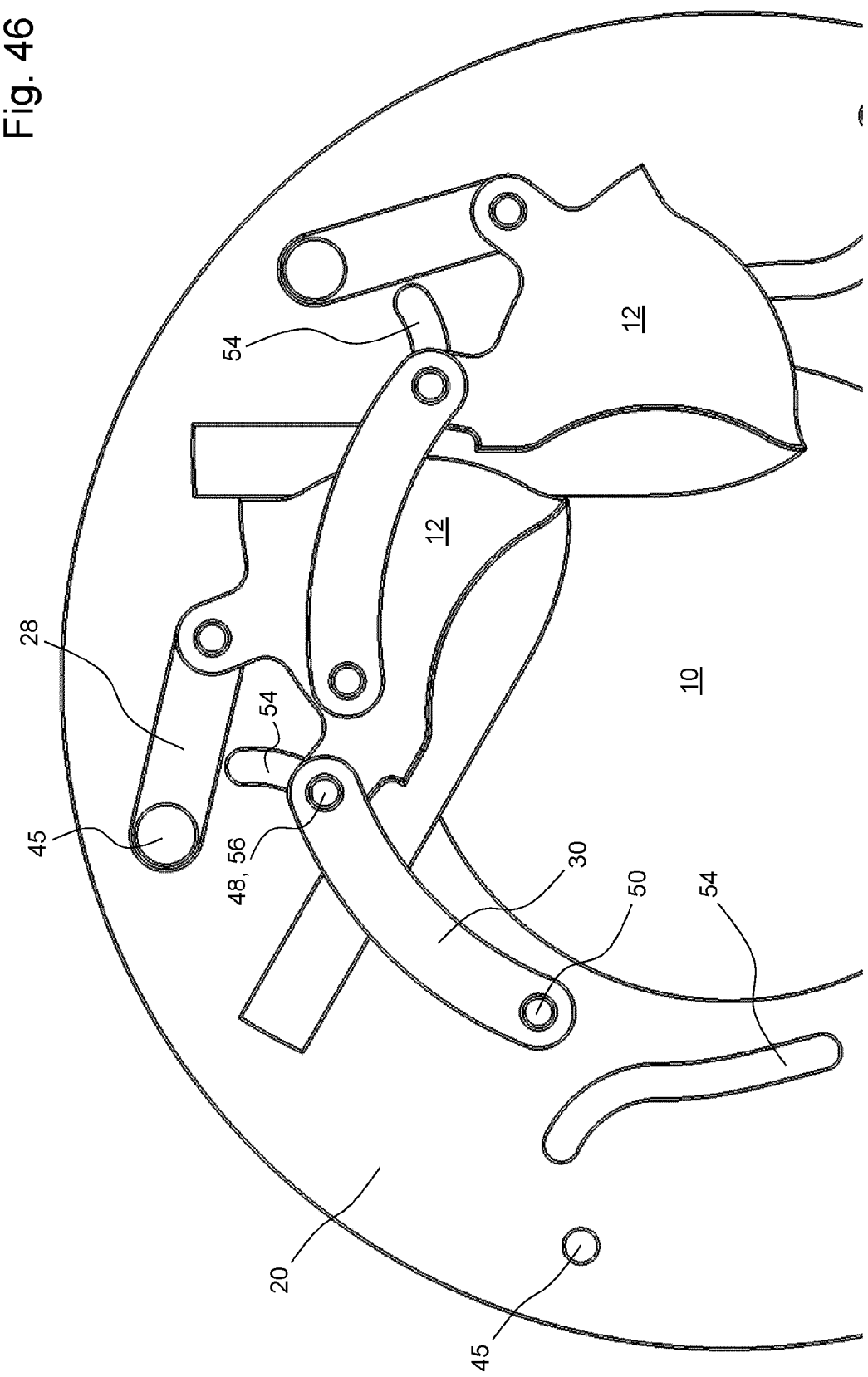
FIG. 46 shows a view of the closure mechanism corresponding to that according to FIG. 45 in the partially opened state.
Figure 47:
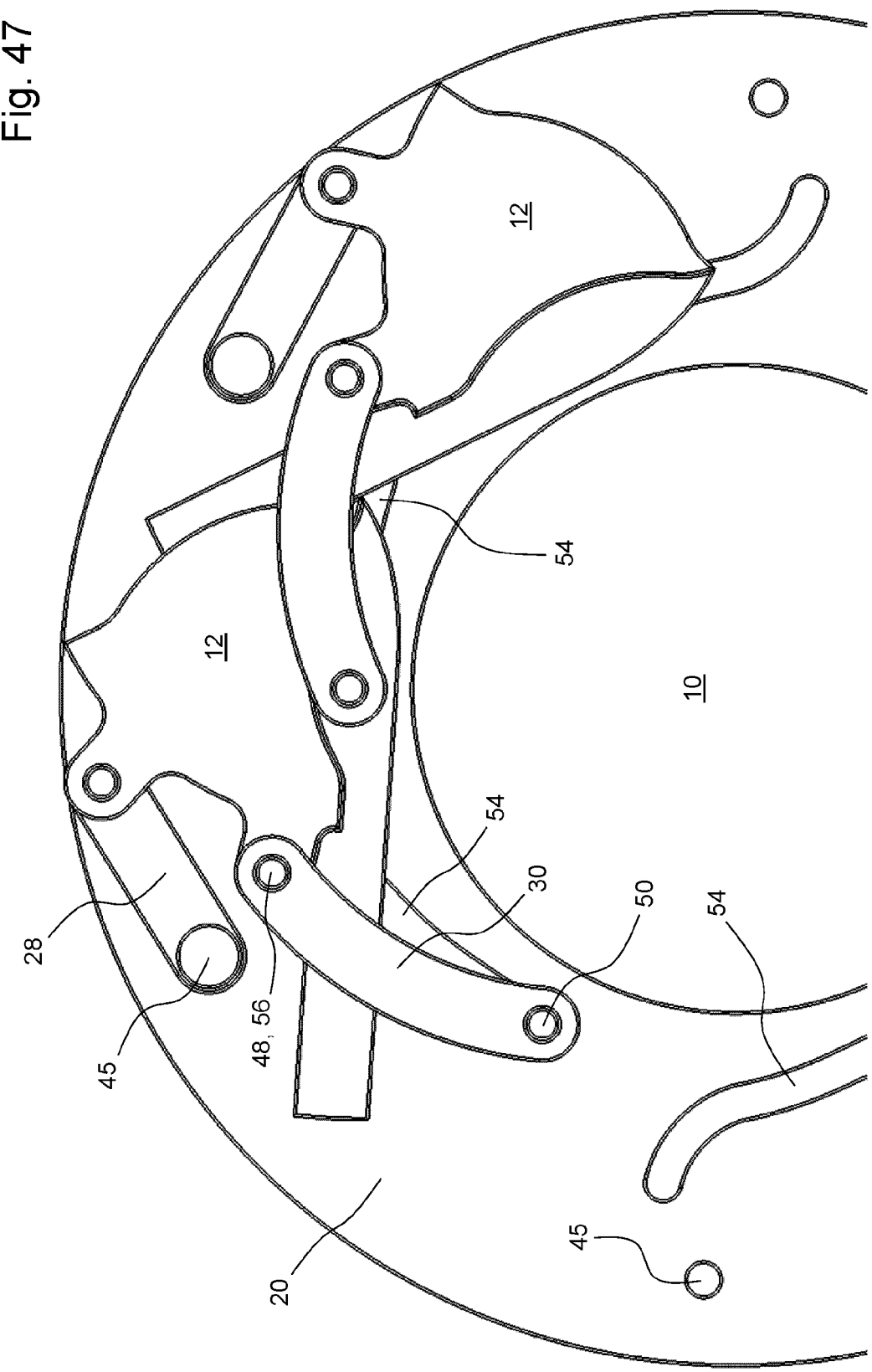
FIG. 47 shows a view of the closure mechanism corresponding to that according to FIG. 45 in the completely opened state.

Motion sequences when rotating the first base 20 relative to the second base 22 can be seen in FIGS. 45 to 47, these motion sequences leading to an opening procedure. The second base 22 has been omitted for the sake of improved clarity.

The invention claimed is:

1. A closure mechanism for an opening that is defined by a center and an outer periphery, comprising:
 a plurality of segments which, in a closed position when moved to the center, conjointly close the opening and, in an open position when moved to the outer periphery, conjointly release the opening;
 a plurality of first and second pivoting levers; and
 a first and a second base, wherein
 each of the plurality of segments is a central part of a dedicated four bar linkage and has a first and a second articulation point;
 each first pivoting lever, which is pivotably attached to the first base outside the outer periphery, is attached to the first articulation point so as to be pivotable on the assigned segment; and
 each second pivoting lever, which by way of a cam mechanism is mechanically coupled in a movable manner to the first base and is pivotably attached to the second base outside the outer periphery, is attached to the second articulation point on the assigned segment; and
 the first base and the second base are movable relative to one another, and the relative movement forms a driving movement for the plurality of first and second pivoting levers.

2. The closure mechanism according to claim 1, wherein the first or the second base is configured as a ring that is movable about the center.

3. The closure mechanism according to claim 2, wherein the ring is guided on the other of the first or second base, by a rotary mounting configured between the first and the second base.

4. The closure mechanism according to claim 3, wherein the rotary mounting is formed by at least one slotted guide configured between the first and the second base.

5. The closure mechanism according to claim 1, wherein all first pivoting levers are pivotably attached to the first base, and/or
 all second pivoting levers are pivotably attached to the second base.

6. The closure mechanism according to claim 1, wherein all first pivoting levers are of mutually identical construction or are identical at least in terms of lever length, and/or
 all second pivoting levers are of mutually identical construction or are identical at least in terms of lever length.

7. The closure mechanism according to claim 1, wherein the first and the second articulation points are in each case positioned in a region of a radially outer circumferential portion of the respective assigned segment, or
 one of the first and second articulation points lies in a region of a radial centerline of the assigned segment, in terms of the closed state of the closure mechanism.

8. The closure mechanism according to claim 1, wherein the first pivoting lever by way of a first pivot bearing is attached to the first base, and
 the second pivoting lever by way of a second pivot bearing is attached to the second base,
 wherein the first pivot bearing is disposed so as to be radially further outward than the second pivot bearing, or vice versa.

9. The closure mechanism according to claim 1, wherein the first or the second pivoting lever, in the closed position, runs so as to be more steeply inclined in relation to a directly adjoining outer peripheral region of the opening than the respective other pivoting lever.

10. The closure mechanism according to claim 1, wherein all of the segments have a plate-shaped design and/or lie in a common plane.

11. The closure mechanism according to claim 1, wherein all of the segments have a closure portion that lies in a common plane and, attached thereto and projecting therefrom a pipe segment portion,
 wherein the pipe segment portions in all of the positions of the segments complement one another so as to form a pipe having a variable cross section as a result of the movement of the segments, or
 all of the positions complement one another so as to form a funnel having a variable cross section as a result of the movement of the segments.

12. The closure mechanism according to claim 1, wherein the cam mechanism has a slotted track and/or a rib curve and/or a cam disk and/or one or a plurality of sensing elements.

13. The closure mechanism according to claim 12, wherein
 the slotted track, on which an appendage on the first base engages, is configured on the second pivoting lever, or
 a slotted track, on which an appendage on the second pivoting lever engages, is configured in the first base.

14. The closure mechanism according to claim 1, wherein the segments for sealing in relation to a directly adjacent segment have seals and/or interlock at least in portions.

15. The closure mechanism according to claim 1, wherein the segments have such a shape, and the four bar linkage and the cam mechanism are mutually adapted such that no gap is created between directly adjacent segments during the opening procedure.

16. The closure mechanism according to claim 1, wherein the cam mechanism is configured such that the second pivoting lever in the opening procedure first pivots in the direction of the center and subsequently pivots toward the outside.

17. The closure mechanism according to claim 1, wherein the cam mechanism is configured such that the segments at the beginning of the opening procedure, first perform a purely radial movement toward the outside, and subsequently a pivoting movement toward the outside.

18. The closure mechanism according to claim 1, wherein the segments have a tapered tip,
wherein the tips in the closed state converge in the center,
wherein segments on the lateral faces thereof that face the adjacent segments have a centering appendage, the latter projecting laterally and in the closed state invading a complementary clearance in a directly opposite lateral face of the adjacent segment and mechanically locking the segments to one another.

19. The closure mechanism according to claim 1, wherein, for achieving a synchronized movement of the first or of the second pivoting levers, the first or the second pivoting levers are connected to one another via a mechanical coupler that is separate from the first and the second base.

20. The closure mechanism according to claim 1, wherein the segments on the outer circumferential periphery thereof, on at least one axial end face, have a protruding periphery, and
the protruding peripheries in the closed state of the closure mechanism complement one another so as to form a closed encircling ring-shaped appendage,
further comprising:
a housing having a bore which is closable by the closure mechanism, and
a seal between the housing and the ring-shaped appendage for sealing at least one side of the closure mechanism in relation to the housing.

* * * * *